United States Patent
Konicek et al.

(10) Patent No.: US 11,055,937 B2
(45) Date of Patent: Jul. 6, 2021

(54) CELL PHONE CONTROL OF VEHICLE SETTINGS AND ACTIONS

(71) Applicants: Jeffrey C. Konicek, Tolono, IL (US); Steven G. Lisa, Paradise Valley, AZ (US)

(72) Inventors: Jeffrey C. Konicek, Tolono, IL (US); Steven G. Lisa, Paradise Valley, AZ (US)

(73) Assignee: ReSight, LLC, Scottsdale, AZ (US)

( * ) Notice: Subject to any disclaimer, the term of this patent is extended or adjusted under 35 U.S.C. 154(b) by 0 days.

(21) Appl. No.: 16/773,700

(22) Filed: Jan. 27, 2020

(65) Prior Publication Data

US 2020/0193748 A1    Jun. 18, 2020

Related U.S. Application Data

(63) Continuation of application No. 15/225,743, filed on Aug. 1, 2016, which is a continuation of application (Continued)

(51) Int. Cl.
*G07C 9/00* (2020.01)
*H04M 3/42* (2006.01)
(Continued)

(52) U.S. Cl.
CPC .......... *G07C 9/00182* (2013.01); *F24F 11/30* (2018.01); *F24F 11/62* (2018.01);
(Continued)

(58) Field of Classification Search
CPC . B60R 2325/205; B60R 25/209; B60R 25/25; B60R 2325/105; H04L 2209/84;
(Continued)

(56) References Cited

U.S. PATENT DOCUMENTS 5,349,678 A    9/1994 Morris et al.
5,487,100 A    1/1996 Kane
(Continued)

FOREIGN PATENT DOCUMENTS

EP    0935378 A2    8/1999
EP    1599057 A1    11/2005
(Continued)

OTHER PUBLICATIONS

U.S. Appl. No. 10/121,626, filed May 8, 2003, Seelig.
(Continued)

*Primary Examiner* — Allahyar Kasraian
(74) *Attorney, Agent, or Firm* — Law Offices of Lisa & Lesko, LLC; Justin Lesko, Esq.

(57) ABSTRACT

Enhancements of and to cell phone operations are based in whole or in part on determining the location of the cell phone. Systems and methods select and determine locations or areas of importance or relevance, and based on that information and other programmed factors affect or alter the operations of the cell phone. While the systems and methods are illustrated by use of cell phone embodiments and applications, they are equally applicable to virtually any portable or mobile communication device, including for example, wireless laptop computers and PDAs.

18 Claims, 11 Drawing Sheets

Related U.S. Application Data

No. 14/494,386, filed on Sep. 23, 2014, now Pat. No. 9,842,442, which is a continuation of application No. 11/513,515, filed on Aug. 30, 2006, now Pat. No. 8,880,047, which is a continuation-in-part of application No. 11/196,951, filed on Aug. 3, 2005, now Pat. No. 8,295,851.

(51) Int. Cl.

| | | |
|---|---|---|
| *H04W 4/80* | (2018.01) | |
| *F24F 11/30* | (2018.01) | |
| *F24F 11/62* | (2018.01) | |
| *H05B 47/19* | (2020.01) | |
| *H05B 47/105* | (2020.01) | |
| *H04M 1/72457* | (2021.01) | |
| *H04M 1/72513* | (2021.01) | |
| *H04W 4/02* | (2018.01) | |
| *H04W 4/14* | (2009.01) | |
| *G08B 13/00* | (2006.01) | |
| *H04L 12/28* | (2006.01) | |
| *H04W 4/021* | (2018.01) | |
| *H04M 3/533* | (2006.01) | |
| *H04M 3/54* | (2006.01) | |
| *H04M 7/00* | (2006.01) | |
| *F24F 11/56* | (2018.01) | |
| *H04M 1/72463* | (2021.01) | |
| *H04W 84/12* | (2009.01) | |

(52) U.S. Cl.
CPC .......... *G08B 13/00* (2013.01); *H04L 12/2816* (2013.01); *H04M 1/72457* (2021.01); *H04M 1/72513* (2013.01); *H04M 3/42* (2013.01); *H04W 4/021* (2013.01); *H04W 4/025* (2013.01); *H04W 4/14* (2013.01); *H04W 4/80* (2018.02); *H05B 47/105* (2020.01); *H05B 47/19* (2020.01); *F24F 11/56* (2018.01); *H04M 1/72463* (2021.01); *H04M 3/53333* (2013.01); *H04M 3/54* (2013.01); *H04M 7/006* (2013.01); *H04M 2203/1016* (2013.01); *H04M 2207/18* (2013.01); *H04M 2242/14* (2013.01); *H04M 2242/30* (2013.01); *H04M 2250/10* (2013.01); *H04W 84/12* (2013.01)

(58) Field of Classification Search
CPC ......... H04M 1/72583; H04M 2250/22; H04M 1/72533; F02N 11/0807; H04W 12/08; H04W 12/04; H04W 12/06; H04W 4/02; H04W 4/48
See application file for complete search history.

(56) References Cited

U.S. PATENT DOCUMENTS

| | | | |
|---|---|---|---|
| 5,778,304 A | 7/1998 | Grube | |
| 5,845,202 A | 12/1998 | Davis | |
| 5,845,207 A * | 12/1998 | Amin | H04W 4/16 455/414.1 |
| 5,878,351 A | 3/1999 | Alanara et al. | |
| 5,905,789 A | 5/1999 | Will | |
| 5,918,180 A | 6/1999 | Dimino | |
| 5,946,618 A | 8/1999 | Agre | |
| 5,978,673 A | 11/1999 | Alperovich | |
| 6,011,973 A | 1/2000 | Valentine | |
| 6,038,451 A | 3/2000 | Syed | |
| 6,085,096 A | 7/2000 | Nakamura | |
| 6,091,948 A | 7/2000 | Carr et al. | |
| 6,104,913 A | 8/2000 | McAllister | |
| 6,144,671 A | 11/2000 | Perinpanathan et al. | |
| 6,201,974 B1 | 3/2001 | Lietsalmi et al. | |
| 6,211,799 B1 | 4/2001 | Post et al. | |
| 6,212,390 B1 | 4/2001 | Rune | |
| 6,223,018 B1 | 4/2001 | Fukumoto et al. | |
| 6,230,017 B1 | 5/2001 | Andersson | |
| 6,233,448 B1 | 5/2001 | Alperovich | |
| 6,243,039 B1 | 6/2001 | Elliot | |
| 6,249,282 B1 | 6/2001 | Sutcliffe et al. | |
| 6,317,594 B1 | 11/2001 | Gossman et al. | |
| 6,320,534 B1 | 11/2001 | Goss | |
| 6,324,404 B1 | 11/2001 | Dennison | |
| 6,333,973 B1 | 12/2001 | Smith et al. | |
| 6,356,838 B1 | 3/2002 | Paul | |
| 6,380,866 B1 | 4/2002 | Sizer, II et al. | |
| 6,389,288 B1 | 5/2002 | Kuwahara | |
| 6,424,820 B1 | 7/2002 | Burdick | |
| 6,442,616 B1 | 8/2002 | Inoue | |
| 6,487,495 B1 | 11/2002 | Gale et al. | |
| 6,539,230 B2 | 2/2003 | Yen | |
| 6,535,815 B2 | 3/2003 | Bloebaum | |
| 6,542,749 B2 | 4/2003 | Tanaka et al. | |
| 6,549,768 B1 | 4/2003 | Fraccaroli | |
| 6,584,316 B1 | 6/2003 | Akhteruzzaman | |
| 6,618,593 B1 | 9/2003 | Drutman et al. | |
| 6,625,455 B1 | 9/2003 | Ariga | |
| 6,628,938 B1 | 9/2003 | Rachabathuni et al. | |
| 6,675,002 B1 | 1/2004 | Lipovski | |
| 6,701,144 B2 | 3/2004 | Kirbas | |
| 6,716,101 B1 | 4/2004 | Meadows et al. | |
| 6,735,433 B1 | 5/2004 | Cervantes | |
| 6,754,472 B1 | 6/2004 | Williams et al. | |
| 6,756,913 B1 | 6/2004 | Ayed | |
| 6,819,919 B1 | 11/2004 | Tanaka | |
| 6,828,908 B2 | 12/2004 | Clark | |
| 6,832,093 B1 | 12/2004 | Ranta | |
| 6,839,560 B1 | 1/2005 | Bahl | |
| 6,876,973 B1 | 4/2005 | Visconti | |
| 6,909,891 B2 | 6/2005 | Yamashita et al. | |
| 6,919,792 B1 | 7/2005 | Battini et al. | |
| 6,944,447 B2 | 9/2005 | Portman et al. | |
| 6,968,179 B1 | 11/2005 | De Vries | |
| 6,975,874 B1 | 12/2005 | Bates et al. | |
| 6,983,156 B2 | 1/2006 | Fukushima | |
| 6,987,987 B1 | 1/2006 | Vacanti et al. | |
| 7,006,608 B2 | 2/2006 | Seelig et al. | |
| 7,006,833 B1 | 2/2006 | Contractor | |
| 7,042,391 B2 | 5/2006 | Meunier | |
| 7,047,202 B2 | 5/2006 | Jaipuria | |
| 7,048,183 B2 | 5/2006 | Coughlin | |
| 7,082,192 B2 | 7/2006 | Weaver | |
| 7,088,245 B2 | 8/2006 | Guntersdorfer | |
| 7,088,246 B2 | 8/2006 | Fukuoka | |
| 7,091,860 B2 | 8/2006 | Martinez de Velasco Cortina | |
| 7,091,861 B2 | 8/2006 | Schmidtberg | |
| 7,107,081 B1 | 9/2006 | Fujisaki | |
| 7,142,852 B2 | 11/2006 | Tell | |
| 7,155,238 B2 | 12/2006 | Katz | |
| 7,162,237 B1 | 1/2007 | Silver et al. | |
| 7,171,221 B1 | 1/2007 | Amin | |
| 7,284,033 B2 | 10/2007 | Jhanji | |
| 7,289,812 B1 | 10/2007 | Roberts | |
| 7,333,773 B2 | 2/2008 | Dietz et al. | |
| 7,343,317 B2 | 3/2008 | Jokinen et al. | |
| 7,464,059 B1 | 12/2008 | Robinson et al. | |
| 7,542,558 B2 | 6/2009 | Klein | |
| 7,577,427 B2 | 8/2009 | Bicker et al. | |
| 7,583,972 B2 | 9/2009 | Clipsham | |
| 7,673,055 B2 | 3/2010 | Scott | |
| 7,693,512 B1 | 4/2010 | West | |
| 7,693,752 B2 | 4/2010 | Jaramillo | |
| 7,715,790 B1 * | 5/2010 | Kennedy | H04M 1/7253 455/41.2 |
| 7,747,246 B2 | 6/2010 | Zellner et al. | |
| 7,818,415 B2 | 10/2010 | Jhanji | |
| 7,822,823 B2 | 10/2010 | Jhanji | |
| 7,840,224 B2 | 11/2010 | Vengroff et al. | |
| 8,014,763 B2 | 9/2011 | Hymes | |
| 8,090,616 B2 | 1/2012 | Proctor et al. | |
| 8,200,980 B1 | 6/2012 | Robinson et al. | |

(56) References Cited

U.S. PATENT DOCUMENTS

| | | | |
|---|---|---|---|
| 8,358,197 B2* | 1/2013 | Tran | H04W 12/0804 340/5.61 |
| 8,396,727 B2 | 3/2013 | Waytena et al. | |
| 2001/0022558 A1 | 9/2001 | Karr, Jr. | |
| 2001/0034845 A1 | 10/2001 | Brunt et al. | |
| 2001/0055974 A1 | 12/2001 | Bates et al. | |
| 2002/0022483 A1 | 2/2002 | Thompson et al. | |
| 2002/0034292 A1 | 3/2002 | Tuoriniemi et al. | |
| 2002/0070879 A1* | 6/2002 | Gazit | G08G 1/205 340/901 |
| 2002/0072356 A1 | 6/2002 | Yamashita et al. | |
| 2002/0077080 A1 | 6/2002 | Greene | |
| 2002/0086676 A1 | 7/2002 | Hendrey et al. | |
| 2002/0098835 A1* | 7/2002 | Flick | H04M 1/72533 455/420 |
| 2002/0102989 A1 | 8/2002 | Calvert et al. | |
| 2002/0138351 A1 | 9/2002 | Houvener et al. | |
| 2002/0168964 A1 | 11/2002 | Kraft | |
| 2002/0173978 A1 | 11/2002 | Boies et al. | |
| 2002/0178087 A1 | 11/2002 | Henderson et al. | |
| 2002/0178163 A1 | 11/2002 | Mayer | |
| 2002/0194121 A1 | 12/2002 | Takayama | |
| 2003/0008671 A1 | 1/2003 | Lundgren | |
| 2003/0033173 A1* | 2/2003 | Suzuki | G06Q 40/08 705/4 |
| 2003/0055689 A1 | 3/2003 | Block et al. | |
| 2003/0114171 A1 | 6/2003 | Miyamoto | |
| 2003/0143997 A1 | 7/2003 | Sawada et al. | |
| 2003/0177072 A1 | 9/2003 | Bared | |
| 2003/0193404 A1 | 10/2003 | Joao | |
| 2003/0206102 A1 | 11/2003 | Joao | |
| 2003/0212605 A1 | 11/2003 | Chin | |
| 2003/0220835 A1* | 11/2003 | Barnes, Jr. | G06F 3/04842 705/14.36 |
| 2003/0229445 A1 | 12/2003 | Tingley | |
| 2003/0231550 A1* | 12/2003 | Macfarlane | B60R 25/257 367/198 |
| 2003/0231753 A1 | 12/2003 | Casaccia | |
| 2004/0009750 A1 | 1/2004 | Beros et al. | |
| 2004/0046646 A1 | 3/2004 | Eskridge | |
| 2004/0048605 A1 | 3/2004 | Schaefer et al. | |
| 2004/0049325 A1* | 3/2004 | Flick | B60R 25/24 701/2 |
| 2004/0049424 A1 | 3/2004 | Murray et al. | |
| 2004/0066092 A1* | 4/2004 | Muller | B60R 25/24 307/10.1 |
| 2004/0110515 A1 | 6/2004 | Blumberg et al. | |
| 2004/0121725 A1* | 6/2004 | Matsui | G08C 17/02 455/3.06 |
| 2004/0128065 A1 | 7/2004 | Taylor | B60Q 1/2665 701/431 |
| 2004/0128152 A1 | 7/2004 | Austin et al. | |
| 2004/0167794 A1 | 8/2004 | Shostack et al. | |
| 2004/0179135 A1 | 9/2004 | Battles et al. | |
| 2004/0203909 A1 | 10/2004 | Koster | |
| 2004/0203923 A1 | 10/2004 | Mullen | |
| 2004/0203940 A1 | 10/2004 | Urs | |
| 2004/0235518 A1 | 11/2004 | Beyette | |
| 2004/0248590 A1 | 12/2004 | Chan | |
| 2004/0266350 A1 | 12/2004 | Kim | |
| 2004/0266419 A1 | 12/2004 | Arling et al. | |
| 2005/0003830 A1 | 1/2005 | Campbell | |
| 2005/0005172 A1 | 1/2005 | Haala | |
| 2005/0027672 A1 | 2/2005 | Arndt et al. | |
| 2005/0037734 A1* | 2/2005 | Tanaka | H04M 1/72533 455/411 |
| 2005/0038876 A1 | 2/2005 | Chaudhuri | |
| 2005/0043995 A1 | 2/2005 | Nguyen | |
| 2005/0043996 A1 | 2/2005 | Silver | |
| 2005/0048987 A1 | 3/2005 | Glass | |
| 2005/0054352 A1 | 3/2005 | Karaizman | |
| 2005/0096023 A1 | 5/2005 | Moore | |
| 2005/0096029 A1 | 5/2005 | Pelaez et al. | |
| 2005/0099275 A1* | 5/2005 | Kamdar | B60R 25/257 340/426.18 |
| 2005/0128078 A1 | 6/2005 | Pfleging et al. | |
| 2005/0130680 A1 | 6/2005 | Northcutt | |
| 2005/0181803 A1 | 8/2005 | Weaver et al. | |
| 2005/0186969 A1 | 8/2005 | Lohtia | |
| 2005/0192741 A1 | 9/2005 | Nichols et al. | |
| 2005/0195802 A1 | 9/2005 | Klein | |
| 2005/0197174 A1* | 9/2005 | Hasan | H04W 12/06 455/575.9 |
| 2005/0210387 A1 | 9/2005 | Alagappan | |
| 2005/0215243 A1 | 9/2005 | Black | |
| 2005/0243802 A1 | 11/2005 | Barclay et al. | |
| 2005/0270246 A1 | 12/2005 | Finn | |
| 2006/0022796 A1 | 2/2006 | Striemer | |
| 2006/0047825 A1 | 3/2006 | Steenstra et al. | |
| 2006/0061453 A1 | 3/2006 | Tuttle | |
| 2006/0089913 A1 | 4/2006 | Jaipuria | |
| 2006/0094350 A1* | 5/2006 | Ishimura | G01S 13/78 455/9 |
| 2006/0099964 A1 | 5/2006 | Barrese et al. | |
| 2006/0116127 A1 | 6/2006 | Wilhoite et al. | |
| 2006/0132352 A1 | 6/2006 | Schantz | |
| 2006/0145660 A1 | 7/2006 | Black | |
| 2006/0160517 A1 | 7/2006 | Yoon | |
| 2006/0166740 A1 | 7/2006 | Sufuentes | |
| 2006/0178986 A1 | 8/2006 | Giordano et al. | |
| 2006/0214845 A1 | 9/2006 | Jendbro et al. | |
| 2006/0256959 A1 | 11/2006 | Hymes | |
| 2006/0270419 A1 | 11/2006 | Crowley et al. | |
| 2006/0273887 A1* | 12/2006 | Yamamoto | B60R 25/24 340/426.36 |
| 2006/0273888 A1* | 12/2006 | Yamamoto | B60R 25/33 340/426.36 |
| 2006/0276210 A1 | 12/2006 | Thomas et al. | |
| 2006/0294393 A1* | 12/2006 | McCall | H04L 9/3231 713/186 |
| 2007/0032225 A1 | 2/2007 | Konicek | |
| 2007/0046493 A1 | 3/2007 | Park et al. | |
| 2007/0093258 A1 | 4/2007 | Steenstra et al. | |
| 2007/0156311 A1* | 7/2007 | Elcock | G07C 5/008 701/31.4 |
| 2007/0238491 A1* | 10/2007 | He | G01C 21/26 455/569.2 |
| 2008/0007120 A1* | 1/2008 | Weyl | G06F 8/60 307/10.1 |
| 2008/0036653 A1 | 2/2008 | Huston | |
| 2008/0065276 A1* | 3/2008 | Sorensen | B60N 2/002 701/2 |
| 2008/0222038 A1 | 9/2008 | Eden et al. | |
| 2008/0309451 A1* | 12/2008 | Zellweger | E05B 19/0082 340/3.32 |
| 2009/0233629 A1 | 9/2009 | Jayanthi | |
| 2010/0036928 A1 | 2/2010 | Granito et al. | |
| 2010/0219234 A1 | 9/2010 | Forbes | |
| 2010/0287009 A1 | 11/2010 | Francis | |
| 2010/0287250 A1 | 11/2010 | Carlson et al. | |
| 2011/0225510 A1 | 9/2011 | Lavrov et al. | |
| 2012/0089470 A1* | 4/2012 | Barnes, Jr. | G06Q 20/04 705/16 |
| 2012/0096490 A1* | 4/2012 | Barnes, Jr. | H04W 4/23 725/34 |
| 2012/0116959 A1 | 5/2012 | Pitroda et al. | |
| 2013/0132274 A1 | 5/2013 | Henderson et al. | |
| 2013/0151111 A1* | 6/2013 | Skelton | B60R 16/02 701/99 |
| 2014/0098247 A1 | 4/2014 | Rao et al. | |
| 2015/0215752 A1 | 7/2015 | Helferich | |

FOREIGN PATENT DOCUMENTS

| | | |
|---|---|---|
| WO | 97/24004 A1 | 7/1997 |
| WO | 2001/008059 | 2/2001 |
| WO | 2002/019750 A1 | 3/2002 |
| WO | 2004/036943 A1 | 4/2004 |

(56) References Cited

FOREIGN PATENT DOCUMENTS

| WO | 2005/122020 | 6/2005 |
|---|---|---|
| WO | 2006/101561 A2 | 9/2006 |

OTHER PUBLICATIONS

Buckley and Longino; Russell Buckley and Carlo Longino On Mobile (Jul. 30, 2004).
Harte, "Introduction to Bluetooth, Technology, Market, Operation, Profiles, and Services".
Hoover, "Designing a bluetooth-based wireless network for distributed shipboard monitoring and control systems" (U.S.N.A.—Trident Scholar report).
Dating by Bluetooth, Feb. 10, 2005, Axxxr on Esato, Nov. 6, 2006 (Internet Article Print).
Press Release by Kangourouge in Telecom, Don't Be Alone On St. Valentines Day, Your Bluetooth Equipped Mobile Can Help You Find Your Dream, Feb. 8, 2005 (Internet Article Print).
Blind Dating By Bluetooth Goes Live, Apr. 15, 2004, (Internet Blog Printout).
Virgin Mobile to Launch Text Message "Dating" Game, Sep. 19, 2006 (Internet Blog Printout).
Frankwatching, Social Networking Services: de Meta List, Dec. 21, 2004, (Internet Printout).
Mobiluck, Send Messages For Free and Meet People with Your Mobile Phone, (Internet Ad Printout).
Engaget, Ryan Block, ProxiDate, meet singles over Bluetooth, Feb. 9, 2005 (Internet Blog Printout).
Wallingford, *Switch to VOIP*, O'Reilly Media, Jun. 2005.
Kolic, An Introduction to Wireless USB, Intel, Apr. 2004.
*Is Near-field Communication Close to Success*, IEEE Computer, Mar. 2006.
Near Field Communication-Interface and Protocol-2 (NFICP-2); "Near Field Communication—White Paper", ECMA, Ecma/TC32-TG19/2004/1 available at www.nfc-forum.org.
AccuTracking at www.accutracking.com.
Brandt "Soon Your Cell Phone May Be Tracking You," PC World Magazine, Apr. 2004.
Krikorian and Gershenfeld, Internet 0—inter-device internetworking, BT Technology Journal, vol. 22 No. 4, Oct. 2004.
"Nokia 9300 Smartphone User Guide," Nokia, 2005-2006.
"Nokia 6136 User Guide," Nokia, 2006.
"Samsung SGH-T709 User Manual," Samsung, 2006.
"LG Chocolate (VX8500) User Guide," LG Electronics, 2006.
JGUI Professional, "GPS W.A.I.T We Are In Touch" Aug. 30, 2006.
Espinoza et al., "GeoNotes: Social and Navigational Aspects of Location-Based Information Systems," HUMLE Lab, Swedish Institute of Computer Sciences (SICS), Kista, Sweden.
IBM Technical Disclosure Bulletin, 'Automated Configuration For Country Specific Software Packages', Oct. 1, 1993, Issue No. 36, vol. 36, pp. 379-380.
Mark Fanty et al., 'City Name Recognition Over The Telephone,' pp. I-549-lI552, 0-7803-0946-4/93, Apr. 27, 1993, IEEE.
Rumelhart, David E., et al., Parallel Distributed Processing; Explorations in the Microstructure of Cognition, Chapter 8: 'Learning Internal Representations by Error Propagation,' vol. 1: Foundations, 1986, pp. 318-362.
Rosenberg, A and Schmidt, C, The Bell System Technical Journal, 'Automatic Recognition of Spoken Spelled Names for Obtaining Directory Listings,' Oct. 1979, pp. 1797-1823.
Rabiner, L, et al., The Bell System Technical Journal, 'A Voice-Controlled, Repertory-Dialer System,' Sep. 1980, pp. 1153-1163.
'Bell Atlantic Nynex Mobile Debuts Unique Voice Dialing Service, Talkdial,' Bell Atlantic News Release, Feb. 15, 1996.
Telephony, Mar. 4, 1996, Meyers, 'Wireless Nation'.
Wireless Week, Jun. 24, 1996, Alleven, 'Potential Investors Lured by Demo'.
Halfbakery: gps alarm watch, Mar. 2000.
All About Symbian—Feed Your Phone (Internet Article Print).
Proxidating, FAQ, 2005, (Internet Printout).
Proxidating, Software Demo, 2005 (Internet Download Order Page).
SmartMobs, Bluetoothdating in the Netherlands, Apr. 9, 2005 (Internet Printout).
Textually.org, all about texting, SMS and MMS, Sep. 19, 2006 (Internet Printout).
Borovoy, Martin, Vemuri, Resnick, Silverman, Hancock; Meme Tags and Community Mirrors: Moving from Conferences to Collaboration, ACM Conference on Computer Supported Cooperative Work, 1998.
EXPO, Chatfield-Taylor, Best Practices: Social networking Apr. 2005 (Internet Printout).
Quick Topic, Smarter Schmoozing: nTag digital name badges, (Internet Printout).
PCmag.com, The Social Networking Tag, Feb. 27, 2004 (Internet Printout).
Randall and Sosinsky, PC Magazine Wireless Solutions, John Wiley and Sons, Dec. 2004.
Axelson, USB Complete: Everything You Need to Develop Custom USB Peripherals, Lakeview Research, Aug. 2005.
Klandrud, et al. 'Beacon Control of Radio Transmitters to Reduce Radio Frequency Interference' Motorola's Technical Developments, vol. 16, Aug. 1992.
Dryburgh and Hewett,Signalling System No. 7: Protocol, Architecture and Service, Cisco Press, Aug. 2004.
Holma and Toskala, WCDMA for UMTS: Radio Access for Third Generation Mobile Communications, John Wiley and Sons, Sep. 2004.
Davidson, Peters, and Grace, Voice Over IP Fundamentals, Cisco Press, Mar. 2000.
VoiceXML 2.0 Developers Guide, Dreamtech Software India and Dreamtech Inc, Jun. 2002.
Aggelou,"Mobile Ad Hoc Networks: From Wireless LANs to 4G Networks".
Alabacak, Analysis of Ultra Wide Band (UWB) Technology for an Indoor Geolocation and Physiological Monitoring System, Storming Media, 2002.
Baker, Glister and Glister, Bluetooth End to End, Wiley, Jan. 2002.
Barksdale, Dragon Naturally Speaking for the Office Professional, South-Western Educational, Dec. 2000.
Belanger, "Taking Wi-Fi Beyond the Hot Spot: Creating Carrier Grade Wireless Broadband Infrastructure".
Bellamy, Digital Telephony, Wiley-Interscience, Feb. 2000.
Bosse, Signaling in Telecommunication Networks, Wiley Interscience, Jan. 1997.
Boucher, Cellular Radio Handbook, Quantum Publishing, Jan. 1995.
Bray and Sturman, "Bluetooth: Connect Without Cables".
Broida, How to do Everything with your GPS, McGraw-Hill, Nov. 2003.
Carrier Grade Voice over IP, McGraw-Hill Professional, Sep. 2002.
Clark, Voice Recognition with Software Applications, McGraw-Hill, Dec. 2000.
Cooklev, Wireless Communication Standards: A Study of IEEE 802.11, 802.15, and 802.16, IEEE Press, Aug. 2004.
Curran, Wifi Security, BookSurge Publishing, Sep. 2004.
Di Benedetto and Giancola, Understand Ultra Wide Band Radio Fundamentals, Prentice Hall PTR, Jun. 2004.
Eady, Implementing 802.11 with Microcontrollers: Wireless Networking for Embedded System Designers, Newnes, Sep. 2005.
Ellis, Pursell, and Rahman, Voice, Video, and Data Network Convergence: Architecture and Design, From VoIP to Wireless, Academic Press, May 2003.
El-Rabbany, Introduction to GPS: The Global Positioning System, Artech House Publishers, Aug. 2006.
Foster and Schalk, Speech Recognition: The Complete Practical Reference Guide, CMP Books, Jul. 1993.
Freeman, Telecommunication System Engineering, John Wiley and Sons, Jun. 2004.
Garfinkel and Rosenberg, RFID: Applications, Security, Privacy, Addison-Wesley Professional, Jul. 2005.
Gast and Gast, 802.11 Wireless Networks: The Definitive Guide, O'Reilly Publishing, Apr. 2002.

(56) References Cited

OTHER PUBLICATIONS

Gibson, Cellular Telephone and Pagers: An Overview, Newnes, Nov. 1996.
Glover and Bhatt, RFID Essentials, O'Reilly Media, Inc., Jan. 2006.
Gratton, Bluetooth Profiles, Prentice Hall PTR, Dec. 2002.
Groom, Groom, and Jones, The Basics of 802.11, International Engineering Consortium, Jun. 2005.
GSM Switching, Services, and Protocols, Eberspaecher et al, John Wiley and Sons, Apr. 2004.
Harte and Flood, Introduction to Public Switched Telephone Networks. Althos, May 2005.
Harte, "Introduction to Data Networks: PAN, LAN, WAN, and Wireless Data Technologies and Systems".
Harte, Introduction to GSM, Althos, Oct. 2004.
Held, "Data Over Wireless Networks: Bluetooth, WAP, and Wireless LANs".
Hoffman-Wellenhof, Lichtenegger, and Collins, Global Positioning System: Theory and Practice, Springer, Sep. 2004.
Holmes and Holmes, Speech Synthesis and Recognition, CRC, 2nd, Nov. 2001.
Johnston, Internet Communications using SIP, Artech House Publishers, Nov. 2003.
Kaplan and Hegarty, Understanding GPS: Principles and Applications, Artech House Publishers, Nov. 2005.
Karranen et al, UMTS Networks: Architecture, Mobility, and Services, John Wiley and Sons, Apr. 2005.
Klevans and Rodman, Voice Recognition, Artech House Publishers, Sep. 1997.
Kreher and Ruedebusch, UMTS Signaling: UMTS Interfaces, Protocols, Message Flows and Procedures Analyzed and Explained, John Wiley and Sons, Apr. 2005.
Kumar, Kline and Thompson, Bluetooth Application Programming with Java APIs, Morgan Kaufman, Sep. 2003.
Lay, Khare, and Chang, Service Assurance for Voice over WiFi and 3G Networks, Artech House Publishers, Aug. 2005.
Lee, Wireless and Cellular Communications, McGraw-Hill Professional, Oct. 2005.
Liu and Li, OFDM-Based Broadband Wireless Networks: Design and Optimization, Wiley-Interscience, Nov. 2005.
Miller, "Bluetooth Revealed: The Insider's Guide to an Open Specification for Global Wireless Communications" 2nd Edition).
Minoli, Hotspot Networks: Wifi for Public Access Locations, McGraw-Hill Professional, Sep. 2002.
Minoli, Newnes, Voice Over IPv6, Apr. 2006.
Morrow, Bluetooth: Operation and Use, McGraw-Hill Professional, Jun. 2002.
Muller, "Wi-Fi for the Enterprise: Maximizing 802.11 For Business".
Narayanan and Alwan, Text-to-Speech Synthesis, Prentice Hall, Aug. 2004.
Noll, Introduction to Telephones and Telephone Systems, Artech House Publishers, Mar. 1999.
Nuaymi, WiMax: Technology for the Last Mile, Halsted Pr, Jan. 2007.
O'Hara and Petrick, The IEEE 802.11 Handbook: A Designer's Companion, Institute of Electrical and Electronic Engineers, Mar. 2005.
Ohrtman and Roeder, Wi-Fi Handbook: Building 802.11b Wireless Networks, McGraw-Hill Professional, Apr. 2003.
Ohrtman, WiMax Handbook, McGraw-Hill Communications, May 2005.
Orhtman, Softswitch: Architecture for VoIP, McGraw-Hill Professional, Dec. 2002.
Peterson and Davie,"Computer Networks: A Systems Approach" 3rd Edition.
Prasad and Prasad, 802.11 WLANs and IP Networking: Security, QoS, and Mobility, Artech House Publishers, Apr. 2005.
Rappaport, Wireless Communications, Principles and Practice, Prentice Hall PTR, Dec. 2003.
Reed, An Introduction to Ultra Wide Band Communications Systems, Prentice Hall PTR, Apr. 2005.
Roshan and Leary, "Wireless Local-Area Network Fundamentals". Shepard, RFID, McGraw-Hill Professional, Aug. 2004.
Shepard, WiMax Crash Course, McGraw-Hill Osborne Media, May 2006.
Sinnreich and Johnston, Internet Communication Using SIP: Delivering VoIP and Multimedia with Session Initiated Protocol, Wiley, Jul. 2006.
Sinnreich, Johnston, Sparks, and Cerf, SIP beyond VOIP, VON Publishing LLC, Oct. 2005.
Slone, "Local Area Network Handbook," Sixth Edition.
Stallings, Wireless Communications and Networks, Prentice Hall, Nov. 2004.
Sulkin, PBX Systems for IP Telephony, McGraw-Hill Professional, Apr. 2002.
Sweeney, Apress, WiMax Operators Manual: Building 802.16 Wireless Networks, Nov. 2005 (2nd).
Sweeney, Implementing 802.11, 802.16 and 802.20 Wireless Networks: Planning, Troubleshooting, and Operations, Newnes, Jul. 2004.
Tatham and Morton, Developments in Speech Synthesis, John Wiley and Sons, Apr. 2005.
Tsui, Fundamentals of Global Positioning System Receivers: A Software Approach, Wiley-Interscience, Dec. 2004.
Wallingford, VOIP Hacks, Tips and Tools for Internet Telephony, O'Reily Media, Dec. 2005.
Walter and Gilster, "Wireless LANs End to End".
Xiao and Pan, "Wireless Lans And Bluetooth: Wireless Networks And Mobile Computing" (Wireless Networks and Mobile Computing, V. 4).
"Motorola A910 User Guide," Motorola, 2006.
All About Symbian, Proxi Dating for Siemens SX1, Dec. 22, 2004, (Internet Ad Printout).
Author unknown, http://www.bluetooth.com/document/default.asp?page=overview, date unknown, pp. 1-4, Bluetooth—Document Page, Technology Overview.
Cyberlie Underground, New Soft: Proxi Dating (S60), Dec. 15, 2003 (Internet Blog Printout).
Decker, Peter, Bluetooth SIG Automotive workgroup MRD, Bluetooth Doc. No. 8.C.999/0.8xxxxx, Dec. 3, 1999, pp. 1-1.
Dutoit, An Introduction to Text-to-Speech Synthesis, Springer, Oct. 2003.
Event, Matchmaking Devices, (Internet Printout).
Lang, Applications of Ultra Wide Band Wireless, John Wiley and Sons, Sep. 2005.
Lewis, Breaking the Ice 2.0, The Boston Globe, Nov. 15, 2004 (Internet Printout).
My Symbian.com, RingMaster for S60, Dec. 31, 2003, (Internet Blog Printout).
Ohrtman, The WiMax VOIP Presentation, Monnoz Publishing, Nov. 2005.
ProxiDating, User program, Oct. 5, 2003 (Internet Printout).
Raindrop, "Defining Mobile Social Software," et al., Jul. 15, 2004 (Internet Article Print).
Shield Mark in Amsterdam, The service enables the "active search . . . " (Internet Printout).
SmallPlanet, A Social Network featuring CrowdSurfer—the first, mobile.
Software that helps you meet the people around you., 2005 (Internet Article Print).
Stetz, Mobile Cellular Telecommunications, Lee, McGraw-Hill Professional, Feb. 1995.
Sweeney, Newnes, WiMax Operator's Manual: Building 802.16 Wireless Networks, Second Edition, Nov. 2005.
Technology, Mobhappy, Jul. 30, 2004 (Internet Article Printout).
The Cell Phone Hanbook, Aegis Publishing Group, Jun. 1999.
VCS 2030 2060 Voice Dialer User Manual, pp. 1-17, undated.
Voice Dial Information HTTP://wwwcom/swbell/shortsub/voice dial. html, undated.
"Credit History," Investopedia, Retrieved Jan. 7, 2014, from http://www.investopedia.com/terms/c/credit-history.asp.

(56) References Cited

OTHER PUBLICATIONS

Kylanpaa, et al., Nomadic access to information services by a GSM phone, Computer & Graphics, 1996.
Anonymous, ETSI GSM 3.40, "Digital Cellular Telecommunications System (Phase 2+) Technical Realization of the Short Message Service Point/to/Point," v6.0.0, (1998).
Anonymous, "Technical Information Bulletin 03-02, SMS over SS7, National Communication System," Office of the Manager, National Communications System (NCS TIB 03-02), (Dec. 2003).
Non-Final Office Action in U.S. Appl. No. 11/196,951, (dated Oct. 31, 2006).
Response to Non-Final Office Action in U.S. Appl. No. 11/196,951 (dated Feb. 28, 2007).
Final Office Action in U.S. Appl. No. 11/196,951, (dated Nov. 25, 2008).
Response to Final Office Action in U.S. Appl. No. 11/196,951 (dated Jan. 25, 2009).
Advisory Action in U.S. Appl. No. 11/196,951, (dated Mar. 11, 2009).
Appeal Brief in U.S. Appl. No. 11/196,951 (May 3, 2010).
Non-Final Office Action in U.S. Appl. No. 11/196,951, (dated Jun. 9, 2010).
Response to Non-Final Office Action in U.S. Appl. No. 11/196,951 (dated Nov. 5, 2010).
Final Office Action in U.S. Appl. No. 11/196,951, (dated Dec. 21, 2010).
Response to Final Office Action in U.S. Appl. No. 11/196,951 (dated Feb. 7, 2011).
Non-Final Office Action in U.S. Appl. No. 11/196,951, (dated Mar. 2, 2011).
Response to Non-Final Office Action in U.S. Appl. No. 11/196,951 (07/2/201).
Final Office Action in U.S. Appl. No. 11/196,951, (dated Sep. 15, 2011).
Advisory Action in U.S. Appl. No. 11/196,951, (dated Mar. 28, 2012).
Appeal Brief in U.S. Appl. No. 11/196,951 (Apr. 13, 2012).
Notice of Allowance in U.S. Appl. No. 11/196,951, (dated Jun. 25, 2012).
Non-Final Office Action in U.S. Appl. No. 11/513,515, (dated May 18, 2009).
Response to Non-Final Office Action in U.S. Appl. No. 11/513,515 (dated Nov. 18, 2009).
Final Office Action in U.S. Appl. No. 11/513,515, (dated Mar. 5, 2010).
Request for Continued Examination in U.S. Appl. No. 11/513,515 (dated Sep. 7, 2010).
Non-Final Office Action in U.S. Appl. No. 11/513,515, (dated Nov. 12, 2010).
Response to Non-Final Office Action in U.S. Appl. No. 11/513,515 (dated Mar. 14, 2011).
Final Office Action in U.S. Appl. No. 11/513,515, (dated Aug. 15, 2011).
Request for Continued Examination in U.S. Appl. No. 11/513,515 (dated Feb. 13, 2012).
Non-Final Office Action in U.S. Appl. No. 11/513,515, (dated Sep. 20, 2013).
Response to Non-Final Office Action in U.S. Appl. No. 11/513,515 (dated Mar. 20, 2014).
Notice of Allowance in U.S. Appl. No. 11/513,515, (dated Jul. 18, 2014).
Non-Final Office Action in U.S. Appl. No. 13/633,277, (dated Jul. 18, 2013).
Response to Non-Final Office Action in U.S. Appl. No. 13/633,277 (dated Jan. 17, 2014).
Final Office Action in U.S. Appl. No. 13/633,277, (dated Feb. 4, 2014).
Request for Continued Examination in U.S. Appl. No. 13/633,277 (dated Jul. 30, 2014).
Non-Final Office Action in U.S. Appl. No. 13/633,277, (dated Dec. 4, 2014).
Response to Non-Final Office Action in U.S. Appl. No. 13/633,277, (dated Apr. 14, 2015).
Notice of Allowance in U.S. Appl. No. 13/633,277, (dated Jun. 22, 2015).
Non-Final Office Action in U.S. Appl. No. 14/494,386, (dated Jan. 6, 2015).
Response to Non-Final Office Action in U.S. Appl. No. 14/494,386, (dated Jul. 2, 2015).
Non-Final Office Action in U.S. Appl. No. 14/927,832, (dated Feb. 10, 2016).
Response to Non-Final Office Action in U.S. Appl. No. 14/927,832 (dated Feb. 18, 2016).
Final Office Action in U.S. Appl. No. 14/494,386, (dated Dec. 17, 2015).
Response to Final Office Action in U.S. Appl. No. 14/494,386 (dated Feb. 23, 2016).
Non-Final Office Action in U.S. Appl. No. 14/494,386 (dated Sep. 13, 2016).
Response to Non-Final Office Action in U.S. Appl. No. 14/494,386 (dated Jul. 24, 2017).
Notice of Allowance in U.S. Appl. No. 14/494,386 (dated Aug. 21, 2017).
Non-Final Office Action in U.S. Appl. No. 15/225,743 (dated Oct. 18, 2017).
Response to Non-Final Office Acton in U.S. Appl. No. 15/225,743 (dated Apr. 18, 2018).
Final Office Action in U.S. Appl. No. 15/225,743 (dated Aug. 23, 2018).
Response to Final Office Action in U.S. Appl. No. 15/225,743 (dated Oct. 30, 2018).
Advisory Action in U.S. Appl. No. 15/225,743 (dated Nov. 13, 2018).
Request for Continued Examination in U.S. Appl. No. 15/225,743 (dated Apr. 19, 2019).
Non-Final Office Action in U.S. Appl. No. 15/225,743 (dated Apr. 9, 2020).
Non-Final Office Action in U.S. Appl. No. 15/169,862 (dated Jun. 12, 2018).
Response to Non-Final Office Action in U.S. Appl. No. 15/169,862 (dated Dec. 11, 2018).
Non-Final Office Action in U.S. Appl. No. 15/169,862 (dated Mar. 14, 2019).
Response to Non-Final Office Action in U.S. Appl. No. 15/169,862 (dated Sep. 10, 2019).
Final Office Action in U.S. Appl. No. 15/169,862 (dated Nov. 18, 2019).
Response to Final Office Action in U.S. Appl. No. 15/169,862 (dated Nov. 25, 2019).
Notice of Allowance in U.S. Appl. No. 15/169,862 (dated Jan. 8, 2020).
Non-Final Office Action in U.S. Appl. No. 15/590,267, (dated Jun. 11, 2019).
Response to Non-Final Office Action in U.S. Appl. No. 15/590,267 (dated Oct. 10, 2019).
Final Office Action in U.S. Appl. No. 15/590,267, (dated Dec. 19, 2019).
Final Office Action in U.S. Appl. No. 15/590,267, (dated Jun. 15, 2020).
Request for Continued Examination in U.S. Appl. No. 15/590,267 (dated Sep. 3, 2020).
Notice of Allowance in U.S. Appl. No. 15/590,267 (dated Sep. 23, 2020).
Aug. 3, 2005, U.S. Appl. No. 11/196,951, Non-Provisional Utility, U.S. Pat. No. 8,295,851 (Oct. 23, 2012).
Aug. 30, 2006, U.S. Appl. No. 11/513,515, CIP of U.S. Appl. No. 11/196,951, U.S. Pat. No. 8,880,047 (Nov. 4, 2014).
Oct. 2, 2012, U.S. Appl. No. 13/633,277, Continuation of U.S. Appl. No. 11/196,951, U.S. Pat. No. 9,178,991 (Nov. 3, 2015).
Sep. 23, 2014, U.S. Appl. No. 14/494,386, Continuation of U.S. Appl. No. 11/513,515 CIP of U.S. Appl. No. 11/196,951, U.S. Pat. No. 9,842,442 (Dec. 12, 2017).

(56) References Cited

OTHER PUBLICATIONS

Oct. 30, 2015, U.S. Appl. No. 14/927,832, Continuation of U.S. Appl. No. 13/633,277, Abandoned.
Jun. 1, 2016, U.S. Appl. No. 15/169,862, Continuation of U.S. Appl. No. 14/927,832, U.S. Pat. No. 10,628,464 (Apr. 21, 2020).
Aug. 1, 2016, U.S. Appl. No. 15/225,743, Continuation of U.S. Appl. No. 14/494,386 CIP of U.S. Appl. No. 11/196,951, Pending.
May 9, 2017, U.S. Appl. No. 15/590,267, Continuation of U.S. Appl. No. 15/169,862, Pending.
Jan. 27, 2020, U.S. Appl. No. 16/773,452, Continuation of U.S. Appl. No. 15/225,743 CIP of U.S. Appl. No. 11/196,951, Pending.

* cited by examiner

FORWARDING ACTION FOR
<HOMENET>

1   CALLS TO 217 555 1212

2   SMS MESSAGE TO <MYID>
    ON YAHOO MESSENGER

3   EMAILS TO MYLOGIN@MYISP.COM

CLICK <NEXT> FOR MORE
ASSOCCIATED ACTIONS,
ITEM NUMBER TO EDIT,
<MENU> TO ADD

<NEXT>                    <MENU>

FIG. 4

ROAMING PROFILE

WHEN MOBILE, I.E. NO LOCATION DEFINED, DO:

1) RING & VIBRATE

2) AUTO RESPOND MESSAGE
   - "OUT AND ABOUT AT" #GPS_LOCATION

3) AVATAR
   - AVATAR 3

4) RINGTONE
   - SIREN

⟨ADD ACTION⟩   ⟨MENU⟩

FIG. 6

```
ASSC. FOR PERSONAL NUMBER
0123456789
```

111-222-3333 (POTS OFFICE)
- ONLY 9-5 WEEKDAYS 444-555-6666 (CELL)

777-888-9999 (VOIP)

987-654-3210 (POTS HOME)

654-321-0987 (POTS MOM)
- ONLY SUNDAY 12:00-5PM

SPECIAL INSTRUCTION

- SUNDAY 8AM - 11AM
  - NO CELL RING

CELL PHONE CONTROL OF VEHICLE SETTINGS AND ACTIONS

CROSS REFERENCE TO RELATED APPLICATIONS

This application is a continuation of pending application Ser. No. 15/225,743, filed Aug. 1, 2016, which is a continuation of application Ser. No. 14/494,386 (now issued U.S. Pat. No. 9,842,442), filed Sep. 23, 2014, which is a continuation of application Ser. No. 11/513,515 (now issued U.S. Pat. No. 8,880,047), filed Aug. 30, 2006, which is a continuation in part of application Ser. No. 11/196,951 (now issued U.S. Pat. No. 8,295,851), filed Aug. 3, 2005, all of which are herein incorporated by reference. Reference is also made to related application Ser. No. 13/633,277 (now issued U.S. Pat. No. 9,178,991), filed Oct. 2, 2012, related pending application Ser. No. 15/169,862, filed Jun. 1, 2016, related pending application Ser. No. 15/590,267, filed May 9, 2017, and related pending application Ser. No. 16/773,452, filed Jan. 27, 2020.

BACKGROUND OF THE INVENTION

The modern cell phone is used for much more than voice communications. With the introduction of cellular data networks and protocols, cell phones have becomes tools for surfing the net, sending and receiving email, text and multimedia messaging, streaming video and audio, internet messaging and chatting, position location devices (via GPS), on and on (hence their common name of "smart phone" or "Swiss-army phone" in many circles). In recent times, with wide area wireless internet (e.g., on college campuses) and Voice Over Internet Protocol, the division has blurred between cell phone, hand-held PDA, ultra-portable computer, and laptop computer. The systems and methods disclosed below with respect to the common cell phone are equally applicable, with simple modification, to all forms of portable communication devices.

All radio communication devices are susceptible to common problems such as poor radio reception or transmission, limited battery life, etc. Additionally, cell phones are less than ideal as data devices due to their small screen, cumbersome input methods (typically requiring using the keypad designed for numeric entry as an alphanumeric input device), etc. Still, many find the portability of such mobile communication devices to be their main advantage. However, it is also true that when one needs reliable or clearer communications, easy input, fast input, larger screen, etc., most will tend toward computers with their full size keyboards, land line phones, voice over IP (VOIP) phones, etc.

Indeed, many times a person is called on his cell phone when at home or at the office, and one of the first things he or she may say is, "I'm at home, let me call you on the land line." Other times, a person may receive an email or web link on his cell phone or PDA while at the home or office, and rather than respond or surf the web immediately on a limited screen, he will move to a 'regular' computer or laptop so that he may more easily type his response or surf the website even though the computer does not have the weblink or email immediately available. At other times, a person may be chatting with another through one of the many popular internet chat programs via his cell phone, while he is at home or office, and may greatly prefer to use his computer. However, often, the person will continue chatting on the cell phone because that was the system by which he was contacted. In another case, a user may be called out hurriedly from his home or office and he rushes out with his cell phone, and later wishes he would have forwarded his home or office phone after he has left.

Wireless networks are well known in the art. WIFI-equipped (802.11-based wireless communication) and Bluetooth-equipped cell phones, networks and computers are all known. With Ultra wideband standards having been adopted by the industry, it will not be long before cell phones, computers, etc., using this wireless standard (probably in the form of wireless USB or Firewire) will be in the marketplace. There will certainly be other wireless networking or interconnect technologies adopted such as WiMax, etc. Additionally, RFID tags as well as other near-field communication methods are also known, as are cell phones equipped with GPS for position determination. (see for example, US Patent Application 2006/0172736 incorporated herein by reference)

However, as regards the problem of providing the best communication system and method for the mobile user with cell or smart phone, these technologies are underutilized. What is needed is a cell phone or other portable communication device that provides the convenience of portability, but also has the capability of supporting the best communication mode depending on the user's current location, the availability of alternative communication devices, and user-defined preferences. Thus, for example, when a cell phone or other portable or wireless communication device is near another device, wireless network or location that provides better, cheaper, more reliable, more convenient, or more desirous communications devices or methods than the cell phone, calls can be routed to the alternative devices at these locations.

SUMMARY OF THE INVENTION

It is an object of the invention to provide portable or wireless communication devices that automatically determine their respective locations, or proximity to other alternative communication devices or networks (including land line, wired or other wireless devices), and automatically forward information (e.g., voice or data) or connections (e.g., logon data) from one communication device to another selected or preferred communication device.

It is an object of the invention to automatically forward information and/or connections destined for a mobile or wireless communication device (such as a cell phone or PDA), to an alternative preferred communication device of the user's selection (such a preferred land line, wired or other wireless device, VOIP number, etc.) based upon the determined location of the mobile/wireless communication device.

It is an object of the invention to automatically forward information and connections destined for a portable or wireless communication device (such as a cell phone or PDA), to an alternate preferred communication device of the user's selection (such a preferred land line, wired or other wireless device, VOIP number, etc), based upon the proximity of the portable/wireless communication device to a the preferred or alternate device or to a wireless- or wired-network on which the alternate preferred device is operating.

It is an object of the invention to provide systems and methods for designated preferred communication devices and automatic information/call/connection routing preferences for a user of mobile, cellular, wireless, wired and other communication devices, for example, based on the immediate relative or determined location of the devices.

It is an object of the invention to automatically forward information destined for a cell phone to a land-based phone or VOIP phone based upon the cell phone's proximity to the land-line phone or a wireless network or interconnect with which the cell phone has been instructed to associate the land-line phone.

It is an object of the invention to automatically forward information and current connections (including, for example, personal logon data, current viewed web site, current chatting sessions, etc.) to and from a portable or wireless communication device (such as a cell phone or PDA), to and from an alternate preferred communication device of the user's selection (such a preferred land line, computer, wired or other wireless device), based upon the proximity (or lack thereof) of the portable/wireless communication device to a the preferred/alternate device or to a wireless or wired network on which the alternate/preferred device is operating.

It is an object of the invention to enable the cell phone microphone and/or speaker to become a wireless peripheral(s) for a given computer.

It is an object of the invention to enable a cell phones or other portable or wireless communication devices to automatically determine the connection information (e.g., telephone number, data service screen name (such as a chat screen name), etc.) of certain land line phones or other alternate communication devices in their immediate vicinity.

It is an object of the invention to automatically forward information (voice or data) destined for a computer, land line or other communication device to a preferred cell phone or other portable/wireless communication device of the user's choosing, based upon the location of the portable/wireless communication device.

It is an object of the invention to automatically forward information destined for a computer, land line or other communication device to a preferred cell phone or other portable/wireless communication device based upon the lack of proximity of the portable/wireless communication device to a wireless network on which the wired communication device is attached.

It is an object of the invention to automatically transfer internet or other login data, and if desired, some buffered data (for example, to allow easy or guaranteed continuation of the conversation or operation), from a cell phone or other portable or wireless communication device to a computer based on the location of the portable communication device.

It is an object of the invention to automatically transfer internet login or other data from a cell phone or other portable communication device to a computer based upon the proximity of the portable communication device to a wireless or wired network on which the computer is operating.

It is an object of the invention to automatically transfer internet login or other data (including, if desired, a defined amount of buffered data) from a computer to a cell phone or other communication device based on the location of the communication device, including its proximity or lack thereof to a defined location (such as a wired or wireless network, or RFID tag, GPS position determination, etc).

It is an object of the invention to electronically tag land line phones or wired communication devices with a wirelessly readable tag or identifier containing information about the communication device (such as a phone number of the land line, IP address, network id, etc.).

It is an object of the invention to electronically tag cellular phones or other wireless communication devices with a wirelessly readable tag or identifier containing unique information about each wireless device so tagged.

It is an object of the invention to automatically or on a programmed basis disable only a driver's cell phone or wireless communication device in an automobile.

It is an object of the invention to enable a cell phone or other portable/wireless communication device to automatically allow only certain, user specified, wireless devices or networks to wirelessly interconnect or network to the cell phone or be recognized by the cell phone as being authorized wireless networks, interconnects or devices.

It is an object of the invention to enable a Bluetooth equipped cell phone to only grant access to a Bluetooth querying device which properly answers a challenge issued by the Bluetooth-equipped cell phone.

It is an object of the invention to enable a cell phone or other portable or wireless communication device to automatically perform user-specified actions at user specified locations under user specified conditions.

It is an object of the invention to automatically cause an icon or status message displayed by an internet messenger application on the display of others to change in accordance with the user's location.

It is an object of the invention to create a home automation system that tracks a user and automatically performs certain actions based on the user's location, direction of travel, or likely destination.

It is an object of the invention to enable a cell phone or other portable or wireless communication or computing device to automatically perform certain operations, enable/disable certain features, or change certain settings based upon recognition of an identifying characteristic (such as the caller ID field, email address or detection of a screen name, handle, nickname, etc.) of an incoming call or message.

It is an object of the invention to enable a cell phone or other portable or wireless communication or computing device to automatically send a specified or user defined message (i.e., text, voice or data) in response to a received text message, email or an incoming phone call, which message can vary depending on the location of the user's wireless device.

It is an object of the invention to enable a cell phone to use the internet to translate a coordinate-designated current location determined by the cell phone into a common name designation of that same position and to automatically message that information to a caller or to one who is called.

It is an object of the invention to enable a computer to determine the likely destination of a cell phone or portable communication/computing device that it is tracking, based upon comparison to previous destinations resulting from similar movements of the portable device.

It is an object of the invention to enable a computer to use predicted destination information to perform an action, such as home automation control, based upon the predicted destination.

It is an object of the invention to enable a cell phone or other portable communication or computing device to automatically respond to an incoming call with visual information, audible sounds (e.g., ring tones), text or other data directed to the caller, which information can vary depending on the location of the user's wireless device.

It is an object of the invention to enable a cell phone or cell system to generate ring tones to replace the familiar line ringing a user hears when he places a call from the cell phone.

It is an object of the invention to enable the cellular system to store visual, auditory, and/or textual information and to associate the information with a cell phone number, to have that information sent to the caller of the cell phone number or to one called by the cell phone having the cell phone number, and if desired, to vary the information depending on the location of the user's wireless device.

It is an object of the invention to enable the cell phone or other portable or wireless communication device to select one of a plurality of possible outgoing informational messages, such as text, ring tone, icon, visual, etc. to be sent to one who is calling or called, or messaging, the device. Such selection may be based on the user's choice, his location, the called or calling number, etc.

It is an object of the invention to enable a cell phone or other portable or wireless communication device to give an audible or other attention-grabbing alert (such as a vibration) whenever the device is performing an outgoing operation, such as doing any of either sending a message, placing a call, receiving commands, transferring data or logging onto a network or website, etc. at the instruction of a remote source or under remote control.

It is an object of the invention to enable a cell phone or other portable or wireless communication device to give an easily recognized and attention-getting alert, other than simple visual alert, whenever it is engaged or initially engages in wireless communication with another device or network.

It is an object of the invention to detect a driver's cell phone or other portable/wireless communication device from among a possible plurality of such devices located in a vehicle, and then selectively disable only the driver's device from operation.

It is an object of the invention to disable the driver's cell phone or portable/wireless communication device preferably when the vehicle is moving or is engaged to move.

It is an object of the invention to wirelessly recharge a cell phone or portable/wireless communication device by the power transferred from a near field (including RFID) transceiver or transmitter.

It is an object of the invention to replace the typical keyless entry system and/or keyless ignition system found on automobiles by enabling the automobile to detect and/or recognizing a unique identifier in the operator's cell phone or other portable/wireless communication device.

It is an object of the invention to customize the driving controls of a vehicle by recognizing a user's cell phone or other portable/wireless communication device.

It is an object of the invention to alert other drivers that a cell phone or portable/wireless communication is in use in a proximate vehicle.

It is an object of the invention to enable a cell phone or other portable/wireless communication device to store vehicle information, including programmable settings for the vehicle.

It is an object of the invention to enable a cell phone or other portable/wireless communication device to store issuer-verifiable transaction receipt information.

It is an object of the invention to enable a cell phone or other portable/wireless communication device to have a plurality of default status or operation profiles automatically selectable based on location, time, day, or other monitored condition.

It is an object of the invention to enable a cell phone or other portable/wireless communication device to selectively block certain, so-called, "ringback messages" or all ringback messages and/or to substitute sounds or messages of the user's choosing.

It is an object of the invention to enable a cell phone or other portable/wireless communication or computing device to detect that it is on the user's person or that it is proximate to a user and to autonomously change its mode of operation in accordance with such detection.

It is an object of the invention to allow a user of a cell phone or other communication device to store parts of at least a received voice conversation for later reference.

It is an object of the invention to enable a cell phone or other portable/wireless communication device to transcribe into text, at least a portion of a received voice cell phone conversation.

It is an object of the invention to enable a cell phone or other portable/wireless communication device to transcribe into audio information at least a portion of a received text, video, MMS, email, etc. message, and to play the audio information to the user.

It is an object of the invention to enable a cell phone or other portable/wireless communication device to assist a user in finding an item while shopping, or assist in finding the best price for an item when the item is available from multiple regionally (or geographically-local) available venders.

It is an object of the invention to enable a cell phone or other portable/wireless communication device to inform the user of various retail store specials (such as discounted items, coupons, advertised and/or unadvertised goods or services) that are available at a store when the user is in or near the store.

It is an object of the invention to provide a system and method whereby, in response to one calling another, the caller is sent a data message containing a URL, IP address, or is pushed an internet webpage for display on the caller's calling device (e.g., his cell phone, PDA, computer, etc).

It is an object of the invention to enable a cellular or wireless communication system to transcribe into text, at least a portion of an indicated cellular voice conversation.

It is an object of the invention to enable a cell phone or other portable/wireless communication device to use loss of reception of GPS information as a 'switch' for enabling/disabling certain cell phone or communication features or operations.

It is an object of the invention to enable a cell phone or other portable/wireless communication device to switch between different call transport physical systems automatically and according to certain defined criteria or user wishes.

It is an object of the invention to enable a system to automatically determine the number of one who is calling his or her communication device, and to respond to the caller by SMS or MMS message, wherein the SMS or MMS message may contain a URL or IP address of a web site associated with the called party.

It is an object of the invention to enable a cell phone and/or telephone system to switch a call between different call transport systems (e.g., cell, land, VOIP) automatically, while a call is in progress.

It is an object of the invention to enable one to have a single calling number to which another may place a call, and to have the call delivered to him or her on different systems and/or to different receiving devices without the caller having specific knowledge of which device is actually being used or their alternative numbers.

It is an object of the invention to allow a caller to direct a call to a specific device associated with an intended call recipient but where the caller does not have immediate access to the physical call number of the specific device It is an object of the invention to enable different call devices to be used collectively as a virtual party line without having to establish a conference call.

It is an object of the invention to enable a data delivery system that directs the same data to different devices associated with a single user.

These and other objects are achieved by systems and methods that automatically forward calls between a user's mobile communication device and an alternative communication device. A user configures his mobile communication device with a location determining device. The location determining device is operated to periodically identify the location of the mobile communication device. The user's mobile communication device is also configured with user-defined preferences. Those preferences define at least one location that, if approached by the user's mobile communicate device, will initiate a call forwarding operation from the user's mobile communication device to the user's alternative communication device. The preferences also include an identifier for the user's alternative communication device to which the call will be forwarded. If the location determining device determines that the user's mobile communication device is within range of the user-defined location, the method automatically forwarding incoming calls intended for the user's mobile communication device to one the alternative communication device identified in the user's defined preferences.

According to the systems and methods, the user defines multiple locations and multiple alternative communication devices. Further, selected alternative communication devices are associated with specific geographic locations. For example, the user's mobile communication device may be a cell phone, and the alternative communication devices may be selected from among: land-line phones, computers configured with VOIP, pda's, and other cell phones.

According to the systems and methods, the location determining device may comprises a GPS receiver operable to determine the GPS position of the user's cell phone. Alternatively, the location determining device comprises a wireless network interface operable to determine whether the user's mobile communication device is within operating range of defined wireless computer networks. Thus, for example, the user's mobile communication device may be a cell phone, and the alternative communication devices may comprise a computer with VOIP capabilities operating on the wireless network.

According to the systems and methods, an existing call may be automatically and seamlessly, transferred from the user's cell phone to the VOIP capable computer operating on the defined wireless network without terminating the existing call. In this form of the invention, the transferring operation may, if desirable, include buffering of voice or data communications occurring in the call and transferring the buffered voice or data to the VOIP capable computer operating on the defined wireless network. The voice and data can include a conversation, instant message session, web surfing session, etc.

The above and other objects are achieved by systems and method that automatically adjust the operating parameters of a user's cell phone. A user configures his cell phone with a location determining device and with user-defined operating parameters that differ depending on the location of the cell phone. The location determining device is operated to periodically identify the location of the user's cell phone. The operating parameters of the cell phone are automatically switched depending on the currently identified location of the user's cell phone phone in accordance with the user's defined preferences.

According to the systems and methods, the user defined operating parameters may include the identification of multiple locations and specific call preferences associated with each of the multiple locations. In one form, the location determining device comprises a GPS receiver operable to determine the GPS position of the user's cell phone. In another form, the location determining device comprises a wireless network interface operable to determine whether the user's cell phone is within operating range of defined wireless computer networks.

According to the systems and methods, any of a number of operating parameters can be varied. For example, one of the operating parameters that is adjusted includes the ringing characteristics for the cell phone (e.g., volume, ring tone, etc.). In another example, the operating parameters that are adjusted include information about the user that is identified to the calling party when the user's cell phone is called.

According to the systems and methods, operating parameters can also be varied based on determining whether the cell phone has left the operating range of a defined wireless network or location. For example, the user-defined preferences may include the identity of an alternative communication device employed by the user and, when the location determining device determines that the user's cell phone is outside of preferred range of the alternative communication device, instructing the user's alternative communication device to forward calls intended for it to the user's mobile communication device. Still further, in accordance with this embodiment, existing calls may be seamlessly transferred from the alternative communication device to the user's mobile communication device. As above, data may be buffered to assist the transfer operation.

According to the various aspects of the invention, a cell phone or other portable or wireless communication device is equipped for detecting when it is within a WIFI network, near a Bluetooth-equipped device, near an RFID tagged land line, near an optical (typically IR) communication equipped device, etc. and is operable for forwarding or transferring of any or all of voice, text, multimedia, etc. communications directed to the wireless communication device. Forwarding or transferring is preferably to any of nearby devices that it detects or of which it has been informed that exist in the location that the cell phone has detected the wireless networking, RFID tagged area, etc.

For instance, when a cell phone detects the user's home WIFI network, it will automatically forward phone calls to the user's land line or VOIP phone. Similarly, SMS, text, multimedia messages can be forwarded to a chosen computer in the user's home, emails are forwarded to the users home email address, etc. Furthermore, in one application, computers or other electronic devices are equipped or programmed to sense the cell phone's presence and when the user's cell phone is out of range, the computer or other electronic device will forward emails in his home account, received text messages, VOIP calls, etc to the user's cell phone address and/or number. In this way email, text, voice, multimedia, etc., migrates around the planet with the person and rests at the most appropriate place at any given time.

Additionally, according to another aspect of the invention, a land line phone, communication device, or computer is RFID tagged, bar coded, etc. with its telephone number, IP address, or equivalent address, and a cell phone or other portable/wireless communication device is operable for detecting and reading this RFID or bar code, and can automatically or by direction of the user forward calls, chats, internet sessions, etc. to the detected address of the wired computer or number of the land line phone. Other forwarding is preferably done to computing devices that the user has associated with the scanned telephone number, such as emails, messages, internet logins, etc. Such forwarding is preferably to an IP address, an email address, a DNS host name, etc.

In this way, the cell phone (or other portable/wireless communication device) acts as a 'cell' device itself directing the user's communication to the most salient and authorized device when in range, thus minimizing the cell phone's use and maximizing its battery power, and preferably, making use of better connections. Basically, according to this aspect of the invention, the cell phone or wireless/portable communication device is actually used for communication purposes only when it can find nothing else nearby to which to forward messages or voice (or nothing nearby to which it is allowed to forward by the user).

Similarly, the user's land line phone, VOIP system, network, Bluetooth device, computer, or etc. detects the presence/absence of the user's cell phone and causes calls placed to the land line, VOIP system, emails to the computer, etc. to be forwarded to the user's cell phone when the cell phone is detected as being absent from the local wireless network or wireless detection system. In another application, the cell phone forwards messages, voice calls, chat sessions, etc., based on its GPS location to predetermined devices associated with that location.

In another application, user specified devices such as computers, land line phones, VOIP phones, etc. forward communications to a cell phone based upon the cell phone's location. For instance, a user may indicate that when he is at his home GPS location, the cell phone causes calls to his cell phone to be forwarded to his home number or that the cell phone goes to silent (e.g., vibrate) mode or forwards emails to his home computer, etc. and all without necessitating cellular system knowledge of his location or cellular system involvement with instructing the phone to do so (though the cellular system may be involved in the actual forwarding operation). Additionally, home devices, such as the land line phone, computer, etc. can be instructed and/or controlled so that those devices forward or cause to forward information to the cell phone when it is away from the home GPS location. This can be accomplished by the device(s) tracking the cell phone's location (directly or indirectly), or by the cell phone reporting to these device(s) that they should forward themselves due to the cell phone's knowledge of its location.

Preferably, the cell phone determines and keeps track of its location. One way to accomplish this is by the cell phone receiving GPS information from GPS satellites, time differencing of multiple cellular signals, or other methods as are known in the art. The user indicates locations or areas to the cell phone and associates certain features, operations, status, control, messages, etc. that should be performed or enabled/disabled or sent by the cell phone whenever the cell phone is in these areas. These features, operations, status, etc., are contemplated to include automatic forwarding of information destined for his cell phone, ring status settings, automatic sending of text or multimedia messages, automatic sending of status messages, automatically changing ring tones, automatic display or sending of an image such as an avatar, automatic sending of commands for remote control of home automation, automatic syncing with another device, automatic updating of information, automatic downloading or uploading of information from/to the internet, etc. Thereafter, the cell phone autonomously tracks its own location and implements the user's designations accordingly. In this way, the user maintains a "location-based user profile" on his cell phone that is automatically implemented by his cell phone. Beneficially, this is accomplished without cellular system, tracking system, etc. involvement and so his location remains secret in this regard.

For example, the user can inform the cell phone of the location (may be more than one GPS coordinate point) of his home and indicate to the phone that all calls placed to his cell phone while in this area, should be forwarded to his home line or that his cell phone should not audibly alert him to incoming calls, etc. As a further example, he may also indicate that all emails, text, or multimedia messages should be forwarded to his home email address, etc., when at a designated location. It is contemplated that forwarding of information need not be limited to that which arrives after forwarding has been implemented. In many cases, forwarding of all information received throughout the day and presently stored in the cell phone may be beneficial (this is contemplated to be done by using the email, MMS, internet, etc system rather than by typical syncing methods so that the information may be forwarded regardless of the proximity of a device. For example, a user may wish to forward information to his home computer over the internet when he arrives at his hotel room.)

In another example, a user can indicate his office location to the cell phone and indicate that calls placed to his cellular number be forwarded to his office phone when his cell phone is in the office area and also forward messages that were left on his cell number before the cell phone was forwarded. As another example, the user can indicate the position of his church to the cell phone and indicate that calls be automatically forwarded to another number, or that he will not answer so that a message is immediately taken without ringing his phone, or that his phone be forced to vibrate rather than ring regardless of its default settings. He can indicate a certain location and direct that the cell phone automatically connect to the internet and download or upload certain information when at that location. In another example, the cell phone is directed to automatically send location-based status messages to others.

It is contemplated that the various aspects of the invention may be used by many of the popular chat services, such as Yahoo messenger, MSN messenger, AIM (AOL Instant Messenger), ICQ, Google Talk, etc and other internet services that typically require a login. Many of these services allow a user to log in to their services from a computer or a mobile application running on the user's cell phone or PDA. In some cases, such as with Yahoo messenger, the user can log in to the chat service from their computer and then later select from their computer Yahoo Messenger program that their mobile device be logged into the service, typically replacing the computer login. This is done without needing to even touch the cell phone. All that is required is that it be on and have Yahoo Mobile Messenger installed. Thus, implementing the various aspects of the invention, the system can be made to automatically transfer the user's login based on his location and/or status, for example, upon detection of a specified network (or the cell being in the WIFI network), etc.

For example, a user logs in to Yahoo chat service from say, his computer, and the computer or messenger program itself is operable for receiving position information from the user's mobile device (via the internet, for example, as is known in the art) or sensing the user's mobile device proximity to the logged-in computer via Bluetooth, WIFI, etc., or any other methods disclosed more fully below. Whenever, his mobile device is near the computer, the invention operates to ensure that he is logged in to the chat or other service from the computer. When it is automatically learned that his cell phone is away from the computer, either by GPS coordinates or breaking the Bluetooth, WIFI, RFID, etc. connection or other method, the login is automatically transferred to his cell phone. When he is again within proximity to his computer, the login transfers back to this computer, and so on. Thus, his login roams with him, automatically. This example use has utility far beyond chat programs, a chat program example having been chosen only to illustrate the roaming login aspect of the invention.

In another application, home devices are automatically controlled based on the cell phone location. In another application, the cell phone and a vehicle coordinate so that the cell phone becomes the keyless entry (and/or ignition system) for the vehicle. In another application of the invention, the cell phone is capable of being disabled when behind the wheel of a vehicle. Other applications benefiting from the various aspects of the invention will be obvious to those skilled in the art from the detailed description below.

As will be described below in more detail, the various aspects of the inventions are applicable to communication technologies other than cellular. For example, one contemplated area of application is in communication and data devices utilizing the fast-emerging "WiMax" technology known in the art. Other communication technologies can also make use of the various aspects of the invention, for example, UMTS-based communications.

The aspects and applications of the invention presented here are described below in the drawings and detailed specification. Unless specifically noted, it is intended that the words and phrases in the specification and the claims be given the plain, ordinary and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition from that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term or phrase is intended to be further characterized or specified, or narrowed in some way, then such noun, term or phrase will expressly include additional adjectives, descriptive terms or other modifiers in accordance with the normal precepts of English grammar. Absent the use of such adjectives, descriptive terms or modifiers, it is the intent that the such nouns, terms or phrases be given their plain and ordinary English meaning to those skilled in the applicable arts as set forth above.

Further, the inventors are fully informed of the standards and application of the special provisions of 35 U.S.C. 112, Paragraph 6. Thus, the use of the words "function," "means" or "step" in the Detailed Description or Description of the Drawings or claims is not intended to somehow indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically and expressly state the exact phrases "means for" or "step for," and will also clearly recite "a function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. 112, Paragraph 6. Moreover, even if the provisions of 35 U.S.C. 112, Paragraph 6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

So as to reduce the complexity and length of the Detailed Specification, and to fully establish the state of the art in certain areas of technology, Applicant herein expressly incorporates by reference all of the following materials identified in each numbered paragraph below:

1. For information on WiMax, applicants incorporate the following references: *WiMax Handbook*, Ohrtman, McGraw-Hill Communications, May 2005; *WiMax Crash Course*, Shepard, McGraw-Hill Osborne Media, May 2006; *Implementing 802.11, 802.16, and 802.20 Wireless Networks: Planning, Troubleshooting, and Operations*, Sweeney, Newnes, July 2004; *WiMax Operator's Manual: Building 802.16 Wireless Networks, Second Edition*, Sweeney, Newnes, November 2005; *The WiMax VOIP Presentation*, Ohrtman, Monnoz Publishing, November 2005; *WiMax: Technology for the Last Mile*, Nuaymi, Halsted Pr, January 2007; *WiMax Operators Manual: Building 802.16 Wireless Networks*, Sweeney, Apress, November 2005 ($2^{nd}$).

2. For information on VOIP, applicants incorporate the following references: *Voice Over IP Fundamentals*, Davidson, Peters, and Grace, Cisco Press, March 2000; *Switch to VOIP*, Wallingford, O'Reilly Media, June 2005; *VOIP Hacks, Tips and Tools for Internet Telephony*, Wallingford, O'Reilly Media, December 2005; *SIP beyond VOIP*, Sinnreich, Johnston, Sparks, and Cerf, VON Publishing LLC, October 2005; *Voice Over IPv6*, Minoli, Newnes, April 2006; *Internet Communication Using SIP: Delivering VoIP and Multimedia with Session Initiated Protocol*, Sinnreich and Johnston, Wiley, July, 2006 ($2^{nd}$); *Voice, Video, and Data Network Convergence: Architecture and Design, From VoIP to Wireless*, Ellis, Pursell, and Rahman, Academic Press, May 2003; *Softswitch: Architecture for VoIP*, Orhtman, McGraw-Hill Professional, December 2002; *PBX Systems for IP Telephony*, Sulkin, McGraw-Hill Professional, April 2002; and *Carrier Grade Voice over IP*, McGraw-Hill Professional, September 2002.

3. For more information on cellular and wireless communication systems, operations, protocols, etc., applicants incorporate the following references: *Wireless and Cellular Communications*, Lee, McGraw-Hill Professional, October 2005 ($3^{rd}$); *Wireless Communications, Principles and Practice*, Rappaport, Prentice Hall PTR, December 2003 ($2^{nd}$); *Wireless Communications and Networks*, Stallings, Prentice Hall, November 2004 ($2^{nd}$); *Mobile Cellular Telecommunications*, Lee, McGraw-Hill Professional, February 1995; *The Cell Phone Handbook*, Stetz, Aegis Publishing Group, June 1999; *Cellular Radio Handbook*, Boucher, Quantum Publishing, January 1995 ($3^{rd}$); *Cellular Telephone and Pagers: An Overview*, Gibson, Newnes, November 1996; *Introduction to GSM*, Harte, Althos, October 2004, *GSM Switching, Services, and Protocols*, Eberspaecher et al, John Wiley and Sons, April 2004 ($2^{nd}$); *Signalling System No. 7: Protocol, Architecture and Service*, Dryburgh and Hewett, Cisco Press, August 2004; *Internet Communications using SIP*, Johnston, Artech House Publishers, November 2003; *UMTS Networks: Architecture, Mobility, and Services*, Karranen et al, John Wiley and Sons, April 2005; *UMTS Signaling: UMTS Interfaces, Protocols, Message Flows and Procedures Analyzed and Explained*, Kreher and Ruedebusch, John Wiley and Sons, April 2005; and *WCDMA for UMTS: Radio Access for Third Generation Mobile Communications*, Holma and Toskala, John Wiley and Sons, September 2004.

4. For information about land-line telephone systems (so called POTS), applicants incorporate the following references: "*Introduction to Telephones and Telephone Systems*, Noll, Artech House Publishers, March 1999; *Digital Telephony*, Bellamy, Wiley-Interscience, February 2000; *Signaling in Telecommunication Networks*, Bosse, Wiley Interscience, January 1997; *Telecommunication System Engineering*, Freeman, John Wiley and Sons, June 2004; and *Introduction to Public Switched Telephone Networks*. Harte and Flood, Althos, May 2005 ($2^{nd}$).

5. For information on WIFI, Bluetooth, UWB, Wireless USB, etc., applicants incorporate the following references: 802.11 *Wireless Networks: The Definitive Guide*, Gast and Gast, O'Reilly Publishing, April 2002; *Wi-Fi Handbook: Building 802.11b Wireless Networks*, Ohrtman and Roeder, McGraw-Hill Professional, April 2003; *The Basics of 802.11*, Groom, Groom, and Jones, International Engineering Consortium, June 2005; *Hotspot Networks: Wifi for Public Access Locations*, Minoli, McGraw-Hill Professional, September 2002; *Service Assurance for Voice over WiFi and 3G Networks*, Lay, Khare, and Chang, Artech House Publishers, August 2005; *Wifi Security*, Curran, BookSurge Publishing, September 2004; *The IEEE 802.11 Handbook: A Designer's Companion*, O'Hara and Petrick, Institute of Electrical and Electronic Engineers, March 2005 ($2^{nd}$); *Implementing 802.11 with Microcontrollers: Wireless Networking for Embedded System Designers*, Eady, Newnes, September 2005; 802.11 *WLANs and IP Networking: Security, QoS, and Mobility*, Prasad and Prasad, Artech House Publishers, April 2005; *Wireless Communication Standards: A Study of IEEE 802.11, 802.15, and 802.16*, Cooklev, IEEE Press, August 2004; *Bluetooth End to End*, Baker, Glister and Glister, Wiley, January 2002; *Bluetooth Application Programming with Java APIs*, Kumar, Kline and Thompson, Morgan Kaufman, September 2003; *Bluetooth: Operation and Use*, Morrow, McGraw-Hill Professional, June 2002; *Bluetooth Profiles*, Gratton, Prentice Hall PTR, December 2002; OFDM-Based Broadband Wireless Networks: Design and Optimization, Liu and Li, Wiley-Interscience, November 2005. *An Introduction to Ultra Wide Band Communications Systems*, Reed, Prentice Hall PTR, April 2005; *Understand Ultra Wide Band Radio Fundamentals*, Di Benedetto and Giancola, Prentice Hall PTR, June 2004, *Applications of Ultra Wide Band Wireless*, Lang, John Wiley and Sons, September 2005; *Analysis of Ultra Wide Band (UWB) Technology for an Indoor Geolocation and Physiological Monitoring System*, Alabacak, Storming Media, 2002; PC Magazine Wireless Solutions, Randall and Sosinsky, John Wiley and Sons, December 2004; *USB Complete: Everything You Need to Develop Custom USB Peripherals*, Axelson, Lakeview Research, August 2005 ($3^{rd}$); An Introduction to Wireless USB, Kolic, Intel, April 2004.

6. For information on RFID and near-field transceiver technology, applicants incorporate the following references: "*Is Near-field Communication Close to Success*", IEEE Computer, March 2006; *RFID Essentials*, Glover and Bhatt, O'Reilly Media, Inc., January 2006; *RFID: Applications, Security, Privacy*, Garfinkel and Rosenberg, Addison-Wesley Professional, July 2005; *RFID*, Shepard, McGraw-Hill Professional, August 2004; standard ECMA-352 "Near Field Communication-Interface and Protocol-2 (NFICP-2)"; "Near Field Communication—White Paper", ECMA, Ecma/TC32-TG19/2004/1 available at www.nfc-forum.org.

7. For information on GPS and GPS tracking capabilities, applicants incorporate the following references and services: AccuTracking at www.accutracking.com; "Soon Your Cell Phone May Be Tracking You," Brandt, PC World Magazine, April 2004; *Understanding GPS: Principles and Applications*, Kaplan and Hegarty, Artech House Publishers, November 2005 ($2^{nd}$); *Introduction to GPS: The Global Positioning System*, El-Rabbany, Artech House Publishers, August 2006 ($2^{nd}$); *Global Positioning System: Theory and Practice*, Hoffman-Wellenhof, Lichtenegger, and Collins, Springer, September 2004 ($5^{th}$); *Fundamentals of Global Positioning System Receivers: A Software Approach*, Tsui, Wiley-Interscience, December 2004 ($2^{nd}$); *How to do Everything with your GPS*, Broida, McGraw-Hill, November 2003.

8. For information on Internet 0, applicants incorporate the following references: "Internet 0—inter-device internetworking", Krikorian and Gershenfeld, BT Technology Journal, Vol 22 No 4, October 2004.

9. For information on voice recognition, applicants incorporate the following references: *Voice Recognition with Software Applications*, Clark, McGraw-Hill, December, 2000; *Dragon Naturally Speaking for the Office Professional*, Barksdale, South-Western Educational, December 2000; *Voice Recognition*, Klevans and Rodman, Artech House Publishers, September, 1997; *Speech Recognition: The Complete Practical Reference Guide*, Foster and Schalk, CMP Books, July 1993.

10. For more information on voice synthesis, applicants incorporate the following references: *Voice XML 2.0 Developers Guide*, Dreamtech Software India and Dreamtech Inc, June 2002; *Text-to-Speech Synthesis*, Narayanan and Alwan, Prentice Hall, August, 2004; *Developments in Speech Synthesis*, Tatham and Morton, John Wiley and Sons, April 2005; *Speech Synthesis and Recognition*, Holmes and Holmes, CRC, $2^{nd}$, November 2001; *An Introduction to Text-to-Speech Synthesis*, Dutoit, Springer, October 2003; *Speech Synthesis and Recognition*, Homes and Holmes, CRC, November 2001 ($2^{nd}$)

11. For more information on the current capabilities and features of state-of-the-art cell phones, applicants incorporate the following user manuals: "Nokia 9300 Smartphone User Guide", Nokia, 2005-2006; "Nokia 6136 User Guide", Nokia, 2006; "Motorola A910 User Guide", Motorola, 2006; "Samsung SGH-T709 User Manual"; Samsung, 2006; "LG Chocolate (VX8500) User Guide", LG Electronics, 2006.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant will amend the specification to expressly recite the essential material that is incorporated by reference as allowed by the applicable rules.

BRIEF DESCRIPTION OF THE DRAWINGS

FIG. 4 shows an exemplary display image for one hypothetical network.

FIG. 6 shows an exemplary display image for a mobile device implementing a mobile profile according to various aspects of the invention.

FIG. 9A and FIG. 9B show, generally and specifically, exemplary forms of computer accessible association lists.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1A:
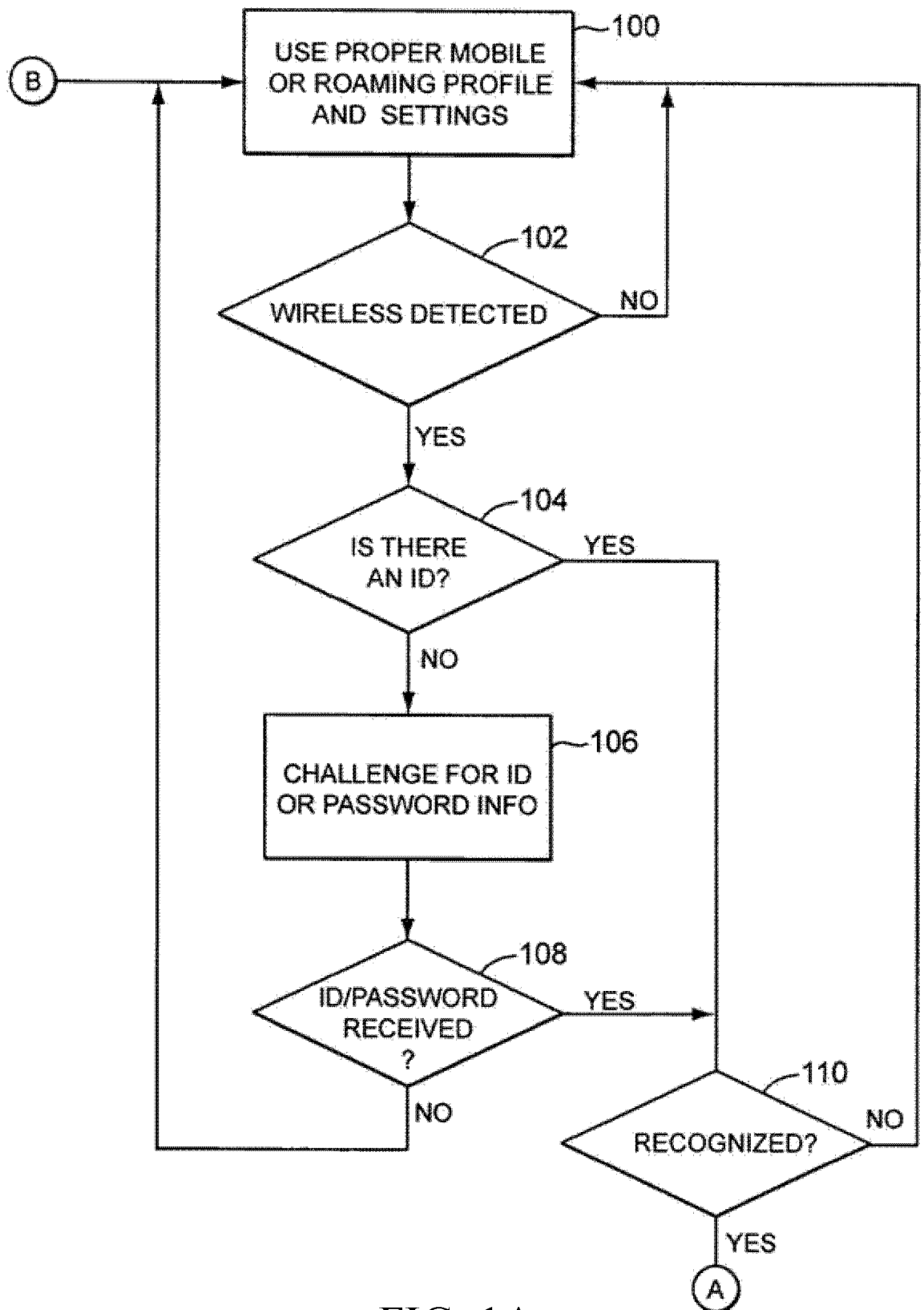
FIG. 1A and FIG. 1B show one brief method diagram applicable to a cell phone, PDA, etc. according to one embodiment of the invention.
Figure 1B:
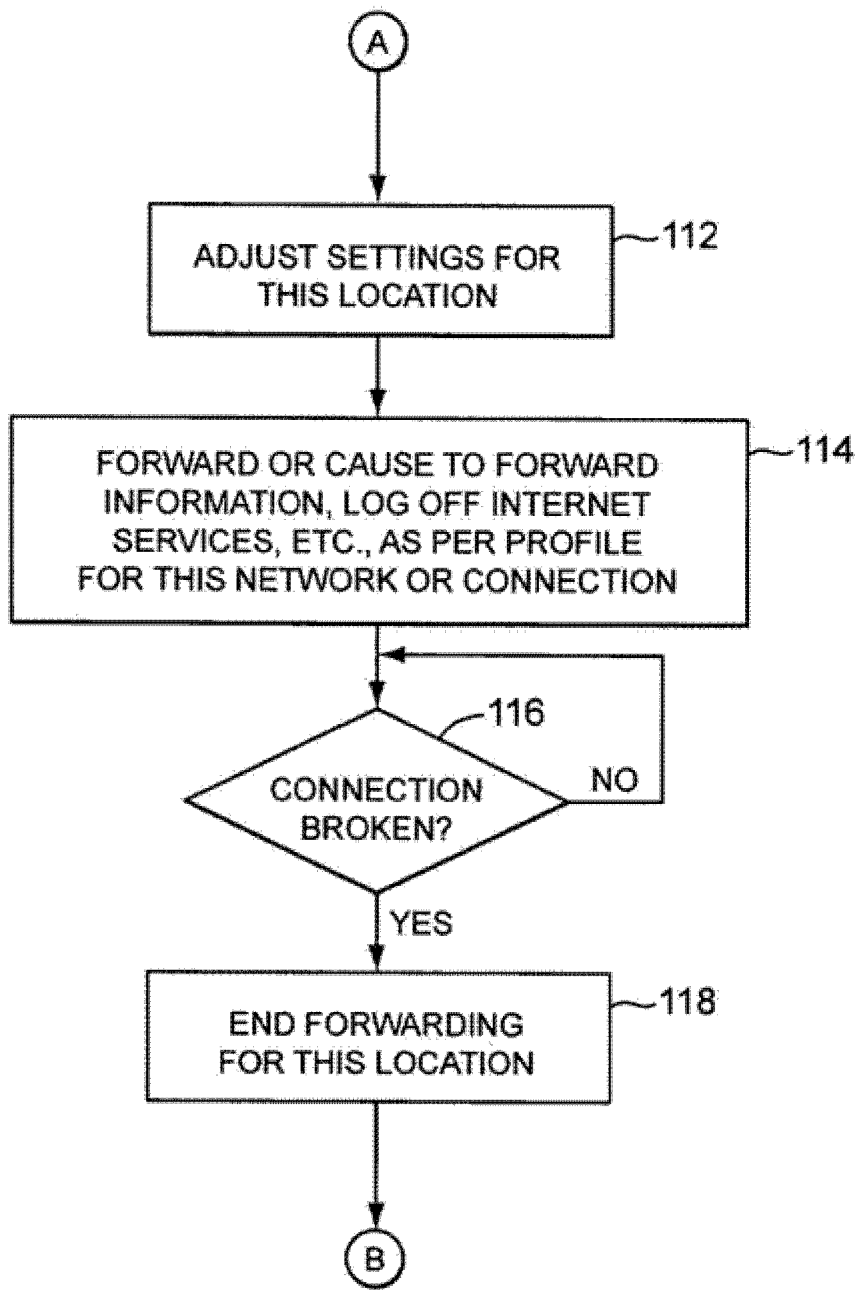

1. Forwarding/Transfer by Detection of Wireless Networks or Devices and Determination of Authorized Wireless Networks or Devices In one application of the invention, a cell phone stores a list of user-specified and authorized networks or specific devices with which it may wirelessly connect or recognize. The cell phone is operable for detecting wireless networks or interconnects that are within range. With reference to FIG. 1A and FIG. 1B, upon detection of a wireless network (102), the cell phone attempts to identify the wireless network and/or devices operating or communicating thereon (104, 106, 108). The cell phone determines whether the detected network or device is contained in the authorized network/interconnect list that is stored in the cell phone (110). If so, the cell phone is operable for forwarding information to this and/or other device(s) that have been associated with this authorized network or device (114).

Figure 3:
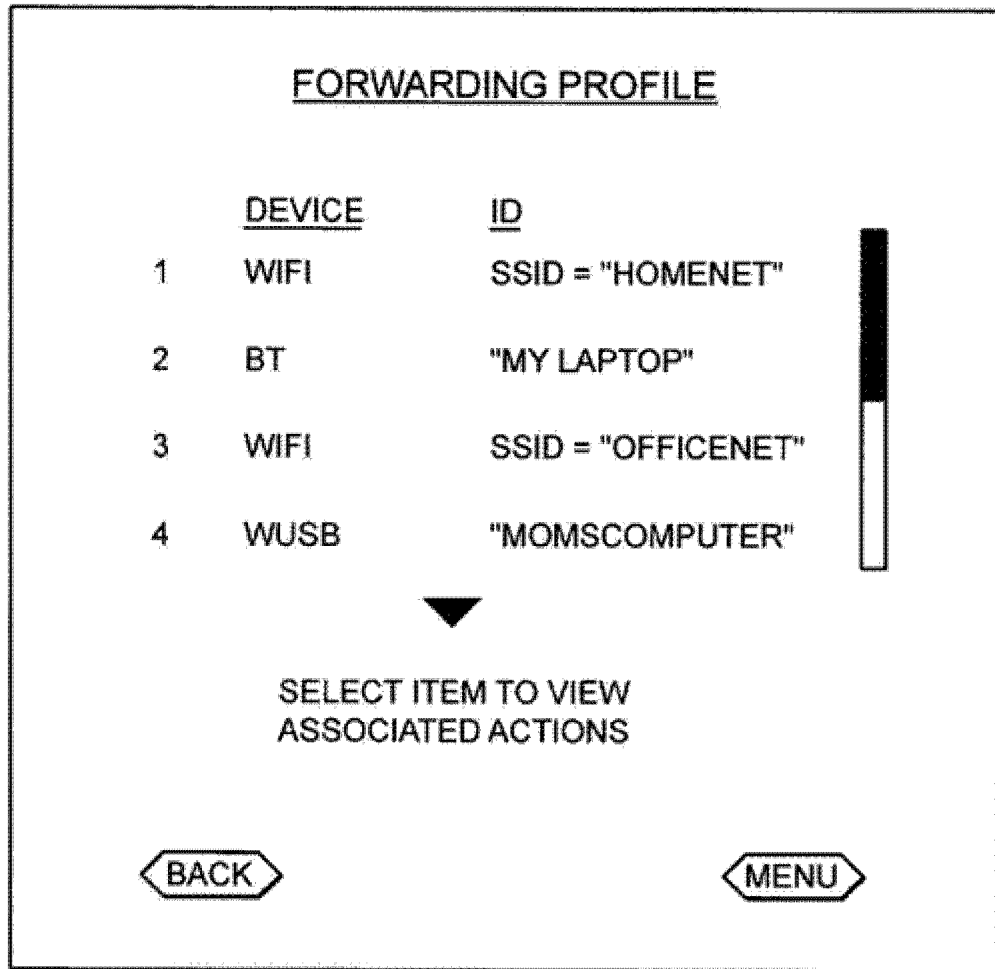
FIG. 3 shows an exemplary display image of a Forwarding Profile.

Forwarding of information can be done either autonomously (that is, without user intervention), or may require the user's permission to forward once a wireless network or interconnect is detected (for example, if the network or device is not on the authorized network/interconnect list or is on the list but where the user wishes to approve forwarding first). A profile of parameters for forwarding information or data with respect to these associated devices is preferably stored within the cell phone (for example, FIG. 3 shows one example of a forwarding profile). The stored profile specifies to where the cell phone should forward information or data, or cause the information or data to be forwarded. The profile may also define which of various communications that are initiated by another device and intended for the cell phone (such as phone calls, text messages, multimedia messages, email, etc.—from other communication devices) should be forwarded, and to where (FIG. 4).

For example, specified parameters for the user's home WIFI network are stored in the cell phone, identifying such as an authorized network. Also stored in the cell phone are corresponding profiles for forwarding information either over the network, or over land or cellular phone lines (such as the user's home land line or VOIP number, his home email address, home internet website or service logins, etc.) Alternatively, the profile or parameters for forwarding information may be given to or exchanged with the cell phone over the authorized wireless network or authorized wireless connection.

The profile for forwarding information is contemplated to include any of the following: phone numbers of phones (either POTS or VOIP), IP addresses, URLs, addresses of internet-connected devices, email addresses of devices or accounts, or the like. The information that is forwarded is contemplated to include data of any kind, including forwarding calls to another number (for example to a land line or VOIP phone), forwarding emails to another email address, transferring internet logins to a computing device connected to the internet, forwarding SMS or MMS messages to another mobile device or to an IP address or email address, forwarding streaming video or audio to another mobile device or IP address, etc.

One method for determining if a wireless network (for example, WIFI, Bluetooth, etc.) is an authorized network is by receiving and comparing the SSID (or similar network identifier) to the user-specified list. One method contemplated for determining if a device having a wireless interconnect (wireless USB, wireless Firewire, IR interconnect, etc.) is authorized is for the device to identify itself to the cell phone by communicating an identifier unique to the device (an example would be the MAC of a PC), which the cell phone compares to its user-specified list. In one application, this unique identifier is automatically transmitted by one device when it detects another device (the cell phone in this example) within its range. Alternatively, the unique identifier is transmitted in response to a challenge being issued by the cell phone to the device, requesting that it identify itself. In another method, wireless access may be restricted to only those devices having a specific password (or other access restriction method known in the art). As will be appreciated, the device identification methods described for determining authorized devices and/or networks is applicable to so-called infrastructure and ad-hoc type wireless interconnections.

Figure 5:
FIG. 5 shows an exemplary display image for other actions to be taken when the mobile device detects and recognizes an authorized network.

In addition to forwarding of information by the cell phone, it is contemplated that the cell phone may further change its settings, status, etc. (for example, turning the audible ringer off/on, turning the vibrator on/off, selecting an automatically sent status message (described below), changing its ringer volume, changing a status display icon, changing ringtones, etc.) With reference to FIG. 5, these actions are user selectable or programmable, based on parameters such as, the specific cell phone or portable device being used, the network it is on, or the manner in which it is connected to the network Consider the following example. for a network set up at a user's home (designated "homenet" in the figure), the user has selected no audible ringing, and that the cell phone should auto respond with a message to an incoming call informing the caller that he is at home (the user can select that no message be sent, that the message only go to certain callers, etc). Additionally, the user has specified a ringback sound to play for a caller and an avatar to display to others (either when they call him, or generally to all who may be authorized to view his avatar) while at this location. He has also specified that, if certain people call, he wishes the cell phone to ring (if not forwarded), and in this example, he further specifies those individuals by their address book or caller list identification (though he may specify them by their calling number or other identifier). Finally, for this example, the user has indicated that, should a message arrive containing 911 (typically meaning emergency in text message parlance), that his cell phone will alert him (for example, until he views the message) while not alerting for other messages. In another modification, once the network or device is determined to be authorized, the cell phone becomes one of the networked devices (or connects via the detected wireless interconnect to the computer or other device) allowing access and control of the cell phone by devices to which it is connected as is known in the art. These devices can then adjust or modify the cell phone's operation for this specific location (here, the user's home).

Another benefit had by the cell phone becoming one of the networked devices or wirelessly connecting to the detected computer is that the cell phone can then become a wireless peripheral for the computer. Specifically, the Bluetooth, WIFI, optical, etc interfacing phone has its microphone and speakers become a wireless microphone and speaker peripheral for use by computer. In one instance, the computer has a special driver which allows the computer to interact over the wireless LAN (i.e., wireless network) or point-to-point connection (a special form of wireless LAN) with the cell phone as though the cell phone is a wireless microphone and/or speaker for the computer. In another instance, the cell phone and computer communicate with each other over the LAN as individual devices (basically the way any two devices can interact over a LAN). In one application, the communication of voice and sounds between the cell phone and the computer is itself by VOIP protocols; however, proprietary protocols are also anticipated. Thus, the cell phone can become a wireless microphone and speaker for the computer. It is worth stating again that the computer/cell phone combination contemplated here has the cell phone speaker function as a wireless speaker for the computer and the cell phone microphone would function as a wireless microphone for the computer.

In one application, this functioning is used so that the cell phone is essentially a VOIP phone but through the computer. In another application, this functioning allows the cell phone to be the input microphone for popular voice control software packages (e.g. Dragon Naturally Speaking, Vista Voice Control (Microsoft), etc). Thus, one can voice command his computer from a distance over his wireless LAN without needing voice recognition on his cell phone to translate his utterances to commands to be sent to his computer, rather, his vocalizations are sent directly and recognized at the computer. Cell phones typically compress the encoded voice substantially in order to minimize cellular bandwidth used for any given call. This often results in degraded voice quality or difficulty in distinguishing subtly different sound (for example, it can be very difficult to distinguish the sounds of an 'f' from the sounds of an 's') received on a cell phone. Thus, in some applications that may require greater fidelity, the cell phone provides a second, higher quality, codec when the cell phone is being used as the wireless microphone and/or speaker for a computer or when it is being used for VOIP-based communications since these applications need not be as bandwidth-conscious as for communications over the cellular airwaves.

Additionally, another aspect of the invention provides that, when the cell phone leaves the network (or otherwise breaks the wireless interconnect with a networked device), the cell phone operates to perform a pre-programmed or selected operation, such as: end call forwarding, email forwarding, message forwarding, log itself back into the internet to replace logins that it had previously transferred, revert to previous settings, etc (see FIG. 1B, at 116 and 118). In a further enhancement, it is contemplated that some or all of the devices with which the cell phone had been communicating at this location may now be configured or operable for forwarding information (or causing the information to be forwarded) to the now-absent (or leaving) cell phone.

Figure 2:
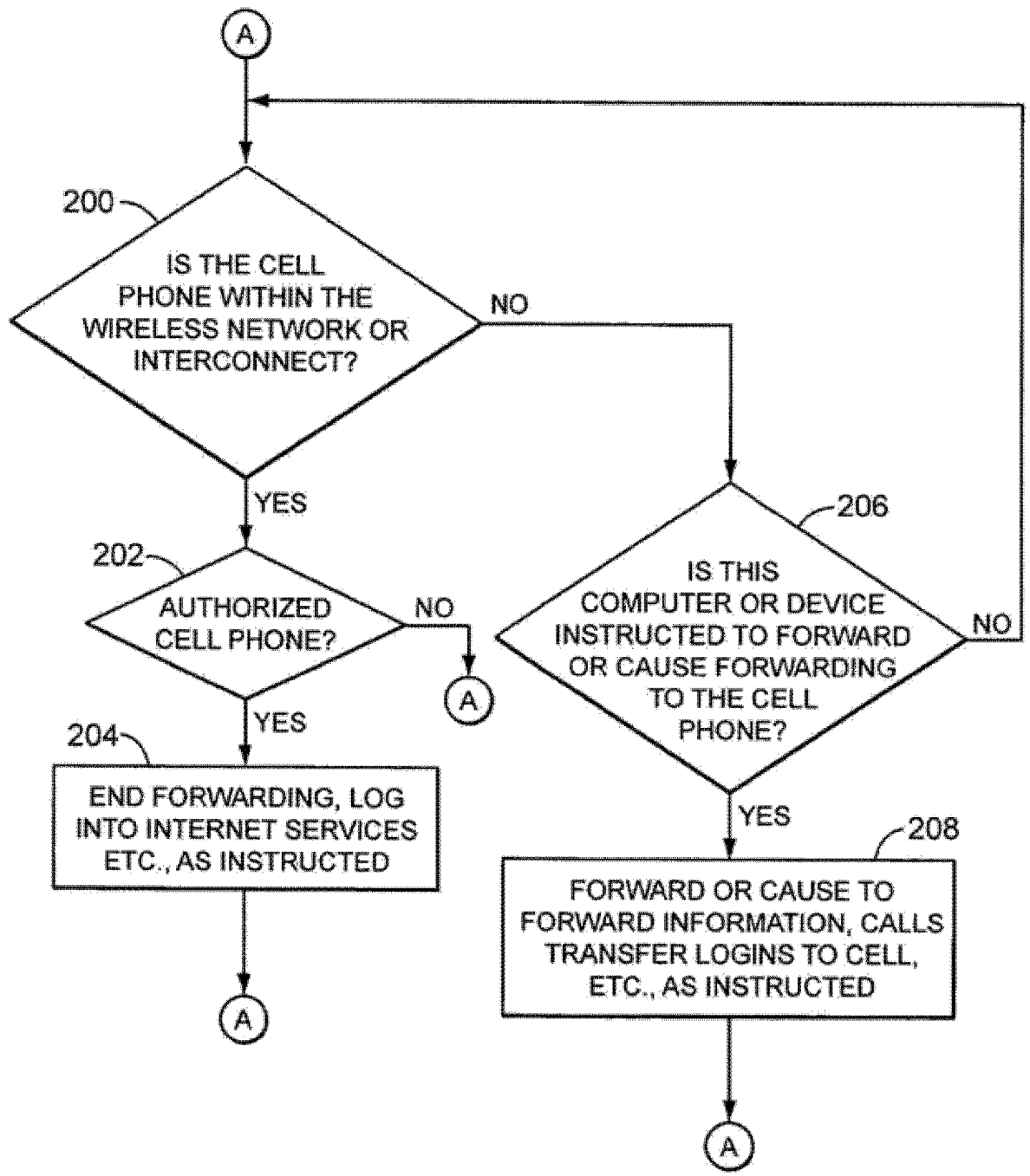
FIG. 2 shows one brief method diagram applicable to a computer or other fixed-location device according to one embodiment of the invention.

For example, and with reference to FIG. 2, the computer may forward emails it receives (or instruct the email server to forward emails) to the cell phone while the cell phone is out of the network. In addition, the computer may transfer the web address of a web page currently being viewed on the computer at the approximate time the cell phone left the network so that the user can continue to review it on his cell phone. Still further, the land line or VOIP at this location may be caused to forward calls to the cell phone, etc (see, e.g. 206, 208).

In one application, VOIP calls typically received at the network location may also be forwarded to the cell phone. In this form, the land line phone (or VOIP phone) is forwarded to the cell phone by being networked to and controlled by a computer, by a computer calling a number to instruct that the land line be forwarded, or by other methods. Typically, when instructing the POTS office to forward its calls, a land line phone need only dial a few numbers followed by a telephone number to which to forward its calls. These numbers can be stored within the land line phone, as is known in the art, and a computer can be used to trigger the phone to dial these numbers to accomplish computer controlled forwarding. It is also contemplated that the computer itself may dial the numbers necessary to accomplish call forwarding via a dialer or its modem being on the land-line phone's telephone line, again as is known in the art. In one application, it is contemplated that the computer may execute a program to control the forwarding of information according to the in-LAN status of the cell phone.

It is further contemplated that when the user's cell phone thereafter—returns to this same location, its presence is detected and recognized so that the operations that were initiated when the cell phone last left the network could be terminated. For example, the computer's email forwarding can be suspended, the forwarding of VOIP or land line phone calls can be cancelled, the computer can automatically login to select internet features or website, etc. (see FIG. 2, at 200, 202, and 204). In this way, the user's communications are automatically directed with him as he moves about, following him as he enters, leaves, and reenters approved or authorized networks, and being directed to the most preferred (and user allowed) devices along the way, in accordance with user-defined parameters.

According to another aspect of the invention, the cell phone detects the absence of authorized networks or interconnects, and thereafter operates to adjust its settings, status, etc., in accordance with the user's predefined instructions (FIG. 1A, at 100). An exemplary Mobile Profile is shown in FIG. 6. Thus, the cell phone can be instructed to act in one mode when around authorized locations, and another mode when not (for example, while typically not around home or the office). For instance, the cell phone can be instructed to do something as simple as not ringing when in the presence of the user's home WIFI network (further modified, for example, based on the time of day or week), but to audibly ring whenever it finds itself anywhere else.

In one application, the cell phone has one or a plurality of default settings to which the cell phone reverts when it detects authorized local wireless networks or devices, and additional default settings for when it detects no such network or devices. The cell phone implements the appropriate set of default settings based on its status, that is, whether or not it detects an authorized network or device, which of the authorized networks it has detected, or other status. Complications such as allowing different default profiles for different days or times of the day or according to locations detected by other methods, such as GPS (discussed below), etc. are also contemplated.

With regard to cell phone forwarding (as discussed above and below), it will be appreciated by those skilled in the art that there are many ways to accomplish the intended objects of the inventions. One way of forwarding is for the cell phone to contact the cellular service system and instruct it to forward calls to another number, or to instruct it to forward data services, such as email, messaging, etc. to another email address, IP address or number. Alternatively, the cell phone can be intimately involved in the forwarding operation. For example, the cell phone could receive an email, and immediately resend it to another email address. Similarly, the cell phone could receive text, MMS, etc., messages and resend them to a specified IP address or to a chat service to effect forwarding of messaging. In yet another form of the method, a computer (which can detect the presence/absence of the cell phone) is operable for communicating with the cellular system and instructing the cellular system to enable/disable call forwarding and other information or data forwarding based on the computer's determination of the presence/absence of the cell phone.

To accomplish internet login transfer, it is contemplated that the cell phone simply logs off when it detects an authorized network, interconnect or location, and logs back in when it does not detect an authorized network, interconnect or location. Likewise, computing devices are operable for detecting the entrance/presence or exit/absence of an authorized cellular devices (as being in its wireless network, sensing its wireless interconnect, position reports from a GPS tracking service, etc.), and thereafter operate to either login to an internet service (e.g., when it detects the cellular device) or log out (e.g., when it no longer detects the cellular device). No real interaction or coordination between the cellular device and the computer (or other devices) is required in this application of this method, other than detection of each other. However, though it is contemplated that such interaction or coordination may be done.

For example, a cell phone and computer may wish to exchange information directly over a network or wireless interconnect to coordinate the exchange of an internet login. Thus, when the cell phone enters an authorized network, the cell phone may transfer to an alternative computing device, the IP or URL address of a currently viewed webpage, along with the viewing history, so that surfing can seamlessly continue on the computer from the same viewing place without necessitating the user to re-type the URL or IP address. In another similar example, the cell phone may buffer some number of lines of an ongoing chat session and transfer these to the alternative computing device when transferring the chat login, so that the user can seamlessly resume his chat session on the alternative computer. The cell phone may also transfer the contents of an email or document currently being composed or viewed so that the composition can be completed or viewed at the alternative computing device, etc.

Similarly, the computer may transfer currently viewed information (and, if desired, some amount of stored history) to the cell phone when the cell phone leaves the authorized wireless network or interconnect. As will be appreciated, the transfer of logins, information, etc., may also include the invocation of an appropriate program on the device to which information is being transferred. For example, the cell phone may transfer a URL or IP address of a currently viewed webpage on the cell phone and cause Internet Explorer to open on the transferred device to view the webpage there, automatically. The cell phone may transfer a document being viewed on the cell phone to the transferred device and cause a word processor, such as Microsoft Word or Open Office to open on the transferred device to view the document.

Many Bluetooth enabled phones are now equipped with user operable controls to keep themselves 'hidden' (i.e., to not answer Bluetooth queries) from everyone so that those who would covertly attempt to hijack or obtain information from the cell phone are thwarted. Typically, this amounts to manufacturers simply giving the user control over the cell phone's Bluetooth transceiver by allowing it to be switched off or to ignore all Bluetooth queries. This is too inconvenient, as some of those queries may be desirable, but the transceiver is turned off or ignores everything and can't receive them. The various aspects of the invention can be adapted to give the user complete and programmable control over which networks or Bluetooth devices are allowed to interact with the cell phone, so that it can remain inviolate from unauthorized devices or networks while still being accessible by authorized devices or networks. In this way, the cell phone's Bluetooth transceiver can be left on so that all Bluetooth devices can be aware of its presence.

Thus, it is contemplated that after the cell phone or mobile/wireless communication device receives a Bluetooth query, the cell phone preferably does not allow access to itself until the accessing Bluetooth device or network identifies itself so that the cell phone can verify the access as coming from a user-allowed device or network. This may be accomplished by examination of a network ID, such as the SSID of a WIFI network, or by challenge-response mechanisms known in the art. The cell phone preferably contains storage for indicating proper networks or valid challenge/response sequences and to which it compares during operation to determine if the network or device is authorized.

One threat from cell phone hijacking is for a hijacker to usurp the cell phone via Bluetooth and cause it to call the hijacker so that the hijacked cell phone becomes an open microphone for the hijacker to eavesdrop on the user's conversation with another. Hijackers also use the hijacked cell phone to place calls to others, send SMS or MMS messages, surf the web, etc. all at the expense of he who was hijacked. Thus, as another beneficial improvement, it is contemplated that the cell phone with Bluetooth or other interconnect technology be improved upon so that it inform (alert) the user of outgoing calls, messages, etc. without requiring the user to be looking at or even paying attention to the cell phone (that is, an alert that comprises something other than a visual alert alone). Such notification can be by a beep, vibration, etc. and in one application, the notification continues until the user acknowledges it (for example, by pressing a button). It is contemplated that in some applications, the alert may be given only under certain circumstances, such as if the call or message is sent while the phone is folded or if the call or message is being done by Bluetooth command (or other remote command). In another application, the cell phone is made to give an alert (more than visual) whenever it is in communication with another device via Bluetooth, WIFI, etc. so that the user knows that his cell phone may be the subject of an attack and he can take measures to thwart it.

In another application of the invention, a network and a host computer thereon is operable for detecting the cell phone and causing the cell phone or cellular system to forward calls, emails, SMS or MMS messages, logins, etc as specified by the user (preferably ahead of time though not necessarily so). According to one aspect of this application of the invention, it is contemplated that the cell phone be operable for connecting to networks that it detects (and that are user-allowed) but that it take no action on its own immediately. Instead, a computer on the network instructs the cell phone to forward or enable/disable features as specified. To achieve this aspect of the invention, it is contemplated that the cell phone be executing a program or subroutine for interacting with a host computer (which is executing a program of its own for these purposes) of the network and be operable for accepting and implementing commands received from the host computer. The commands can be specified, one by one or in groups by the host computer (and it is contemplated that the user may specify to the host computer which commands to issue when detecting the cell phone in-network), or the commands may be specified and stored in the cell phone only requiring the host computer to trigger their implementation. In this way, the host computer instructs the cell phone as to actions to perform when it is detected within the network of the host computer. It is contemplated that there may be several host computers and networks, for example, one at the user's home, at his office, etc. which can identify and instruct the cell phone (in one application, the cell phone is also capable of identifying these networks and devices as authorized and potentially associating different action with each). It is also contemplated, that the cell phone be operable so that when it is no longer in network communication with the host computer, that it suspends or cancels its forwarding and other instructed actions as described above.

According to an alternative aspect of the invention, the host computer communicates with the cellular system, messaging systems, internet sites, etc., to effect cell phone call forwarding, email forwarding, SMS forwarding, MMS forwarding, video streaming, audio streaming, etc. It is contemplated that the host computer be operable for sending instructions to the cellular and/or other systems (in one application, by secured communication) that informs and/or directs the cellular and/or other systems or sites that the cell phone is at the host computer's location (having been detected by the host computer) and that the cellular system should forward any of the cell phones calls or data communications. As a beneficial safeguard, the cellular or other system may verify the computer as being authorized for issuing these instructions before the cellular or other system implements them. Authorization can be similar to that described above but where the cellular system issues the challenge and compares the response to user-specified responses to determine authorization (typically a login/password-type process). When the cell phone leaves the host computer's detection, the host computer (or the cell phone itself) informs the cellular and/or other system(s) so that the forwarding is cancelled. The host computer may also begin to forward communications directed to the host computer (or devices or services over which the host computer has control) to the cell phone as well as transfer any logins to the cell phone, information, video or audio streams, etc., as required or desired when the cell phone is away.

In another application of the invention, the cell phone and wireless network or interconnect exchange forwarding information before forwarding is accomplished. In this way, the cell phone, computer, land line, etc., need not be pre-informed of forwarding information. For example, a wireless network connecting computers and devices exchanges information with a cell phone detected within its presence. Such information is contemplated to include any of telephone numbers of land lines, email addresses, SMS IDs, IP address, etc. Thus, when the cell phone enters a network so equipped, it can automatically forward calls, messages, etc., as desired to these land-based devices. Of course, the forwarding can be done autonomously by the cell phone or require user permission before forwarding.

As a more specific example, a land-based telephone has Bluetooth capability and exchanges telephone number information (at least of the land based phone) with the cell phone when the two are in Bluetooth-contact with one another. The cell phone then preferably operates to automatically forward calls to the land-based number. Thus, one can simply set his cell phone down in the same room as the land-based telephone so equipped, and calls to his cell phone are automatically forwarded to the land line. Similarly, a computer having a VOIP connection can exchange VOIP number information with the cell phone over a Bluetooth connection with the cell phone. When the Bluetooth connection of these examples is broken, the cell phone preferably operates to cause forwarding to end. Likewise, in some applications, calls to the land line or VOIP number can be caused to be forwarded (for example, by the phone) to the cell phone number when the cell phone is out of its presence. However, in other applications, such as a land-based phone or VOIP-equipped computers that may have different cell phones forwarding to it, the land-based phone line or VOIP-equipped computer may be operated to not forward itself when the Bluetooth or other wireless connection is broken.

In another application, the cell phone having cellular connectivity and computer network connectivity capability (e.g., WIFI, Bluetooth, WiMax or other) dynamically and automatically switches between the various connectivity capabilities. For example, a user is out and about with his cell phone of the present invention. The cell phone can transmit and receive calls on the cellular network as is known in the art. Whenever the cell phone is around, say, a WIFI hotspot, within a WiMax network, or near a Bluetooth device, any of which has internet access and with which the cell phone can wirelessly connect, the cell phone connects to such hotspot, network or device and informs the cellular network (e.g., over the cellular airwaves, via the internet, etc.) that it is now connected to the internet. The cellular system then routes calls to/from the cell phone over the internet (using VOIP for example) from/to the other callers/receivers rather than via the cellular airwaves.

Such switching from one delivery system to another may be done even with communication-in-progress. In one embodiment, the phone buffers a certain amount of communication data which it then delivers to the user during the time of switching from one delivery service to another. Additionally, some of the buffered data may be used to synchronize to the data stream being delivered over the switched-to service. In another embodiment, the same communication data is sent simultaneously to the cell phone over both delivery services (e.g., both cellular and via the internet over the wireless network connection) slightly before, during, and slightly after the time of switching to the desired communication delivery (e.g. cellular or wireless LAN). The cell phone uses these duplicated data receptions to synchronously (and effectively, seamlessly) switch from one service to the other. The cell phone may then inform the system that the switch has been made or the system may be designed so that the switch has to occur within some predefined maximum time after the start of transmission of duplicative data streams by the system. As will be appreciated, the communication-in-progress to be switched can be any of voice data (e.g. a cell call, VOIP call), internet data (web page, download, streaming video or audio, chat session, etc.), message data (e.g. email, text or MMS message, etc.), or otherwise.

This has several advantages to both the user and the cellular service providers. Such things as WIFI hotspots and Bluetooth-connectable devices are typically indoors where cellular signals are generally attenuated or degraded and so another way of receiving/transmitting calls would improve service quality and put another nail in the coffin for landline services. Thus, connecting to the internet over wireless connection services can greatly improve reliability and clarity of calls. Typically, placing/receiving calls over the internet using VOIP is cheaper than cellular calls. Automatically connecting to the internet to place/receive calls rather than using the cellular system can greatly reduce the congestion of current cellular airwaves and save money for both the user and the cellular service provider. Because of their reduced range, hotspots can be provided within normally cellular-restricted (or cellular-restrictive) environments expressly for the purposes of placing/receiving calls by the phone of the present invention (for example, hospitals can provide areas away from sensitive equipment for the purpose of allowing wireless calls so that patients and visitors may be less inclined to place cellular calls.) Airplanes, on which cell phones use is typically prohibited (primarily because at altitude, the cell phone can 'see' far too many cellular towers and can thus overload the cellular system if allowed to transmit) can provide a WIFI hotspot onboard (e.g., in certain areas, for example, within the business class, or everywhere within the plane) which would allow one to use his phone on the airplane, albeit as a VOIP phone. The airplane would then transmit/receive this VOIP (and/or internet information generally) to ground or satellite internet access points reserved for the airlines). Alternatively, if it is desired to suppress any kind of wireless transmissions by passenger communication devices, the airplane seats can be made with USB or Ethernet pull-out cables which are coupled to an airplane-based local network or computing device having internet access. Thus, one may connect a USB- or Ethernet-equipped phone (known in the art) to a plane local network or computer having internet access to accomplish VOIP communications (or general internet surfing).

In some applications, an area providing WIFI or other wireless internet technology that can provide wireless VOIP capability expressly prohibits and/or prevents operation of the cellular portion of the device. One way to accomplish this is by the WIFI network transmitting a suppression code or signal to the cell phone which is operable for receiving the suppression code or signal and preventing operation of the cellular portion of the phone. Another way to accomplish this is to construct the cell phone such that whenever it detects a WIFI connection, the cellular portion of the phone is suppressed, disabled, or turned off. This latter method can be used quite effectively to automatically switch operations from cellular-delivered to VOIP-delivered and back again telephonic services (see below).

Because WIFI 'cells' can be quite small (a few hundred meter radius for 802.11 a/b/g (larger for 802.11n)), a walking user may pass through a WIFI cell quite quickly. Thus, the cell phone of the present invention may have to rapidly switch between WIFI access points for a moving user. This rapid switching of access points may defeat many of the advantages of automatically connecting by WIFI to VOIP services (for example, it is conceivable that the cell phone would need to be assigned a new IP address for each new access point it moves into. During this time, there is typically no internet access and so the cell phone may be without effective coverage for a significant part of the time while moving thru WIFI access points). Thus, in some applications the cell phone of the present invention does not inform the cellular system or VOIP system that it is within a WIFI access point and/or does not automatically switch from cellular to VOIP services until some minimum amount of time as passed that it is within the field of the WIFI access point. Alternatively, when the communication system (for example, VOIP, cellular, a combination, etc.) detects excessive WIFI or other wireless internet access point switching by the device (for example, due to movement of the phone), the system operates to suspend VOIP access and use cellular services instead until such time that access point switching has reached an acceptable level. Such direction can be communicated to the phone by the system or the phone can make the determination and transmit the direction to the system.

In another application the dual-use phone is also equipped with a GPS receiver and only when the phone detects a wireless access point (e.g., WIFI, Bluetooth, WiMax, WUSB, etc) at specified GPS locations (or within defined shapes having GPS delineated coordinates), is the phone allowed to automatically switch from cellular to wireless VOIP services. Thus, a user can specify his home GPS location, office GPS location, or other GPS location(s) and only when the phone is at those locations and detects a wireless access point does it switch to VOIP service operation. If he passes through other WIFI access points, the phone does not automatically switch to VOIP services simply because it detected an access point though it may inform the user that it is within an access point and ask if it is allowed to switch. (Other GPS aspects of the invention that may be used with this feature are described below.)

Beneficially, it is contemplated that the a phone of the present invention could have one telephone number which would be used for both cellular and VOIP calls (for example, it is known in the art with IPv4 and IPv6 to allow a telephone number to be used as a pseudo-IP address as the destination/source of internet packets) though the phone may have multiple numbers, one for each service (e.g., a cell number and a VOIP number which are distinct and which only work with the appropriate system and connectivity). Calls would simply be switched over the cellular or internet system as necessary by the phone service provider or system to reach the phone of the present invention as desired. Also of benefit, while connected to a wireless network by, say, WIFI, Bluetooth, WiMax, or other interconnect (even things like wired Ethernet will work with a phone equipped to interface to a wire-based LAN or WAN directly), the cellular transceiver of the cell phone can be disabled and powered down (automatically or at user selection) saving precious battery life. The cellular transceiver is powered back up when the cell phone detects no wireless network to which it can connect to receive VOIP calls. Thus, the cellular system would become the backup system, or system of last resort for the phone of the present invention.

Additionally, it is contemplated that in some embodiments, the wireless network transceiver (e.g., the WIFI, Bluetooth, WiMax, or other transceiver) may operate intermittently when not presently connected to an wireless network access point or device until one is found. For example, a person with a phone according to the present invention is away from any wireless access point or device. He is connected to the cellular system via his cellular transceiver. The phone periodically powers up the wireless network transceiver to see if the he has moved to within range of a wireless network transceiver. If it is so found, the transceiver stays on and connects as described above. However, if the phone does not find a wireless network transceiver, then it powers down for some prescribed amount of time (thus saving battery power) only to power up again after the lapse of the prescribed time to search again. This is transparent to the user because the phone is connected to the cellular system during these times and so the user experiences no loss of service. As will be appreciated by those skilled in the art, when the phone breaks the wireless network connection, the wireless network transceiver would then go into the seek/sleep mode awaiting another wireless network connection.

It is also contemplated that the cellular system may operate in one embodiment, such that if the user's phone is not detected on the cellular system, that calls are automatically switched to the phone over a VOIP system (e.g., the internet). According to this aspect of the invention, the presumption is made that if the cell phone is not connected to the cellular system through cellular medium then it is either connected to the internet and has turned off its cellular transceiver or it is actually off. Since it is contemplated that the message taking capability of present cellular and VOIP systems would be used with the system and methods of the present invention, it would not matter if the call was switched to the phone via VOIP and the phone was off, the system would simply take a message. Thus, the presumption is useful and beneficial in this regard and for this described embodiment.

In another application, calls can be switched between cellular and VOIP systems while the call is in progress. In this regard, the system and methods of the present invention operate to make the two systems (e.g., cellular and wireless internet) behave much like current cellular methods in that the WIFI, Bluetooth, WiMax access point is handled much like another 'cell' of a much larger wireless telephonic transmission system but where the WIFI, Bluetooth or WiMax system are different from the cell system (for example, the WIFI, Bluetooth, WiMax, etc., access point is typically an internet access point). Thus, when a phone is in the process of a call via the cellular system and senses an access point to which it may connect, it does so and establishes communication with the cellular system over the internet (or by multiplexing information with the call to the cellular system) but does not immediately drop the cellular call. Instead, the call proceeds through the cellular medium until such time that the cellular system can switch the call to VOIP services to which the phone is also now connected. As a prelude to such call transfer, it is contemplated that the cell phone (alone or in conjunction with a wireless phone service provider) of the present invention may determine such things as quality of service (QoS) between the two mediums (e.g., cellular and wireless network), wireless network signal strength, an estimate of the user's speed of movement (for example, based on the time rate of change of the user's GPS or other position coordinates) and hence, an estimate of how long the user may reasonably be expected to be within the present wireless network access point coverage area, etc and switch the call or not so that the best network (cellular or internet) is used for the call accordingly. Additionally, the cell phone of the present invention may coordinate the transfer of the call from one system to the other with the service provider so that such things as difference in delays between the two systems can be masked, switching only during silent times of the call or staggered handoff (that is, handing off one side of the call to the desired system before the other side of the call is handed to the same system) can be accomplished.

2. Use of Near Field Transceiver Technology

In another embodiment of the invention, use of an RFID system for detecting the nearby collocation of the cell phone to devices to which its calls or information may be forwarded is contemplated. RFID technology is well known in the art but, briefly, RFID systems, comprising RFID tags and readers, are typically used for tracking items such as components, products, shipping boxes, etc. Usually, the RFID tag communicates unique tagging information to the RFID reader when the two are collocated. RFID systems are a special class of transceivers falling within a general class of transceivers known as near-field transceivers (so called because their range is extremely limited, typically less than 24 inches). In this more general class, two-way communication is contemplated with near-field transceiver technology between the 'tag' and the 'reader'. (These terms are being used to maintain similarity to RFID technology. As those in the art will appreciate, both sides of near-field communications comprise transceivers). These technologies allow for the wireless powering of the tag by the reader either through magnetic coupling between the reader and tag and transferring energy over the coupling or by the power transmitted in the RF signal itself. For further information on RFID and near-field transceiver technology, the reader is referred to the following reference, all of which are incorporated herein by reference: US Patent Applications 20060132352, 20060145660, 20050270246; and U.S. Pat. Nos. 7,091,861, 7,091,860, 7,088,246, 7,088,245, 7,048, 183, 6,424,820. While the following description is illustrated with RFID technology, it will be understood by those skilled in the art that the use of the more general two-way near field transceiver technology is also contemplated.

In one application of the invention using this technology, a land-based phone, computer, etc. is tagged with an RFID tag and the cell phone includes an RFID reader. In one application, the land line phone, the phone line wall plate, a desk on which the phone sits, or other is tagged with information including the telephone number so that the cell phone can sense the number and forward its calls to it; computers, VOIP equipment and other internet-connectable devices can have their tag include IP address information, their MAC address, a URL of the device or system, etc. Additionally, it is contemplated that the cell phone may contain a list of any of user-specified telephone numbers, IP addresses, MAC addresses, URLs, etc. to which the cell phone is enabled to forward upon detecting one of these phones or devices having a number (or other identifying information) that is on the list. It is further contemplated that the user-specified list may further include or be associated with other actions (other than forwarding) to be taken. For instance, when the cell phone senses the user's home telephone number RFID tag (and thus 'knows' the user is at home), the cell phone may further be instructed to forward any of emails, messages, logins, etc. as above, to a specified computer (whether wirelessly networked or not) or to alter its function, for example, go to silent mode, change a status icon, etc. In one application, the cell phone is further operable for informing the local computer that it is forwarding information to it, either by contact over a network, or simply by sending the computer a message over the internet, SMS, etc.

In addition to forwarding cell phone calls to the determined number, in some applications, the cell phone causes other communications to be forwarded to the determined number. For example, the cell phone detects and determines the number, by RFID, of a nearby land line phone and reports the determined number to a VOIP service provider either over the internet, by cellular communication, by message, or otherwise and reports that the user is near the determined number. Thereafter, the VOIP service provider forwards the user VOIP calls to the land line phone. In another example, the cell phone detects the IP address of a nearby RFID tagged computer and reports this IP to a VOIP service provider (e.g., by internet, cellular, message, or other), landline telephone provider, or other so that each service providing may forward the user's appropriate service (VOIP and land line in this example) to the computer. In a third example, the cell phone detects, by RFID tag, that a nearby computer has a telephone number (due to being connected to VOIP) and reports this number to the user's VOIP or landline service provider (e.g., by internet, cellular, message, or other) so that the user's VOIP or landline service may be forwarded to the VOIP number of the computer.

According to another example, a user simply sets his cell phone down next to his tagged computer, tagged home or office telephone, etc. which senses the cell phone and causes the user's cell phone communications to be forwarded to the computer, home or office phone, etc. Additionally, in an application of this aspect of the invention, the cell phone, after having sensed something it recognizes (or after being sensed by something it recognizes, see below), can automatically turn itself off or hibernate after forwarding to greatly conserve battery power. When the RFID connection is broken (and the tag no longer powered), the cell phone can then awaken (turn itself back on for example). Alternatively, the cell phone can turn itself on or awaken periodically to check its location (or collocation) status and take appropriate action.

In an alternative embodiment of the invention, the cell phone is RFID tagged and a computer, phone, doorway, etc is operable for reading this information and knowing that the user is there (or is leaving) either by continual sensing of the cell phone's RFID tag or by having multiple RFID readers set up in a fashion to detect the user's direction of movement (say in to or out of the main entrance). When detected, the RFID reader(s) preferably informs a computer at this location to cause the cell phone's calls, emails, etc. to be forwarded (by any of the methods described above) in accordance with the user's forwarding profile (also described above) stored on the cell phone.

One advantage of having a near-field tag located in the cell phone is that it need not use any power from the cell phone itself since it can be powered from the near-field reader. Additionally, the simple powering-up of the near-field tag (by the near presence of the near-field reader) on the cell phone can provide useful information to the cell phone (for example, when the tag is powered-up, the cell phone knows it is near a reader). In some applications, the cell phone can not only be sensed through its RFID tag, but also have instructions sent to it by the reader device (for example, using the more general near field transceiver technology). For example, the user's home computer having a near-field transceiver senses the near-field tag of the cell phone and sends it a command instructing the cell phone to cause forwarding of call/information to it as described earlier. Thus, the home computer need not engage in contacting the cellular system to setup the forwarding.

A cell phone having an RFID reader and land-based devices having RFID tags (or vice versa) enable a cell phone to cause forwarding of calls/information destined for it to any land-based phone number or device (such as a VOIP capable computer on an authorized home or work network). This has tremendous potential benefit in preserving battery life and improving communication quality since the cell phone in this regard preferably acts to forward a person's calls to wherever he is. Ideally, the cell phone is then used for calls only when nothing else is available with which to communicate. Battery life can be further improved if the near-field tag is part of the cell phone and land-based phones (or a separate device associated with the land based phone(s)) can power and interact with this near-field tag sending it information about the land-based phone number so that the cell phone can cause itself to be forwarded to that number.

A major concern with portable electronic devices is battery drain and recharging time. Having a cell phone that includes a near-field tag that is powered by the near-field reader can provide a benefit to the cell phone. That is, the power transferred to the near-field tag can also be used to recharge the cell phone, thus providing wireless recharging. The power transferred to the cell phone would certainly be small but over time would amount to a significant amount of energy and without the inconvenience of needing to hook up a wired charger.

With near-field transceiver technology, one purpose of the energy transfer from the reader to the cell phone is to power the tag. Thus, the cell phone has to determine when to switch this transferred energy to the cell phone's battery charging circuitry and away from the near-field tag. One way to accomplish this is to allow the tag to operate for a fraction of an interval of time. Such fraction is preferably of sufficient duration to enable likely information transfers in their entirety. For example, allowing the tag to operate for 5 minutes out of every 15 minutes that power is transferred from the reader, or ⅓ the time. Another way is to monitor the tag for information transfer idle times and "steal" the power during these times. The tag can be momentarily powered up by the energy transfer from time to time to ensure that the information transfer system is still idle.

Since the amount of power transferred from the reader is almost certainly to be more than the tag needs (to ensure the tag has sufficient power to operate), in a third approach, the cell phone only "steals" the power that is transferred from the reader to the extent it determines that there is excess. One way to accomplish this is to use all of the transferred energy to recharge the cell phone battery and have the cell phone battery power the tag itself. Thus, the battery retains the excess power transferred from the reader. Additionally, in one application, the tag is only powered when the cell phone detects the presence of a near-field transceiver transferring power to the cell phone. Those skilled in the art will undoubtedly find other approaches to using the power transferred from the near-field transceiver to recharge the cell phone battery.

In as much as there is "free" radio energy virtually everywhere (from such global sources as terrestrial and satellite transmission sources, and local sources, such as WIFI access points, Bluetooth transmitters), albeit quite small at any point in space and moment in time, adaptation of this aspect of the invention can allow the cell phone to recover some of this free energy for use in recharging the cell phone. For example, the cell phone includes a small tunable receiver that is tuned to a strong AM, FM, TV or other station or frequency (either automatically or manually) and the received radio energy is rectified, converted to a proper voltage by a switching power supply circuit or otherwise if needed, and used to trickle charge the battery. (See for example, US Patent Application 20060160517 incorporated herein by reference). Since the power received by the cell phone from free radio sources is anticipated to be quite small and continual conversion or attempted use of this energy by a switching power supply or otherwise may result in a complete loss of the received energy (due to circuit losses), in one application of the invention, the received power is allowed to accumulate on a energy storage device, such as a capacitor, for some times or until a certain amount of energy has accumulated and then rapidly, and periodically (in time or other condition such as sufficient voltage, state of charge on the energy storage device, e.g., capacitor, or otherwise) converted to an impulse, near impulse, burst, etc., of energy of proper potential which is transferred to the battery or otherwise used. There will still be circuit losses with this method, of course, but since the conversion or use of the intermediately stored energy is periodic (in time or condition) the time-average power losses due to conversion circuitry (or other circuitry) can be greatly diminished. Again, the power transfer is minute but averaged over long time periods, the energy received can be nontrivial and can yield significant fractions of the battery capacity. As those skilled in the art will appreciate, this aspect of the invention can be applied to virtually any battery operated device. As devices become more miniaturized and power requirements are reduced, this free energy can become more and more useful.

Most radio transmitters are designed to be omni-direction and radiate a near-symmetric power field about the antenna so that devices anywhere at a given radius of the transmitter may receive the broadcast equally well. The power received at any given point then follows the inverse square law. Thus, there is a great deal of radiated energy that is not received in such a design just to ensure that devices may receive transmissions regardless of their angular orientation (around the antenna) to the transmission antenna. For the wireless recharging according to the present invention, in some applications, the transmitter is made highly directional so that power transfer to a specific area is maximized and the cell phone is placed within this area to receive the power and recharge. For example, an AC wall or car cigarette lighter adapter is made to produce a directed beam of radio energy such that when the cell phone of the present invention is placed within this directed beam of radio energy, it can wirelessly recharge. Thus, simply by setting one's cell phone on a counter, on the car center console, or other location at which the charger's radio energy is directed, it may be wirelessly recharged.

When near the source, near-omnidirectional transmitters can still provide significant power transfer (power densities). Thus, if local, strong radio transmitters can be known ahead of time, efficient design of the wireless charger can be had in that variable or step tuning to search for a strong radio source can be eliminated or greatly reduced. As regards computer equipment, wireless networking and/or wireless point to point coupling between data devices, such sources do exist and fortunately, cell phone are usually around such sources. Thus, one application of the invention tunes the cell phone charging receiver to the frequency range used by WIFI (802.11 a/b/g/n/x) (presently, 2.4 or 5.8 GHz), Bluetooth (presently 2.4 GHz), WiMax (2.5 GHz, 3.8 GHz, 5.8 GHz have all been proposed), Ultra Wide Band (e.g., wireless USB, 3.1-10.8 GHz) or other so that the wireless transmissions of the computer can be used to transfer power to the cell phone simply by placing the cell phone near the computer. Additionally, since many homes, businesses and public places have WIFI access point hubs (i.e., wireless routers), tuning to this frequency can provide minute power transfer to the cell phone whenever it is near or within the field of the WIFI wireless router. When in close proximity to a WIFI, Bluetooth, WiMax, UWB, or other transmitter (either near a computer so equipped or within an access point hub), the power transfer received by the cell phone according to this aspect of the invention, can amount to a few milliwatts and, over time, can amount to significant energy transfer.

For some devices (such as keyless entry transmitters, garage door openers, etc.) that have very small time-average power requirements, the battery may even be replaced by a small, high capacity capacitor, known in the art, which is charged according to the aspects of the invention and used to power the device at the moment it is needed. Thus, in some applications, this high capacity capacitor replaces the battery and also functions as the energy storage device though whether or not a voltage conversion (by the aforementioned switching power converter or other method) is required is implementation specific.

3. Location-Guided Cell Phone Features

As mentioned earlier, many cell phones now come equipped with GPS receivers. One use of GPS information is so that the cell phone may determine its location upon the earth. Thus, it is known in the art to have the cellular system track the cell phone by its GPS location (or otherwise) and restrict cell phone operation based on its location or to have the cellular system transmit coordinates and restrictions to the cell phone and the cell phone monitor its location and implement the restrictions accordingly. However, these systems are typically under cellular system monitoring and/or control and are designed to target all cell phones within a given area, not a specific cell phone and not according to the cell phone owner's (or user's) preferences with regard to his cell phone. See for example, U.S. Pat. Nos. 6,832,093, 6,625,455, 6,085,096, 6,230,017, 6,011,973, and 6,212,390 which are incorporated herein by reference.

Thus, in another embodiment of the invention, the user himself inputs GPS position information to his cell phone (several exemplary methods of position input are disclosed below) and then associates actions that should be taken at those locations (or when not at those locations).

For example, he can input his home location and instruct the cell phone to not ring when there (or he may instruct the cell phone to always audibly ring when he is not there, for example). He may also instruct the cell phone to forward calls or data (to land or VOIP numbers) as described above when at a certain location. He may instruct the cell phone to only allow certain phone calls through while taking messages for others when at certain locations. He may instruct the cell phone to forward emails, messages, etc to a certain computer or email address when he is in a certain location. Accordingly, the GPS can be employed to carry out the various forwarding and automatic switching features discussed above.

It is also contemplated that a user may specify other parameters in addition to location. For example, he may specify his home location to the cell phone and instruct his cell phone to not audibly ring from 10 pm to 6 am when at that location. He may instruct his cell phone to cause a message to be taken (for example, by the cell phone itself, or by instructing the cell phone to not inform of the call so that it is not answered, in which case the cellular system takes the message as is known in the art, etc.) for certain calling numbers while audibly ringing for other calling numbers when he is at a certain location and/or at certain times. He may further instruct his cell phone to simply change the audible ringer volume based on his location. In short, virtually all programmable features and user preferences of a cell phone (or, correspondingly, a PDA or other wireless communication device) can be automatically adjusted, programmed or changed by the cell phone based on its determined location. It is contemplated that the cell phone itself carries out these programmed operations without specific involvement by the cellular network system. However, other cellular services are used, such as the cellular messaging system taking a message for example. Furthermore, the user's preferences, restrictions, settings, etc., are implemented on the user's cell phone according to the user's position alone—other cellular devices in the same area are not affected (except as those users have instructed their cell phones). Thus, this is a highly targeted approach and retains control over a user's device right where it should be, with the user.

Figure 7:
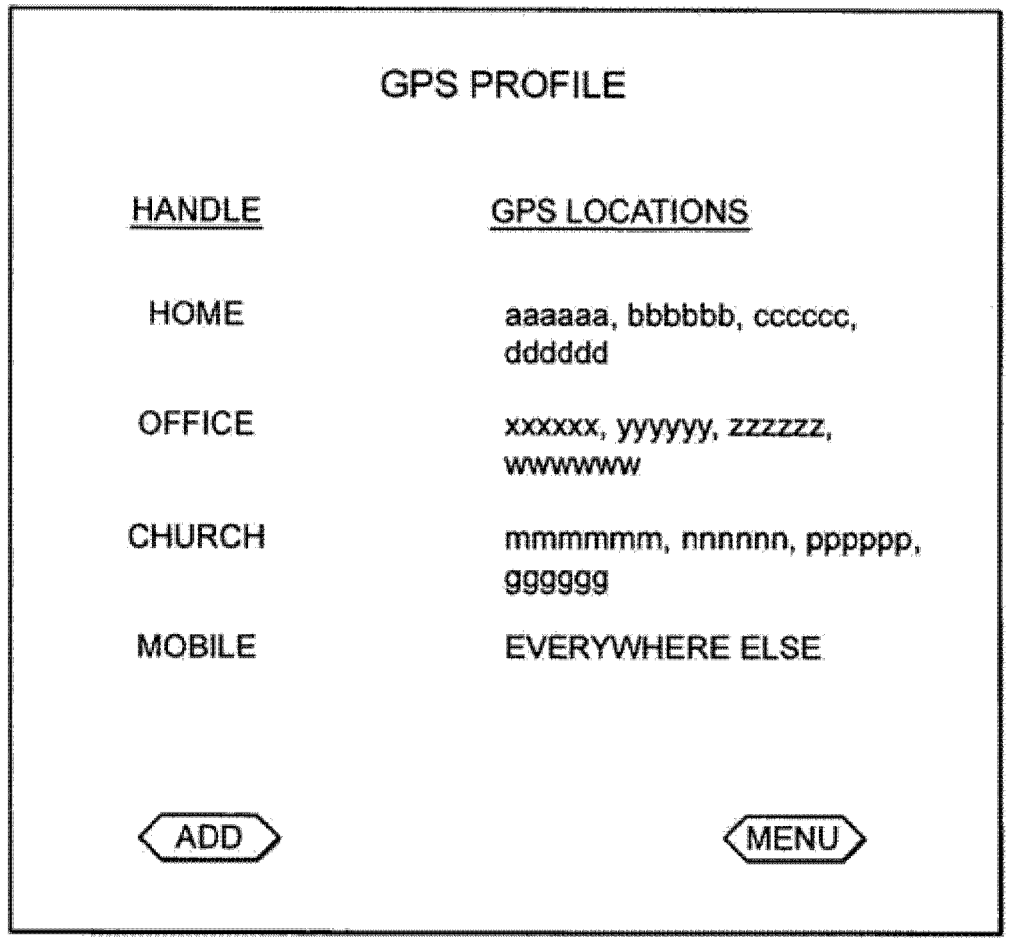
FIG. 7 shows an exemplary display image for a mobile device according to GPS aspects of the invention.

FIG. 7 shows an exemplary GPS Profile where the location of three structures or places has been defined by four vertices each. This may correspond to a rectangle or any other four-sided polygonal shape, such as a trapezoid in this example. Other coordinate-specification methods are contemplated, for example, a center and radius, two opposite corners of a rectangle, three vertices of a triangle, etc. There are several methods by which one may input the vertices of a perimeter defining a location. One method is to indicate map locations on a map being displayed by the phone, website, or otherwise. and having the locations converted to coordinates that are downloaded to the cell phone. In another method, the cell phone provides a user interface so that the user may enter direct GPS coordinates. In another method, the perimeter is physically paced-off and at all or a select subset of vertices of the perimeter, the user indicates to the cell phone to store the GPS coordinates of the vertex for defining the perimeter of the area. Any of these methods may also be used for indicating a location that is represented by a single GPS coordinate (with or without a defining radius).

In the application of FIG. 7, the user has chosen to define places for his home, office, and church and further defined that he is to be considered "mobile" when anywhere else. As with the network-detection-based location implementation discussed above, it is contemplated that the user may then define profiles for each of these locations. These profiles may each contain information about cell phone operation (for example, ring or silent, selective call blocking, ring tones, avatars, status messages to be sent to a caller, etc.) and/or forwarding of calls and information. etc. for each location defined. Systems and services are known in the art for tracking the location of a person's GPS equipped cell phone. Thus, a specified computer or other device can be aware of where the person's cell phone is located (by using a tracking service or by having the cell phone send the computer its GPS coordinates directly) and take action based on this information. For example, a person's home computer can 'know" where a person is by having access to GPS tracking information, and when he is away, cause any of the user's home phone, emails sent to his home computer, etc. to be forwarded to the cell phone. When he is back home, as indicated by his GPS location, the home-device forwarding may be cancelled, and additionally, the cell phone forwards calls or messages intended for it to the home devices as appropriate (either by instruction from the computer or by the cell phone's knowledge of its GPS location). In this way, the home, office, or other devices work cooperatively with the cell phone in an effort to provide the user with all communications destine for him in a timely manner regardless of where he is and to where the communications were originally sent. Additionally, the system of the present invention provides that communications directed to the user may be programmably routed to the best communication devices available to him depending on this location and his wishes.

Whether calls are forwarded or not, another application of the GPS-equipped phone (or other method for determining location) provides that when the cell phone is near the computer (but not necessarily at the computer) as indicated by GPS (or other method for determining location), then it and the computer operate so that the cell phone becomes a wireless microphone and/or speaker for the computer as previously described. VOIP calls directed to the computer (either directly or by forwarding) then use the cell phone's microphone and speaker as wireless peripherals (e.g. wireless microphone/speaker of the computer—i.e., the call is handled by the computer, not forwarded to the cell phone, only the cell phone's microphone and/or speaker is used by the computer). As mentioned above, GPS may not work inside a structure but there are other position determining methods that may be used. Other systems and methods are described in the following references which are incorporated herein by reference: U.S. Pat. Nos. 7,042,391, 6,839,560, 6,535,815, and 6,324,404, and US Published Patent Applications 20030229445, 20010022558 and 20030008671.

It is also contemplated that the user can automatically set the feature selections of his phone for different locations, such as no ring when home, no vibration when out, etc. (There has been many a missed cell call because the user put his cell phone on silent at home before bed and forgot about the setting as he entered the mobile world only to not feel the vibration of an incoming cell call while riding on the subway, for example. This aspect of the invention would help to alleviate this frustration.) Alternatively, it is contemplated that the user with a fairly regular routine may simply use time to specify certain features or operations to enable/disable on his cell phone, in accordance with that routine. Thus, the user may specify vibration alert in the evening, when he is typically home, and audible ringing during the day when he is typically out of the home, and all without the cell phone needing to detect its location or nearby networks, etc.

In many cases, a cell phone with GPS receiver may not be able to receive the GPS signal, for example, inside a building, and this 'state' can also be used to change the cell phone's characteristics. For example, the cell phone can be instructed that if it is at or near a certain location and then loses the GPS signal, the cell phone will then implement certain settings or changes. For example, when the cell phone detects that it is near the user's home and then looses the GPS signal, the cell phone will assume the user has entered his house and implement the corresponding user settings, changes, forwarding instructions, etc. In this way, the GPS coordinates act as a boundary or perimeter identifier. Alternatively, the cell phone may be instructed that whenever it receives no GPS signal, it perform or change some feature, operation, etc. no matter where it is when the signal is lost. For example, the cell phone is instructed that when it detects loss of GPS signal that it goes into silent mode, reduces ringer volume, etc. on the theory that it is inside a building and should be silent or reduce its volume when audibly alerting.

In an enhancement of this aspect of the invention, the cell phone not only tracks the user's location but also computes his trajectory. Thus, the user can specify that if the cell phone passes through a location or defined perimeter in a certain way (for example, from outside to inside a defined perimeter) and then loses the GPS signal that it should operate to change settings, implement certain features, disable certain features, etc., in accordance with the user's wishes. Similarly, if it passes within a defined tolerance of a regularly repeated route (as compared to data stored in memory), the cell phone assume that it is continuing along the previously stored path and be programmed to respond accordingly if the signal is lost.

The use of the loss of GPS signal as the 'switch' for changing cell phone operation can also be used with existing methods of implementing restrictions for all cell phones within given areas. For example, the cellular system can track the cell phone and compute its location (and trajectory if necessary) and instruct the cell phone when near certain restricted areas that if the cell phone should lose the GPS signal, that it should restrict its operations as defined. This is a big improvement over existing systems in that the coordinate geometry of the area of restriction need not be well defined or even well known because the loss of GPS signal acts to precisely define the restricted area (typically to the structure causing the loss of GPS signal). It is sufficient if the system or cell phone itself knows the general location of the cell phone prior to entering the area where there is no GPS signal so that the cell phone can implement the proper set of restrictions.

In another application of the invention, GPS or other location-determining method is used to determine authorized networks to which the cell phone or portable computing device may connect. For example, the cell phone may be instructed of the user's "home" GPS location (as a single coordinate or group of coordinates), "work" GPS location (as a single coordinate or group of coordinates), etc. and when the cell phone detects a wireless network in this area, it can immediately know that the detected network is the corresponding "home" network, "work" network, etc. Furthermore, the cell phone or portable computing device having access to the Internet or a GPS tracking service can detect a network, query a GPS tracking service or the Internet for the location that corresponds to the present GPS location of the cell phone and alert the user that a network at this common-name location is attempting to connect to the cell phone. (Alternatively, the location may be prespecified as being an authorized or unauthorized location so that the user is not bothered with the alert.) This information can be used to sign on to secure networks with uniquely defined passwords associated with the location.

For example, a user enters a Walmart store in Savoy, Ill., having a WIFI network. His cell phone, according to the various aspects of the invention, detects the WIFI network. The cell phone next queries a tracking service, mapping service, internet website, etc. with its current (or last determined) GPS location to determine the name of its location. The cell phone, having determined the location, informs the user that a network at Walmart in Savoy, Ill. is attempting to connect with his cell phone and asks whether the connection should be allowed. The user can then respond. Alternatively, the cell phone may connect or refuse the connection automatically if it has been informed that this is an authorized or unauthorized network, respectively.

Connecting to a local network at a store or group of stores by any method via the cell phone, PDA, smart phone, etc. can provide a more pleasurable shopping experience and reduce the need for floor personnel. A major frustration associated with shopping is had when one spends significant time trying to find an item(s) in which he/she is interested or when he/she purchases an item only to later find out that a similar item was cheaper or even on sale. Thus, according to another aspect of the invention, a user's cell phone connects to a store server via an access point associated with the store. The store's server then pushes information about store specials, coupons, sales, etc, to the user's cell phone.

In an improvement to this aspect of the invention, the user creates a "shopping list" of items that he wishes to purchase or in which he is interested. The shopping list is stored in the cell phone's memory and in a manner that it can be accessed via the store's network, either with or without user initiation and interaction. In some applications, it is contemplated that the cell phone may have a publicly accessible area of its memory or files while restricting access to other parts of its memory or files. The information stored in the publicly accessible area of memory or files can be viewed by connecting devices without user interaction, but the restricted areas are not generally publicly accessible without authorization, password, etc. In another application, the shopping list may be tagged or stored in a specific area of memory so that store computers/servers can know that this list is a shopping list.

In this application, when the user enters or nears a store, the shopping list is read (automatically or after the user initiates or authorizes the download of the shopping list) from the cell phone by a store computer or server (local or on the internet) and any of availability, price, location of the item(s) in the store, etc. are passed back to the cell phone. In this way, a user can 'surf' physical stores for his item(s), much as he does the virtual stores on the internet, but where his actual physical presence is a part of the surfing which causes the download of inventory and product information on items in which he is interested. In another application, the user can query the store computer or server for specific items, their prices and/or location directly rather than through a shopping list.

In another application of this aspect of the invention, a mall comprising a plurality of stores maintains inventory, pricing, etc. information for the stores in the mall. Once having read the shopping list or having received a query from the user, a mall server responds with which stores have the items. The information can be ordered according to price, store location relative to the person's current location, etc. Thus the user can immediately find the best price or nearest retail source for the item(s) in which he is interested.

It is also contemplated that for lists containing multiple items, the server may provide the user with minimum-path directions to the stores having the items so that the user can obtain all the items in which he is interested in minimum time. As a further modification, the cell phone shopping list can be forwarded to an internet site that queries several such mall servers, and then directs the user to the closest mall having the highest percentage of listed products, at the best prices.

A cell phone having GPS capability being tracked by a home computer (either by using a tracking service or by the cell phone sending its GPS position to the computer directly for example, via the internet, SMS messages, etc, forms the basis for a novel home automation system. It is known in the art to give devices on a home automation network IP addresses based on the internet structure (for example, so called "Internet 0"). A computer connected to a network of such devices (such as switches, appliances, heating and air conditioning equipment, etc.) can control the operation of such devices. Of course, other methods of computer control of these devices are also known, and need not be IP-address based. One such example is computer control of X10 devices, which is known in the art.

A computer having knowledge of a person's location can more intelligently and automatically control devices connected to a home network (e.g., the aforementioned internet 0 or X-10 devices). Thus, the home's lights, heating, cooling, sound system, entertainment system, hot water heater, door locks, security system, automated windows or skylights, oven, etc. can all be controlled and made to act in certain ways depending upon the user's indicated position around the world as forwarded or communicated to a local computer having knowledge of that position and which has control capability with regard to these exemplary devices. For example, a user's GPS position can be used to unlock a door having a solenoid or motorized lock that is under computer control when he is at a prescribed place (for example, nearby his front door so equipped) and the computer is made aware of his position, or turn on lights via computer controlled light switches, or the air conditioner's via a computer controlled power relay, etc., all in accordance with his preprogrammed locations and desired operations. In another example, a person's heading (or direction of motion) can be determined from the time differentiation of his location or comparison to known routes, and this information may be used to refine the control of devices on the home network. Thus, locking the door when he is moving away from the door and unlocking when he is moving toward the door. His position (with or without direction of movement headings) can be used to automatically turn on/off lights.

As another example, a home security system can be computer controlled to off or on states simply by the user's coming or going from the premises, respectively. In some cases, the familiar security control pad can be completely eliminated and replaced with the location-determining cell phone and home automation system tracking the cell phone's position (or all cell phone's of the home's residents). Allowing the cell phone to interact with the security system over a network or by other interconnect can allow the cell phone's keypad to replace the security system's keypad either by having the cell phone interface directly with the security system, or by having keystrokes sent to an intermediate computer which then sends the keystrokes or commands (with appropriate translation as necessary) to the security system. Thus, the user need not get out of bed because the cat triggered a motion sensor someplace in the home, for example, since now he can direct the security system from his cell phone having an interface to the security system and software for interacting with the security system or and intermediate computer.

Some devices, such as heating/cooling, cooking, etc require long lead times to be affected usefully. Therefore, in another novel use of this aspect of the invention, the home computer (in this example) compares the user's current trajectory to previously stored or learned trajectories of the user to determine the user's likely destination long before he reaches that destination and uses that information to control these long lead time devices. Using artificial intelligence techniques, the computer can determine a person's likely destination. For example, once a user is at a destination and because the local computer has tracked him, the computer can discern the trajectory or path the user took to arrive at that destination. Over time and collecting many trajectories, the computer can build a database of trajectories corresponding to likely destinations. From then on, using simple AI routines known in the art or other known predictive techniques, the computer can predict the likely destination of the user from knowledge of his current trajectory.

Adding the element of time can improve the predictive capability. (For example, seeing a certain trajectory at a certain time, such as the user's trajectory directed toward home and at a time that the user typically comes home yields a safer prediction that the user is probably going home.) This information can be used to automatically control long-lead time systems such as the home's heating and cooling, cooking appliances, hot water heating, etc. so that the home is at a comfortable temperature when he arrives, dinner is ready, hot water is available, etc. It is also contemplated that the system of the present invention be capable of tracking the movements of several individuals and control devices based on the likely destinations of all those it is tracking, for example, coordinating the cooking of dinner to coincide with the last person arriving home, not reducing the home's heating until the last has left, etc.

Predictions generally have increasing probabilities of being incorrect the greater the time between the prediction and the result (that is, the earlier a prediction is made, the more likely it is to be wrong). Thus, in a beneficial enhancement of this aspect of the invention, the controller sends a message to the user who is being tracked to confirm the prediction before an item is controlled. For example, if the controller predicts that the user is coming home, the controller sends a message to the user asking him if he is in fact returning home whereby the user can respond appropriately and the controller perform its control operation. Alternatively, the message may ask if certain device(s) should be controlled based on the computer's predictions whereby the user can respond. Thus, the controller has confirmation of its prediction (or that the prediction is wrong) and controls the devices accordingly. Another benefit is that this user feedback can be used to refine the prediction process to varying degrees by the controller.

The messages sent to the user can be simple text messages (or other messages via such things as SMS, MMS, or other message delivery system) to which the user responds, which responses are likewise of a form that are easily received and recognized by the home network. Alternatively, the controller may call the user on his cell phone and play a prerecorded or synthesized question or statement to the user such as "Are you coming home?" or "should I start dinner?" Preferably the controller is further operable for receiving and recognizing the user's vocal response by voice recognition techniques known in the art.

Application of the automation aspects of the invention is not limited to home automation. For example, many vehicles now have specialized satellite link systems, such as General Motors' OnStar System. GPS mapping and navigation information downloaded to automobiles and other devices is also well known, for example, TomTom by TomTom International, BV. Wireless internet will soon be a general reality for automobiles, as well, allowing the automobile to access the internet.

Thus, it is contemplated that an automobile may also be informed of the user's location (directly from the cell phone or by GPS tracking services, or otherwise) and be operable for unlocking its doors, automatically starting the engine, etc. when the user is nearby or heading toward his automobile or upon receiving a message or command from the user (for example, by sending a text message to the vehicle, or by calling the vehicle via VOIP or cellular and instructing the vehicle with instruction. In these examples, the vehicle has a computer operable for sending, or receiving commands, and for implementing the commands received. As with other examples, it is contemplated that the on-vehicle computer may provide voice recognition of the user where the recognition algorithm can understand received voiced commands and/or use the voice as a biometric authentication of access to the on-vehicle computer. It is also contemplated that his cell phone may communicate with the automobile directly, via Bluetooth, over the internet, etc. for example, and be operable for automatically exchanging code information (such as a coded login, or a password, or other unique identification information) with the automobile for unlocking the doors or starting the engine.

In another application, the RFID tagged cell phone is read by the automobile which recognizes the cell phone and unlocks the vehicle, starts the engine, etc. Thus the cell phone is contemplated to replace the familiar (and bulky) keyless entry system, ignition keys, etc. Beneficially, the cell phone automobile entry and/or ignition system is preferably operable for recognizing more than one cell phone so that users are no longer required to pass the keys or keyless entry module(s) to another to allow them to use the vehicle. The family vehicle, for example, can recognize all family members' cell phones and enable any of them to use the vehicle (or a select few). Additionally, a single cell phone can be a "key" to several vehicles.

Another benefit of a vehicle recognizing cell phones to gain access to the vehicle is that each cell phone can hold a user's driving preferences which are downloaded to a vehicle controller (e.g., the aforementioned on-vehicle computer system). Thus, the user can have the radio programmed to his favorite channels, the ventilation system set to his desired temperature, the seat, pedal, mirrors, etc. adjusted to his liking simply by the vehicle recognizing his cell phone and downloading his driving profile from the cell phone. Alternatively, the profile(s) of authorized drivers may be stored within the vehicle and recognition of a specific cell phone simply invokes that user's preferences. However, having the profile stored in the cell phone makes the profile portable to virtually any vehicle equipped to read and implement it. In this later case, it is preferred that such things as physical preferences (seat location, pedal height, mirror location, etc.) be stored in such a way that they are easily translated to the cockpit of different makes and models. For example, it is contemplated that a more general user profile store things like the user's likely eye position, feet position, leg length etc. rather than the position of the user's seat, pedals, mirrors, etc. Alternatively, the relative position may be stored with reference to a fixed point, for example, the steering wheel or windshield, etc. Beneficially, the user's cell phone or vehicle may store more than one driving profile for a user and be automatically selectable based on time of day, or time of year, or his location (for example, he may like one profile going to work and another coming home from work or one radio station going to work and another coming home, etc.).

It is contemplated that the vehicle be connected to the internet or other network (intermittently or continually) so that its owner can download identifiers to the vehicle which will allow the vehicle to recognize specific tagged (not just RFID tag but any readable information tag that the cell phone may contain) cell phones as being authorized to access the vehicle. Additionally or alternatively, internet access to the cell phone allows the authorization codes necessary, if any, for access to the vehicle to be downloaded to the cell phone as well. Added security can be obtained by matching fingerprint recognition, or eye scanning, with both the cell phone and car. Another method available for the transfer of information to/from the vehicle computer system is a personal area network described below (e.g. Redtacton).

Customization of cell phone services or features based upon the user's location and under the user's control is also contemplated. For instance, the user can cause his cell phone to alert him of an incoming call in different manners for different people according to his position. For example, the user may instruct the cell phone to audibly ring if one party calls but vibrate (silent alert) when another person calls for certain locations. For example, he may further instruct the cell phone that this action occur only when he is at home. Additionally, he may specify other alert methods for these same or other callers when he is at a different location, such as his office.

It is known in the art to allow the downloading of ringtones so that a user may customize the ring alert of his cell phone. In another use of the invention, a user may select different ringtones to be played as the audible alert on his cell phone depending on his location, received caller ID information, time of day, etc. Ringtones are typically used to allow customization of the cell phone's audible alert of an incoming call. In an improvement of this capability, it is contemplated that the user can select ringtones that he hears when he places a call, replacing the line ringing he usually hears while waiting for the called party to answer his phone. Playing of this ringtone is easily accomplished since the cell phone has knowledge of a call being placed and that the cellular system is sending the 'ring' command (or packet) while waiting for the called party to answer. The cell phone simply substitutes the selected ringtone for the ring the user typically hears when he calls someone.

Use of this aspect of the invention is particularly beneficial with so-called ringback messages, see for example U.S. Pat. No. 7,006,608 and U.S. patent application Ser. No. 10/121,626 both of which are herein incorporated by reference. These systems and methods purport to replace the ring a calling party typically hears when he calls another with messages of the called party's choosing. Contemplated messages include advertising materials and otherwise. The reception of information not requested, particularly advertising materials (for example, commercials), is typically quite undesired by the recipient. Therefore, the invention contemplates and allows user selectable ringtones (which may even be the usually ringing one is accustomed to hearing) to be played in place of the ring (or ringback message) that a caller hears when he calls another, providing the ability to override that which the called party wishes him to hear during the ringing time.

In a beneficial improvement, it is contemplated that the user may wish to hear messages or sounds of the other's choosing based on the number he is calling, for example, when calling a friend or family member. Thus, preferably, the user can select those numbers he may dial for which he wishes to allow ringback message or sounds to be received by him, while overriding other called party's ringback messages and sounds. These numbers are stored within the cell phone which is further operable for accepting ringback messages for calls placed to these numbers while blocking ringback messages (and preferably substituting other sounds) to calls placed to numbers not on the list. In one application of this aspect and/or other function-customizable aspects of the invention, the so called address or phone book of the cell phone (typically used to store names and associated numbers) includes provision for constomizing cell phone operations for names/numbers contained therein.

In still another improvement, it is contemplated that the user may cause the cell phone to automatically select a sound or message that a caller hears when calling the user's cell phone, as is known in the art, but wherein the selection is automatically made by the cell phone and based, in whole or in part, on the user's location. More complex selection criteria, for example, being based on location and caller ID information, or time and call ID information, or location and time, etc., are also contemplated.

Thus, whether calling out or being called, the cell phone can automatically inform a called (or calling) party of the user's location, or give other information (such as his probable status, tones, music, multimedia, etc) based on the user's location (and preferably only to those of his choosing). For example, a user may program his cell phone with several image icons representing himself and directing that when he is away from home (as indicated by his GPS position (or otherwise)), which usually implies he is working, and he places a call, the icon showing him wearing a shirt and tie is sent to the called party for display on the called party's phone. When he is at home according to his GPS positioning and calls someone, the icon sent to the called party is the caller casually dressed indicating that he is at home.

It is also contemplated that the position information can be combined with time information to choose the information sent to the called party. For example, a late night call placed from home may cause an icon to be sent that shows the user in pajamas. As another example, the cell phone sends the icon indicating the user is working when he is out, during the times 9 am to 5 pm, Monday through Friday, but during these times on Saturday and Sunday, the icon indicates another activity, place or status.

As with the ringtone (and ringback) examples above, in one application, the icons are stored at the cell phone and transmitted to the cell system to be transmitted to the caller. Alternatively, the icon(s) may be stored at the cell system and associated with the cell number so that an icon is transmitted to the caller when he calls the associated number (or when one is calling the associated number). If the user stores more than one icon at the cell system, it is preferred that his phone selects which icon the cell system is to transmit to a caller or one who is called. This selection may be indicated to the cell system from time to time or in response to a specific incoming call signal or as part of the outgoing (call initiation) call signal.

The aspect of the invention having position-based icons or status messages to be displayed on others' cell phones has particular benefit for the many mobile messenger services, such as, MSN, Yahoo Messenger, AOL communicator, ICQ as well as a host of others. Thus, a user can cause different icons or status messages to be displayed by the messenger application on others' cell phones or computers where the icon or status message corresponds to the user's location. The various aspects of the invention disclosed need not solely rely on GPS for position determination, for example, wireless network or device identification, as described above, can also be made to cause the user's cell phone to effect a change in the displayed icon on others' cell phones and computers, time differencing of cell signals to determine position is also contemplated. The user's cell phone need only inform the mobile messenger service of the icon or status messages to be displayed to effect the change of display of the icon or status message on others' phones and computers.

In the above examples, illustration of the invention relied on the messages, tones, icons, etc. be transmitted as part of the call. Another alternative contemplated is for the cell phone to send location-dependent messages, icons, tones, etc. when calling another (or being called by another). In one application, this is accomplished by the cell phone being programmed so that, when a user calls a number, there is a message, icon, sound, etc., sent to the called device via SMS, MMS, internet, the cellular paging system, etc., for example. It is contemplated that the message may be indicated or tagged as being associated with the incoming call so that the receiving cell phone may operate to immediately display the message without user intervention. In this way, multimedia information can be transmitted concurrently with placing a call and the receiving cell phone is operable for display the graphic information, or playing the audio information automatically.

For example, the user programs his cell phone with messages to be sent with outgoing calls indicating he is at home, at work, etc. so that when he places an outgoing call, a corresponding message is concurrently sent to the same number. The messages may be text based, audio based, graphical information based, etc. The message to be sent concurrently with the placing of the call is selected by the cell phone from among the available programmed messages based on the cell phone's location, time, called number, user selection, or other user-selectable criteria. The receiving cell phone is operable for displaying or playing the received message, preferably as the call arrives.

Typically, messages, such as SMS or MMS, are routed through different systems from the cell phone call itself. Thus, in one application of the invention, to maximize the likelihood that the call signal and the message arrive at the destination cell phone at approximately the same time, the message is tagged or indicated by the cell phone as being a message concurrently sent with the placing of a cell call. The message routing and delivery system (e.g., SMS, MMS, etc. system) is operable for detecting this tag and giving priority to messages of this type so that they do not become overly delayed in the message system. Thus, there is greater likelihood that the message will arrive at the destination cell phone at nearly the same time as the incoming call signal to that same cell phone. The tag can reside in the header packet or packets of the message so that it is easily detected though it may also exist as an independent packet, extension to the head, etc. The cell phone may also automatically send a message, icon, etc. to a calling party in response to receiving a call from the calling parting, and further, the selected message or icon, in whole or in part, may be based on the called cell phone's location. For instance, the user may program his cell phone to respond by text, MMS, icon, etc. message to a calling party based upon his location or according to other constraint or user selection. As an example, the user may program a number of location-based messages into his cell phone such as "I am at home", "I am mobile", "I am at the office", "I am in bed", etc. These messages may be associates with specific locations (or the absence of specific locations). For instance, the phone may respond with "I am mobile" if the user is not at home, work, etc. In this manner, whenever he receives a call, the cell phone responds with a message based upon his location information to the caller. Beneficially, at the user's option, the message can be sent whether the call is answered or not or selectively sent only when the call is answered or only when the call is missed. As a further enhancement, the user may indicate to the phone to only allow certain messages to certain calling parties (such as by the cell phone identifying the caller ID information of the incoming call) so that he may keep his location or status secret from some and inform others.

The messages need not be location based. For example, a user may indicate to his cell phone to respond with "I'm busy, call me back in 15 minutes" to incoming calls or only some incoming calls when he is temporarily indisposed. In another example, he may program his phone to automatically respond by message to the caller with "I'm on another call" whenever he receives a call and is in fact engaged on another call. This is particularly useful since most cell phones have call waiting and the cellular system does not indicate a busy signal to the caller when the called phone is, in fact, busy. As with the ringtone and outgoing icon examples above, the outgoing message(s) or icons sent to a calling party may be stored in the cellular system and the user's cell phone simply indicates which message the cell system should transmit or the messages are stored on the cell phone and sent by it.

The cell phone or cellular system may also have a storage area, such as a "My Status" memory area for example, which the user is allowed to program from time to time, or from which he selects status messages of his choosing. The "My Status" indication may be selectively programmed to be sent by text, SMS, MMS, as part of the call signal, etc., to callers or message senders (either all callers or a select some (as identified by recognizing the caller ID information or by identifying the sender of a SMS, MMS, etc., message for example) and/or based on location, time, whether the call was taken or missed, etc.) whenever the user receives an incoming call, in accordance with any of the methods disclosed herein. The "My Status" message can include messages such as, "unavailable", "in a meeting", "poor cell reception", "at home", etc. These messages may be predetermined messages that the user selects, wholly programmable messages, or a combination of these. Further, the cell phone may automatically (or be programmed) to select some of the messages based on location, state of the cell phone or cellular signal, etc.

The cell phone may also query a common-name for its present GPS coordinates from the cellular system, an internet website, etc. and respond by message to calls using this common name. For example, a user's current location may be that he is at StarBucks at XYZ shopping mall, but all the cell phone determines is the GPS coordinates. To offer a more user friendly message about his location to incoming callers, the cell phone queries an internet website for the common name of the location corresponding to the GPS coordinates of the cell phone. Thereafter, in the above example, the cell phone can respond to incoming callers with the message "I'm at StarBucks at XYZ mall." (This is the #GPS_location (element 602) indicated in FIG. 6.) In this manner, the caller can quite simply find him or at least know his location. This is far more useful than providing a curious party with GPS coordinates or requiring the calling party to use a GPS mapping program on his cell phone. This is particularly advantageous when the caller is using a cell phone himself, with its limited display size and where manual internet access is cumbersome.

Another aspect of the invention allows for richer information return when one user calls another. For example, a caller calls a restaurant to place a reservation. In response to receiving the call, the restaurant communication system passes the number (typically obtained by a caller ID system known in the art) to a subsystem having internet access, whereby a web address (e.g., URL, IP address, etc) is sent to the caller's calling device via text message (e.g., SMS, MMS, or other message system). SMS and MMS messages are typically sent to one's telephone number. The sending of email and/or webpages may require the system to obtain the calling device's IP address. Thus, in some embodiments, the communication system of the present invention is operable for determining an IP or other address of the caller from his call-in number by use of a translation or lookup service which relates telephone numbers to IP addresses.

Thus, in one application, the cell phone is operable for allowing the recipient of the message to select and "click" the link from the message directly and be taken to the restaurant's webpage where he may view, for example, the reservation systems, menu, specials, coupons, décor, dress code, a map to the restaurant, etc. In another application, the cell phone is operable for allowing the recipient of the message to select, copy and paste the link into a microbrowser resident on the cell phone. In another application, the recipient simply enters the link manually into the microbrowser of the cell phone to surf to the webpage.

The restaurant's system may also respond with a message containing more than simply a URL or IP address, for example, a multimedia message that may contain information similar to that available on the restaurant's webpage. In another application, the restaurant's communication system obtains the caller's telephone number (typically through caller ID information) and causes it to be converted to an IP address (for example, by transmitting the number to a service that maps or translates telephone numbers to (mobile) IP addresses) and the restaurant's webpage is pushed to the calling device. In another application, the caller's telephone number is an IP address (or pseudo IP address) and so the telephone number-to-IP address mapping or translation step of the inventive method need not be performed at all. In another method, the message is simply directed to the cell phone number (as is typical for SMS or MMS messages.) Thus, the act of calling another can initiate a web browsing session without the user ever entering or even knowing a URL or IP address to enter into his browser.

There may also be some interaction with the caller before information is messaged (actual or link) or pushed to him. For example, a caller may call a department store and be asked which department he wishes. Once he indicates his selection, he is then sent a link, a multimedia message, or pushed a webpage so that the information he receives is more targeted to his current interest. Beneficially, one need no longer listen to an endless litany of store specials and promotions when he calls a store as the store can now send him this information (e.g., as a link to the information or the actual information) as data rather than waste time giving the information vocally (and saving the incumbent frustration usually created). Additionally, the information is accessible (and stored in some applications) to the user whenever he wishes it so that he need not write it down or try to remember it.

In yet another application, when one calls 411 or other telephone number information service, the number (or numbers in some applications) the caller wishes is (are) sent as a message (or link) to the caller's calling device. Thus, he need not remember the number or even right it down since he now has the number in the form of a message (or a link).

As was discussed above, in one application of the invention messages are sent from a called cell phone to one who is making the call. Sending a message (either as text, multimedia, or other form) concurrently when placing a call and as an action initiated as part of the call is useful in other applications besides location-based messages. For example, a user may program the message "EMERGENCY" or "HELP" and indicate that it should be sent concurrently with the call he is placing, so that the receiving party knows that the call coming in is one he should not ignore. This is particularly advantageous when the called party is perhaps engaged in another call and may be inclined to ignore the incoming call (or may even be unaware of it if he does not have call waiting) until he is finished with his present call.

In one form, the message is sent by text message and by conventional systems such as SMS, MMS, etc. In an alternative form, the message is a multimedia message comprising more than simple text and is sent by MMS. In yet another form the message may be sent as part of the call initiation packets sent to the called cell phone, similarly to the caller ID information sent to a called cell phone. Thus, the cell phone may include message information as part of its call initiation procedure to the cellular system, and that information is then delivered to the called cell phone as the cellular system attempts to complete the call to the called party. This has the advantage of guaranteeing that the message is received concurrently with the call arriving at the called cell phone.

A message sent concurrently with the placing of a call may also comprise commands or queries to a called system. For example, a user may call a store or other business with a message indicating that he wants the business' URL. A system associated with the business can then simply respond (by message containing the URL or by pushing the webpage itself or other method) to the caller and need not necessarily answer the call.

Typically, a call is placed by the user dialing a number and then pressing a key on the keypad which initiates the cellular calling procedure. The cell phone may also have a calling key such that when it is pressed, the call is placed with a message, status indication, or otherwise and another key such that when it is pressed, the call is placed without the message.

Some desired location-based cell phone operation modifications are difficult to specify with absolute position coordinates, mainly because they may not be associated with a fixed position. For example, it is annoying for a cell phone to audibly ring while in a meeting or at some social events but these may not be at the same place all the time. Vibration alert is well known in the art and can greatly reduce annoyance to others but is not used effectively by many because it requires them to constantly remember to change phone settings (between audible and silent alert). Vibration alert is almost always sufficient if the cell phone is on the user's person and so automatically detecting this location (being on the user's person) would greatly and automatically cut down on annoyance to others in many cases. Thus, a cell phone that can sense its location relative to its owner can beneficial modify its operation to reduce unwanted annoyance to others. One way of achieving this location determination is for the cell phone to include a temperature sensor for sensing the ambient temperature and wherein this temperature sensing is coupled to the cell phone controller that can read the temperature sensor. The cell phone is operable for determining the ambient temperature and adjusting it incoming call alert accordingly. In this way, the cell phone can operate to detect when it is on the person (say in his pocket, hand, etc.) by sensing body temperature (or a range of temperature typically indicating body temperature) in which case it can safely vibrate to alert the user. When the temperature it senses is significantly higher or lower than body temperature (or a range defining body temperature), the cell phone is operable for audibly alerting of incoming calls since vibration will typically not alert the user of the incoming call.

Another method for determining whether the cell phone is on the user's person is to use capacitive proximity methods, also well known in the art. Basically, the cell phone is operable for detecting the ambient capacitance near it. This can be achieved by placing two plates near the surface of the cell phone and driving one with an AC waveform. The human body has a very high capacitance relative to a great many other things (for example, air) and will act to affect the dielectric constant (typically raise) between the two plates when proximate to them. This change in dielectric constant will affect AC current flow between the plates according to the changes in dielectric constant (e.g., the capacitance of the system) and so when the ambient capacitance is high, say above a given threshold, the cell phone 'knows' that it is near a body and alerts of incoming calls in vibrate mode. Yet another method is to adapt a so-called personal area network technology, an example being NTT's RedTacton system, so that the cell phone contains both the sender and receiver of the personal area network and is operable for simply detecting that the cell phone is close enough to a body that the body closes the loop between the sender and receiver. (For further information on personal area networks see U.S. Pat. Nos. 6,754,472; 6,223,018; 6,211,799; and 6,104913 all of which are herein incorporated by reference). Thus, it is straightforward for the cell phone to detect that it is on a user's person or very close to it (for example, RedTacton purportedly works within 20 cm of the body) and to operate in accordance with this determination. For example, operations may include the aforementioned example of vibrating when on (or near) the user and ringing otherwise, or sending a message based on the proximity of the cell phone to the user. (For example, an unanswered incoming call wherein the phone is away from the user can have the message, "I'm away from my phone," sent as a response, whereas an unanswered call, but wherein the cell phone is in the near-proximity of the user, can have the message, "I wasn't alerted to your call, please call me again," sent).

While the majority of the above description was based on GPS position determination, this was merely exemplary. There are other methods of cell phone position determination, both absolute and relative, examples of which are time-differencing of multiple cell signals, differential GPS, as well as proprietary systems and the aforementioned detection and recognition of a wireless network or interconnect and near-field transceiver or RFID methods disclosed above (where the network, interconnect, or transceiver location is known (absolutely or relatively)). Additionally, there are the many patented references incorporated herein as well as many other methods known in the art but not herein referenced. Any of these can be made to serve the location determination aspects of the invention as described above.

Additionally, multiple location determination methods may be combined and beneficially employed, for example, combining GPS position determination with wireless network identification and recognition. This is particularly advantageous in some applications due to potential loss of GPS signal within buildings or otherwise.

4. Vehicles and Cell Phones and their Use Together

Many studies have recently been published citing the increased likelihood of accident due to cell phone use while driving. Many municipalities and states are considering or have implemented restrictions with regard to cell phone use behind the wheel of a moving vehicle. However, enforcement of such restrictions is virtually impossible. Uniquely-RFID-tagged cell phones provides a way of restricting use of a cell phone behind the wheel of the vehicle and enforcing the restriction. In an automobile, ideally only the driver's phone should be disabled while allowing others' cell phones within the automobile to operate.

However, the cell phone suppression systems known (for example, U.S. Pat. Nos. 6,675,002 and 6,987,987, herein incorporated by reference) for suppressing cell phone use are designed for wide area use or at least would have great difficulty suppressing the driver's cell phone within a vehicle and not the others. In another cell phone suppression system (commonly known as "NoMoPho" and described at www.NoMoPho.com) which does not rely on a generalized suppression signal, the cell phone purportedly disables itself when the cell phone detects that it is moving above a certain speed threshold but this has the disadvantage that it is indiscriminate, potentially disabling cell phones when in cabs, busses, bicycles, etc. and does not discriminate between a driver's cell phone and others that may be in the vehicle. (This system can be greatly improved upon by the vehicle or other restricted transport (airplane for example) transmitted a general information signal that this vehicle is restricted. Thus, the cell phone is operable for determining its speed and receiving this signal and only disabling itself when above a restricted speed AND in a restricted moving vehicle. However, even this approach may also be too broad-based in some circumstances in that the driver's phone is not the only phone so restricted).

U.S. Pat. No. 6,832,093, herein incorporated by reference, discloses another system for restricting cell phone operation. This system purports to, among other things, transmit locations and restrictions to the cell phone which is operable for determining its position and implementing the restrictions. However, while this could theoretically be used for a moving vehicle (by sending the GPS coordinates of the road the user is on to the cell phone with instruction to disable for example), practically it has the problem that general GPS can only resolve to about 15 meters—far too large to pinpoint a certain phone in the interior of a vehicle or even to discriminate the roadside in many cases so that many more than the drivers of automobiles will have their cell phone's disabled. Additionally, this system has the disadvantage that it requires intimate involvement of the cellular system (which typically sends the restrictions and location information to all cell phones in the area).

What is needed is a more discriminating system for restricting cell phone operation. A cell phone that is uniquely tagged with an RFID according to aspects of the present invention can be read by a vehicle-based RFID reader located so that it only reads cell phones in or very near the driver's seat. The vehicle is then preferably operable for sending a suppression signal to the cell phone but wherein the suppression signal includes addressing information. The cell phone is operable for receiving the suppression signal, as is known in the art, but where the cell phone also checks the address sent as part of the suppression signal and only implements the restriction if the address information matches the cell phone's RFID tag address information (or is related to it). The RFID reader may operate continuously or at short intervals so that any exchange of cell phone between the passengers and driver can be detected and the suppression signal modified accordingly. Certain operations, however, should not be disabled by the suppression signal, for example, attempted calls to 911 and so the invention contemplates that the cell phone override the suppression signal for such calls.

One method for transmitting the suppression signal from the car to the cell phone is by use of Bluetooth. More and more vehicles are coming equipped with Bluetooth for the specific purpose of interacting with a user's cell phone. The Bluetooth network within the vehicle can be used to address only the driver's phone (once its ID is discovered by the RFID system), even though other phones in the vehicle may or may not be connected to the vehicle's Bluetooth network, and for instructing only that phone to be disabled. Preferably the suppression signal is only sent or indicated as being active when the vehicle is moving or engaged to be moved.

Use of the more general near-field transceiver technology allows two way communications between the reader and the tag. Thus, a cell phone equipped with the more general near-field tag can not only be sensed but also instructed to not operate in the vehicle. As is known in the art, near-field (and RFID) technology is inherently short range, typically designed for operation from an inch or so up to 18-24 inches and thus is well suited to the present application. As with all applications presented, it is preferred that the cell phone operation only be restricted when the vehicle is moving or engaged to move. Therefore, in one embodiment, the near-field reader in the driver's area communicate suppression commands only when the vehicle is moving (or when engaged to move).

In another system and method, the driver's seat contains an RFID tag indicating that this is the driver's seat of a restricted-use vehicle. The cell phone includes an RFID reader for reading this tag and is operable for restricting the cell phone operation when the tag is detected. In this case, the RFID tags are likely the same among vehicles, being used (by their detection) to indicate that the cell phone is in the driver's area of a vehicle. The RFID tag of the vehicle may also beneficially be operable so that it only acts to restrict the cell phone when the vehicle is not in park or neutral, so that calls can still be made from within the vehicle when not moving. Thus, when the vehicle is not moving or engaged to be moved, the cell phone's RFID reader preferably does not sense the tag because the vehicle has disabled the tag and the cell phone operates normally. However, as soon as the vehicle is moving or so engaged, the vehicle allows the tag to operate and the cell phone now sensing the tag, inhibits the cell phone's operation. This aspect of the invention may be used with other vehicle-based suppression systems.

Personal area network technology (for example, Redtacton referenced above) offers another way of restricting only the driver's cell phone. The driver's seat, steering wheel, pedals, or other area closely associated with the driver may comprise a personal area network transmitter and the cell phone have a personal area network receiver whereby the driver is the conduit by which the two communicate. The cell phone is operable for receiving a personal area network cell phone operation suppression signal from the transmitter. Thus, only the driver's cell phone would be suppressed using such a system and method.

People are apparently quite fond of driving while using the cell phone and so the political will to pass restrictions on their use in vehicles may be lacking. However, driving safety would be greatly enhanced simply by notifying other drivers that a cell phone is in use in the vehicle so that they can avoid or more closely watch the potentially-distracted driver. Thus, much like hazard flashers commonly equipped on vehicles today, the vehicle can include a signaling light or other device for indicating to others that there is a cell phone in use in the vehicle. The vehicle is operable for determining that the cell phone is in use and enabling the signaling device to alert others. For an automobile that is equipped with Bluetooth for coupling with the cell phone, it is a simple matter to determine when the cell phone is in use. This can be by the cell phone informing the vehicle over the Bluetooth interconnect, by the vehicle monitoring voice traffic on the Bluetooth interconnect, via a personal area network, etc. Another system of detection includes an RF sensor within the automobile that is tuned to detect typical cell phone transmit frequencies and inform a vehicle controller that the cell phone is on whereupon the controller can activate the signaling device. In another method, the cell phone is operable for transmitting a special signal whenever it is engaged in a call. The vehicle is operable for detecting this signal and enabling the signaling device.

As those in the art will appreciate, detecting cell phone use has utility beyond signaling drivers of other vehicles. For example, detecting use within airplanes, hospitals, etc. can be used to signal or trigger certain security measures or warning systems. Detecting use within a theatre may alert that someone is illicitly recording or broadcasting the production. At other events, cell phone use may be tallied to indicate viewer distraction or viewer excitement (since people seemingly have to call another when they hear or witness something of interest to them).

Another beneficial use of a vehicle communicating with the cell phone is for the car to download information to the cell phone. For example, mileage of the vehicle can be tracked and logged in the cell phone for business use reimbursement or tax deduction calculations. In one application, the user indicates to his cell phone that he wishes it to record the mileage from the present odometer reading. The odometer reading is made available to a on-vehicle computer which can communicate with the cell phone (e.g., over Bluetooth). The cell phone is operable for querying the vehicle to determine its present odometer reading in response to the user's direction that he wishes to record the reading. When the user ends his trip, he indicates to his cell phone to record the final odometer reading or to calculate his trip mileage, etc. In response to this direction, the cell phone again queries the vehicle whereby the vehicle gives the cell phone the current odometer reading. Alternatively, the vehicle is commanded to download the information to the cell phone without the cell phone querying the vehicle. In one application, the cell phone stores these readings and allows the user to label this trip for easy reference or recall. Thereafter, the trip information may be printed out if needed or simply stored on the phone or elsewhere until needed.

In a similar vein, a cell phone operable for communicating with a pay station or terminal for purpose of storing transaction receipts provides tremendous convenience and greatly reduces the risk of lost receipts. In one application, the electronic receipt that is communicated to the cell phone is also digitally signed (digital signing of digital documents is known in the art) by the issuer of the receipt so that the electronic receipt is verifiable by the issuer. ("Digital signing" in this context will be understood to include any method of verifying the validity, and preferably, the integrity of the underlying digital document.) Thus, the electronic receipt can completely replace paper receipts and be used for the return of goods if need be.

This aspect of the invention can also be used even if the cell phone is not engaged in the paying of the transaction. For example, the pay station, case register, terminal, etc. is operable for communicating the receipt information to the user's cell phone through any of the technologies herein described. In one application, the information is transferred by use of near-field transceiver technology owing to its requirement of relatively close coupling between the cell phone and the pay station, cash register, terminal, etc. equipped with the near-field transceiver which will transmit the receipt information. In another application, the information is transferred via a personal area network (PAN). The cell phone, in this application, is equipped to receive the near-field-transmitted or PAN-transmitted receipt information and storing it. Additionally, in some applications, the cell phone can also transmit this information back out of its memory so that the user may print the receipt as he wishes or for the store to verify the receipt when engaged in accepting returned goods.

5. Voice Recognition, Synthesis and Notetaking while Mobile

Many people receive telephone numbers, instructions, or other information by voice over a cell phone but have no way to write it down when they receive it, usually because they are mobile. According to this aspect of the invention, the cell phone can be commanded (for example, by pushing a button on the cell phone, pushing a button on a Bluetooth-connected headset, etc.) to record the voice conversation (both sides or just the incoming voice) for storage as voice notes or other information of this nature. The cell phone stores the digitized voice within its memory for playback at a later time. In one application, the voice notes are automatically tagged by the cell phone with summary information which is contemplated to include any of the following: date, time, number of the other party, name of the other party, etc.

In another application of this aspect of the invention, the cell phone has voice recognition, well known in the art (for example, voice actuated dialing in combination with cell phones is well known), and can transcribe portions of the conversation (at least that received from the other party) into text messages, either later, or as the conversation is occurring. As with the voice notes described above, the cell phone may also store and tag any transcribed notes. In one alternate application according to this aspect of the invention, the cell phone is operable for monitoring the call and transcribing any numbers it hears and recognizes automatically so that telephone numbers are automatically transcribed and saved without the user being required to indicate that he desires them.

Along these same lines, the cell phone may be instructed to automatically listen for certain keywords and record and/or transcribe a portion of the conversation before, during, or after the keyword. In another application, the cell phone can be voice commanded during the call. Preferably, the cell phone (or headset, etc) has a button or other input device that allows the user to indicate to the cell phone that what he is saying is a voice command to be recognized by the phone. In one application, when the button is depressed, the cell phone suppresses the sending of the user's utterances to the other party on the call. Instead, the cell phone recognizes and implements the command. In this way, the user can command the cell phone, during an active call or communication, by his voice for such things as recording or transcribing a portion of the call, adjusting volume, muting the microphone, turning on/off speaker phone, etc.

In another application, when the user indicates that what he is saying is meant to be interpreted as a voice command by the cell phone, the vocal utterance is digitized and transmitted as a stream of packets as is done for any normal conversation transmission. However, the packets that carry the digitized voice are indicated as being parts of a voice command (for example, the user can press a button while giving the voice command and then release it to indicate the end of the voice command). In one application, he indication is made by marking each packet as being part of the voice command or by delineating a stream of packets as being the voice command (for example, by inserting a control packet in the packet stream where the control packet informs the cellular system that the next N packets contain a voice command, or by inserting a control packets that bound that portion of the packet stream containing the voice command, (e.g., a start and a stop packet with the voice command packets in between)). The cellular system preferably 'snoops' the voice communications and when it finds packets that are indicated to be carrying voice commands, the cellular system operates to intercept these packets and to recognize the voice commands. Thereafter the cellular system may implement the voice command or it may send the command to the cell phone (from which the voice command originated) in a form that the cell phone can easily recognize (for example, a digital code or instruction) and the cell phone operates to implement the command. Thus, the cell phone need not have voice recognition capability (with its incumbent processing needs) but is still susceptible to voice commands. Additionally, with this system and method, the cellular system can be commanded by voice commands from a user even though a cell phone conversation is in progress by the user and another.

In still another application, the cellular system records and/or transcribes a portion of the call (both sides or just one side). In this application, the user indicates to the cellular system to record or transcribe the call. For example, the cell phone (or a headset) preferably has a button that the user may depresses to indicate to the cell system to record or transcribe the call until the button is released or pressed again. Once the recording and/or transcription is completed, the cell system preferably sends the user a message via SMS, MMS, email, etc. of the recorded and/or transcribed portion of the call. In one application, transcription is done by voice recognition so that the call remains secret between the parties, though a live person can accomplish the same thing. The message sent to the cell phone may contain just the voice recording, the transcription, or may be both voice and transcription.

Because there may be a delay in the cellular system receiving an indication that a portion of the call is to be monitored, in one application the cell system includes some portion of the conversation prior to its receipt of the indication to monitor, record or transcribe. Thus, if one hears a telephone number, he can quickly indicate to record that portion of the conversation and the cell system can easily record or transcribe it. This is a simple matter to implement with digital communications in that the cellular system can simple maintain a circular queue which buffers a portion of the conversation to the recording or transcribing subsystem in case the user indicates that he wanted that portion recorded. This same queuing technique may be used in the cell phone application of these aspects of the invention.

Thus, the user can easily take notes of a conversation even if his location is someplace where there is no way to write the notes down. Additionally, any of these aspects of the invention can be used with cell phones having so-called "walkie-talkie" capability.

Messages (text, multimedia, email, etc.) received on a cell phone, can be problematic when the recipient is walking, driving, riding, etc., because it can be quite cumbersome to read the message on the small screen while moving. It is known in the art to convert text information to audible information through use of so called 'voice synthesis' systems. Basically, these systems recognize and convert text words and sentences to appropriate phonemes which are then 'played' to the listener to create an audible form of the text.

According to this aspect of the invention, the cell phone is equipped with a voice synthesis subsystem so that a user can listen to text messages, or portions thereof, rather than read the text on the screen of his cell phone. Thus, textual information in the cell phone (for example, received text messages, received email, address book entries, etc.) is directed to the voice synthesis unit which is coupled to the cell phone's speaker and is operable, automatically or on command, for converting the textual information to human-understandable utterances representative of the textual information. The textual information (e.g., message, email, etc.) is output by the voice synthesis subsystem to and played over the cell phone's speaker just as for voice messages or a telephone conversation. Of course, the message may also be played over a wired or wireless headset connected to the cell phone.

It will be appreciated that this aspect of the invention is useful for emails, MMS, SMS, chat messages, and other text-containing messages. Typically, some of these message types contain data types that is not susceptible to being converted to vocalizations (for example, pictures, graphics, etc.) and in one application, the voice synthesis subsystem recognizes these data types and inserts a descriptive phrase when it finds one of these data types. For example, an email having an attached picture or graphics file can be recognized by the subsystem as being a text message with a picture or graphic file attachment. The subsystem then vocalizes the text message and simply states that there is a picture attachment to the email. A picture or other data type can typically be identified from embedded information in the picture or other data file and this used to make the descriptive announcement of the data type. Data types of attached or embedded files can also be identified from the filename extension typically associated with a file of that type (for example, JPEG, MOV, WMF, RM, MP3, MP4, XLS, DOC, GIF, etc., to indicate pictures, video, audio, etc.) While the implementation above used the illustration of an attachment, other applications are within the scope of the invention. For example, the systems and methods can be operable to identify and announce data types embedded within the message itself.

In another application, the cellular or message system responsible for routing and/or ultimately transmitting the message to the destination cell phone performs the voice synthesis conversion of the text message and transmits this machine-made vocal message to the user's cell phone (either with or without the actual text message). In another application, a head- or ear-piece, such as a Bluetooth headset typically used with cell phones, contains the voice synthesis subsystem. The headset is operable so that the cell phone may transmit the text message to the headset, say over the Bluetooth link, and have the headset synthesize and play the message to the user.

In one application, the voice synthesis system is operable for recognizing typical message "shorthand" and converting this to proper words or phrases. For example, "bbl" in message shorthand would typically be translated to the audible phrase "be back later". Similarly, the message shorthand "gr8" would be translated to the audible word "great" and so on.

The combination of voice recognition and voice synthesis in a cell phone offers even greater convenience for the mobile user. For example, in one application, a user who is driving may receive a text message over SMS. According to the invention, he has the cell phone give him the message audibly (through voice synthesis) since it is too difficult to read the message while driving. He discovers that the message is urgent and that he must respond at once. Rather than manually input his response while driving, he elects to respond vocally, have his words recognized and converted to a text message and sent back to the sender of the original message over SMS (or by other messaging system or method).

In another example, a first person is engaged with second person in a cell phone conversation (at least the first person is using a cell phone, the other may be on his cell, landline, VOIP, etc.) During the conversation, the second person asks the first person for the phone number or other information about a third person. Typically, the first person would begin to navigate through his cell phone's "address book" to find the third person, quickly memorize the number or other information and then recite the information to the second person. In accordance with features of the present invention, now the first person can indicate to his cell phone that he wishes to voice input to it. He may recite "address book", then the third person's name, then recite "number" at which point the cell phone may ask him if he wishes to hear the number, if he wants the number recited to the second person, if he wants the number messaged to the second person's phone (e.g., by SMS, MMS, email, or other method), etc. The first person makes his selection and the cell phone operates accordingly.

Should the first person select that the number be recited to the second person, the cell phone operates to select the voice synthesis unit as the transmission source (e.g., becoming the microphone for the call) for the cell phone call. Thus, the recitation of the telephone number is heard by the second person. If the first person had selected that the number be messaged to the second person, the cell phone composes an SMS, MMS, email, or other message containing the information or number and sends the message to the other person. This can be done quite straightforwardly using SMS or MMS because the cell phone has knowledge of the telephone number of the second party either because the first party called the second (thus, it is contemplated that the cell phone stores the number of the most recently called person for these and other purposes) or because the first person received the call from the second and caller ID gave the number of the caller (thus, it is contemplated that the cell phone store the number of the one who calls for these and other purposes).

While the various aspects of the invention were illustrated for telephone number look up, the various features and capabilities may be applied to any information lookup on the cell phone.

6. User-Centric Virtual Telephone System

There are three major telephone call routing and delivery systems available today. They can be categorized as POTS (traditional land line-based telephone system and which may include PBX and similar), cellular, and internet-based (e.g., VOIP). Traditionally, a telephone number is assigned to devices, for example, a land line phone has an assigned telephone number that is unique to that phone (or group of phones sharing the connection) and a cell phone has a unique cellular number assigned to it. VOIP is more "dynamic" in that a subscriber typically has to log in to the VOIP service and so that "number" can exist on different computers at different times and location depending on from where he is logged in.

However for all three systems, when a caller wishes to contact an intended recipient, he typically must enter the number (e.g., telephone number) of the device at which he thinks or suspects or hopes the intended recipient is. Thus, a caller will typically call the recipient's home, business, and/or VOIP number(s), if not there, the caller will try the recipient's cell phone number. If he has still not reached the recipient, he may call the recipient's friends, relatives, etc. in an attempt to find the whereabouts of the recipient. Typically, the caller may leave messages at each number at which he attempted to reach the recipient. While this method works, it is lacking, cumbersome, and wasteful of time and resource. The main problem is that the caller has to call specific devices at which he guesses the intended recipient may be reached. What is really needed is a system and method that allows a caller to call a person, not necessarily a specific device.

The invention uses any of the existing physical systems but abstracts to a higher level: essentially, the inventive system and method overlays a virtual telephone system on top of any or all of the existing physical systems. This virtual telephone system provides a uniform way of reaching another and binds the underling physical systems (as a physical transport layer) into a cohesive system. Beneficially, with the inventive system, each potential user is given a number, perhaps at birth, whereby calls to that person (by being placed to that number) are directed to him whether he needs to be reached by POTS, cell, VOIP or other system and method. Thus, callers only need to remember one number for a given person and need not use the present 'hit and miss' method of reaching an intended recipient. Additionally, the invention contemplates and anticipates that the underlying existing physical systems may still be used in the present form and by present methods.

Figure 8:
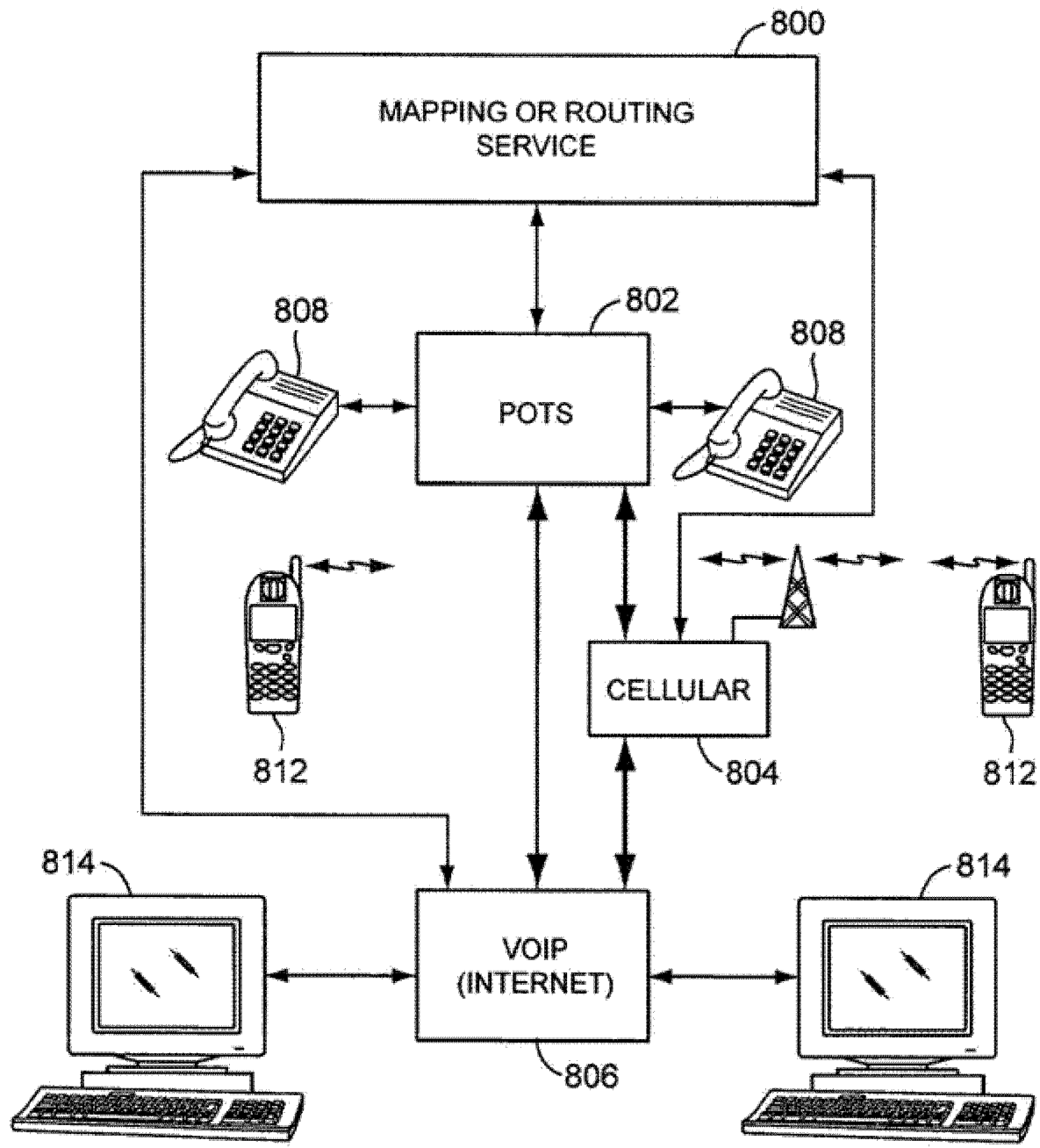
FIG. 8 shows the elements of a virtual telephone system according to one implementation of the invention.

According to the invention and with reference to FIG. 8, an individual is assigned a number that people can use to contact him. This number is his personal number, identifying him from among all others. A routing or call mapping service, 800, stores this number and associates it with traditional device numbers (see for example, FIG. 9A and FIG. 9B), such as the telephone number(s) of specific POTS 802 telephone(s) (or groups of telephones) 808, cellular telephone devices 812, VOIP numbers (or specific IP addresses) of, for example, internet connected computers 812, PDAs, etc. It is contemplated that the owner of his personal number causes (directly or indirectly) the association of specific telephone numbers, cell numbers, VOIP numbers, IP address, etc., to be made by the call routing or mapping service (e.g., FIG. 9A and FIG. 9B). Whenever another calls one's personal number by any available method (e.g., the caller uses a landline, cell phone, VOIP phone, etc.), the routing or call mapping service is consulted to determine to which destination devices (or services) this call should be placed. After making such determination, the call routing or mapping service responds with information or commands to the underlying physical systems, 802, 804, 806, to coordinate or control which devices should be made to ring. As will be discussed later, the routing or call mapping service may also respond with information which will be sent to the devices which should ring.

Thereafter, each of the associated devices are caused to ring (typically, by sending a command packet (e.g., ring packet) to the device or service providers). Once any of the ringing devices is answered, this phone-answered information is made available to all the physical systems, as necessary, to indicate the call has been answered. Additionally, in some embodiments, the answered condition may be sent to the mapping or call routing service so that it can mark the proper association list as being in use (so to prevent further calls in some embodiments) or to be used to temporarily indicate that an associated device is currently unavailable or busy. In one embodiment, if any of the devices is busy, the caller is so informed of the busy condition and a message taken that will later be delivered to the called party (as is done in the prior art for a busy condition). In another embodiment, any device that is not busy is caused to be made to ring irregardless of whether any associated devices are busy (this is highly beneficial for one who has associated his home phone and cell phone with his personal number and his teenage child is tying up the home phone because the cell phone will be made to ring even though the home phone is busy.)

In another embodiment of the invention, a caller can cause a certain device associated with the intended recipient to be called without knowing the number of the device. According to this embodiment, the caller enters the intended recipient's personal number along with a prefix or suffix code which addresses a specific device. For example, the caller enters an intended recipient's person number followed by the '#' sign and then another access code which indicates the intended device. Exemplary access codes may be '0' to indicate home phone, '1' to indicate cell phone, '2' to indicate office phone, '3' to indicate VOIP phone, '4' to indicate facsimile machine, '5' to indicate the recipients voice inbox (which would be deliverable to the recipient at any of the associated voice devices in some embodiments). In addition, the system of the present invention in some embodiments may support access codes for the intended recipient's SMS, MMS, email or other messaging address for those implementations allowing data access (see below) in addition to standard voice call functions. Thus, to reach any of the typical voice or data devices associated with a given person, all a caller needs to remember is one number (the intended recipient's personal number) and an access code, and in some embodiments, a menu of access codes can be accessed by a caller.

As with previously discussed embodiments, the entered personal number and any access codes are received by the call routing or mapping service. If there is an access code received by the system, the call routing or mapping system performs a simple lookup and translation function which translates the personal number and access code to the number of a specific device as indicated by the association list. The routing or mapping system then returns this translated number to the appropriate underlying physical system and the call can be allowed to proceed. In some cases, the access code may indicate that only voice devices should be caused to ring, in which case, the call routing and mapping system would return the numbers of all associated voice devices of the intended recipient. In some embodiments, this is the default condition—that is, absent an access code, only voice devices are caused to ring. Since a user may not have associated devices for all access codes, it is further contemplated that the caller be given a message to this effect when appropriate and supported.

In some embodiments of the invention, when any of the devices to which the call has been sent are answered, the answered device (or service provider to that device) may respond with information to the caller's service provider, the mapping or routing service, or any of the underlying physical call systems (POTS, cellular, VOIP), as necessary. The responded information may include, for example, the type of service associated with the answered device, the type of device that answered (cell, landline phone, computer, etc), the device's capability (e.g., can or can not accept text messages), etc. that has been answered. Thereafter, the caller's service provider now routes the call over the proper available service (it is contemplated that this may include using multiple services to switch the call between the caller and recipient, as is known in the art) and the call continues as though it had specifically been placed over that service originally. Thus, regardless of where an intended recipient is, or which service is most available to him, a caller only need remember one number. When the caller enters that number, he is calling a person, not necessarily a specific device.

Beneficially, the intended recipient can be reached no matter where he is and what's more, if there are several services currently available to him (for example, the recipient is at home, has his cell on, and is sitting at his VOIP-enabled computer) the recipient can choose which service by which to answer the call (either landline, cell, VOIP in this example). Also of benefit is that if the recipient is unavailable (e.g., busy on another call, not inclined to take the call, away from any communication device, etc.) the caller need only leave one message and need not try to call several other numbers or devices and leave messages at each.

According to another aspect of the invention, the nature of having a personal number is further exploited. It is known in the art to include caller ID information to an intended recipient device which reflects the number and perhaps name of the caller. Because the call according to the present invention is placed by entering the personal number of the intended recipient (rather than that of a specific device), the incoming call information can be indicated as being for a specific individual and used to inform, on phones capable of display, for whom the call is intended.

Thus, a call that is placed to an individual who is associated with a device which serves a multiple-party function (say the home telephone which is typically shared between spouses, kids, etc.) can be indicated as being for a specific intended recipient before it is ever answered. Therefore, in this example, a person at home need not answer a call for another when he knows the other is not home but has his cell phone with him because the other will concurrently receive indication of the call on his cell phone. Additionally, in the event the call is simply not answered by anybody, the virtual phone system will allow a message to be left for the intended recipient regardless. It is contemplated that phones be made to display this recipient indication much as they currently display caller ID information. (Further, the intended recipient information is contemplated to be sent to specific devices in similar fashion to caller ID information).

In another embodiment of the invention, phones are selectively targeted by the inventive system and method to be caused to ring in response to someone placing a call to another. There are several ways to accomplish this and can be primarily classified as those being location based and those being based on changes to the list of associated devices. For example, tracking of a GPS cell phone as described above is known in the art. The inventive system and method is allowed to track a person's GPS-equipped cell phone (or other device intended for tracking of the user, for example, an implantable or wearable GPS device which transmits the persons location to the system or tracking service to which the inventive system has access) for the purposes of determining where he is likely located. Furthermore, the system maintains location-based information of fixed-location associated devices (and perhaps other portable devices having GPS tracking capability). When a call is placed to his personal number, the system operates to only ring a (those) phone(s) at those locations where he is in a position to answer. To illustrate, a personal number is associated with the person's cell phone, home landline, office phone, and VOIP number. When he is at work and another places a call to his personal number, the system determines (or has determined) via GPS tracking that the person is likely at work and so only causes his cell phone, office phone and (perhaps) VOIP numbers to ring.

In some embodiments of the invention, it is further contemplated that if any of those devices are not answered after a number of rings, the system may operate to then cause his home phone (or other phones) to ring (additionally or by itself) on the theory that perhaps the recipient left his cell phone at work (in this example) and is therefore improperly indicating his current location.

Association list changes can also be used to target those devices which should ring when one is receiving a call to his personal number. The association list changes can be manual or automatic. As an example of manually changing the association list, one checks into a hotel. When in his room, he picks up the room phone, enters his personal number (and perhaps an access code) which instructs the system to now associate this phone number (either input explicitly or determined by the system by caller ID) with his personal number. Thereafter, calls to his personal number are allowed to cause his hotel room phone to ring. This is remarkably different than doing call forwarding as is known in the art because it is being done from a desired destination point, not from the device desired to be forwarded. Additionally, the act is not one of forwarding one device to another, it is simply adding (or removing) devices to/from a list of associated devices.

It is further contemplated the one may be given the option by the system of the present invention to make association list changes that are permanent or temporary. Permanent association list changes are contemplated for such things as the user moving (and thus, his home number changes), taking a new job, adding or deleting devices, etc. Temporary changes are useful for those who travel or tend to be at may different places short term. Temporary changes to the association list can be time-based or event-based. As an example of time-based change, a user is given the option by the system when he makes an association list change to specify the time duration of the change. Upon expiration of the specified time interval, the device is deleted from the association list. In another example of a temporary change, the system is instructed by the user that the added device should be retained on the association list until the user adds another device to the association list. Thus, as the user moves from place to place and changes his association list, new device replace old, previously-added, devices.

Figure 9A:
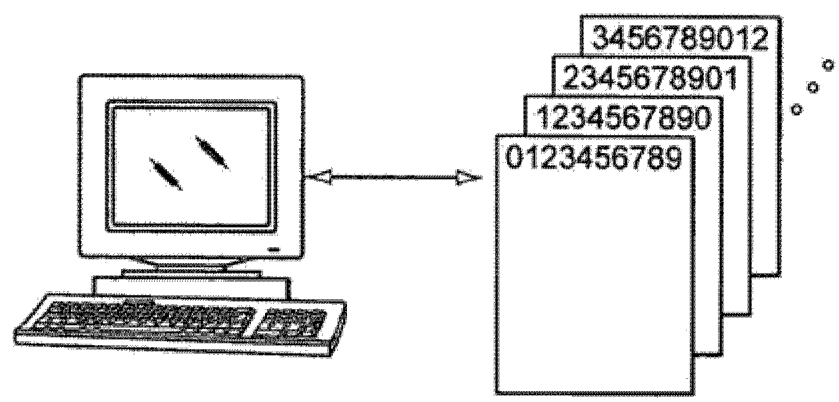

In some embodiments of the invention, the user is given the option to specify times during which specified devices should be added to the association list (see FIG. 9A and FIG. 9B). At other than the specified times, the specified devices are removed or blocked from the association list. For example, the user may wish to have his office phone associated with his person number only during working hours and so he specifies his office phone's number and instructs the system to associate it only from 8 am to 6 pm, Monday through Friday. As another example, the user's family goes to his mother's house every Sunday afternoon for a visit and so he adds his mother's phone number to his list with the specified time of noon to 5 pm on Sunday.

In another embodiment of the invention, the user can specify times or conditions at which no phone (or specified phone(s)) should be caused to ring. For example, the user specifies that no phone (or perhaps he specifies just his cell phone) should be caused to ring on Sunday mornings because he is at Sunday services at that time. Alternatively, the user could have simply specified that his cell phone was not to be associated during Sunday morning since this action would prevent the cell phone from ringing too.

The two primary classification of call targeting mentioned earlier can be combined. For example, the mapping or routing service tracks an individual via his GPS-equipped cell phone and the service further maintains a list of GPS coordinates or locations and the telephone number of devices at those locations. By tracking the individual, calls made to his personal number can be routed to the device nearest him no matter where he is located. Another example has a person being tracked and when he enters a plane at an airport, the system tracking him associates a VOIP phone on the plane with his personal number for the duration of the flight (e.g., until he gets off). Alternatively, his cell phone contains his personal number and is read by a scanner (for example, using RFID, Bluetooth, or otherwise) at the plane or at other locations as he enters and leaves which is transmitted to the inventive system for associating/unassociating the plane's (or other places') telephone number with his personal number for the time he is at or in the plane or place.

In some embodiments of the invention, associated devices may be treated as party-line devices for the duration of the call. For example, a personal number is associated with the person home, office, cell and VOIP numbers. While at home, he receives a call from his son which he takes on his cell phone. During the call, he learns that his son wishes to announce the birth of his first grandson. He quickly tells his wife to pick up the house phone to join in the good news. The inventive system is informed that the home device is now off-hook and, being an associated device with a call in progress, the system operates to now cause the inclusion of the house phone to the call whereby the wife can join in. This 'virtual party-line' has many applications and to minimize abuse (say a coworker picking up one's associated office phone to hear a conversation that the recipient took at home), it is contemplated that as devices are added to the call, that they are automatically announced (by location, tag name, number, etc. e.g., "house phone added", "office phone online", "123-4567 picked up" etc.). Additionally, it is contemplated that as one device is answered, announcements are made or indicated (for example, by text messages) about which other associated devices are already party-lined in. It is further contemplated that one may restrict any party-line features of the invention to specific devices statically or dynamically before and/or during a call.

It is also contemplated that in some embodiments of the invention, the association list for a user is accessible to the user over the internet and not just from phone devices. Thus, he can make changes to the association list via the internet. Furthermore, he can make changes to his association list via computer, PDA, cell or smart phone (having internet accessibility) etc. and not just from phone devices. One benefit provided by this is that the cell phone can use any of the methods herein described for determining locations or devices and effect changes to one's access list (automatically or manual) based on these determinations.

While being described for telephones and telephone calls, the invention has application beyond these. For example, a data transmission is designated as being for an intended recipient who has indicated he has multiple devices rather than going to a single device (typically, the one on which the user is currently logged in). As an illustration, typically, an email is sent to an individual but held at a server until the recipient logs in to get it either by his computer, smart phone, PDA, etc. Services are known in the art which will automatically "push" an email or other data from a server to a specific device (i.e., blackberry, MMS, SMS, etc) but it would be far better if the email or other data was pushed to all devices or at least indicated as being available to all devices on which a user is logged in so that he can get it easily wherever he is (and have synced copies on all his devices).

Using the system and methods described herein, various, multiple IP addresses are associated with a user, and the mail or message server of this example can access this association list to determine the multiple IP addresses to which messages or message indications designated for the individual should be pushed (or given when polled). In one embodiment, the message is stored at the server at least until all such IP address have been sent the data. Thus, by logging into the net from several places, a user can have the several IP addresses from where he is logged in associated with his personal number or personal address. Alternatively, the user can explicitly create an association list of IP addresses that should receive data transmission directed to him (whether he is logged in or not from one or any of those devices, and in the case of an IP address at which he is not logged in, the data is stored until such time that he retrieves it). Therefore, a user can have information destined for him, broadcast to several locations by a server simply by maintaining or indicating an internet presence in the association list.

7. Conclusion

Many of the various aspects of the invention are applicable beyond cell phones and those skilled in the art will appreciate that the term "cell phone" may be extended to include smart phones, pocket PCs, PDAs, etc., as well as other devices that provide telecommunication capability through technologies other than cellular, such as satellite phones, walkie-talkie communication, WiMax-based telecommunication devices, etc. In addition, several aspects of the invention have utility for use with other portable electronic devices having wireless telecommunication capability and while the several applications herein disclosed used a cell phone to illustrate the application, it is contemplated that many of the various aspects of the invention may be applied to other portable electronic devices.

For example, many computers, PDAs, etc. are available with built in internet access via the cellular system (being based, for example, on GPRS, GSM, 3G, 4G (soon), etc.) and soon computers and other portable electronic devices will have WiMax capability and access points. These internet connection applications are subscription based and are typically much more expensive than land based internet connections and also potentially suffer from typical radio problems as does the cell phone. Thus, devices (computer, PDA, phones, etc.) operable for sensing and recognizing a home or office WIFI network, or a device via Bluetooth or Wireless USB or use of near-field transceiver technology like RFID to ID a location or device, or devices having an optical interconnect, or use of GPS and other time differencing location determination systems and methods as well as other systems and methods and automatically transferring itself from WiMax or cellular internet access to cheaper internet connections can help to reduce costs, improve quality and reliability, and save on battery power (this latter benefit is particularly beneficial to a WiMax communication devices as power drain for WiMax portable devices is currently an area of concern for deployment of this technology).

For example, a device so equipped for sensing and recognizing networks, devices, or locations as described can automatically terminate the more expensive internet connection (for example, that provided by cell or WiMax connection) in favor of a potentially cheaper internet connection available via the WIFI or Bluetooth connection it has sensed. In the case of a WiMax connection, the forwarding in many applications is quite straightforward in that communication or data traffic destined for the mobile IP of the user's WiMax device can be routed to another mobile IP address or a fixed IP address typically associated with a land-based device or other mobile device. This is particularly useful for WiMax and similar long range wireless broadband connectivity technologies. Since these technologies are widely anticipated to provide competition to cellular communications by providing useful and effective-range wireless voice over IP communications, location determination by detecting a network, device, electronic tag, GPS, GPS-like, personal area network, etc., can be used to allow communications to be automatically switched between the mobile communication device and fixed-location devices (for example, a land based VOIP phone, a computer, etc.) or, alternatively, to allow the user's communication device (for example, a portable device based on VOIP) to use WiMax when mobile and to automatically use WIFI, Bluetooth, optical, etc. access to more traditional land-based broadband internet services (like a wireless router connected to cable broadband, T1, T3, DSL, etc., for example) to telecommunicate when available.

While many of the aspects of the invention where illustrated in light of incoming or outgoing cellular calls, those skilled in the art will immediately see that these aspects can be applied to other forms of voice or data communications. For example, cell phones having "walkie-talkie" capability, which is typically radio-based point to point (multi- or single), can also beneficially implement many aspects of the invention in relation to walkie-talkie-based communications.

As those skilled in the art will appreciate, the portable electronic device (computer, PDA, etc.), according to the various aspects of the invention, can also be made to forward itself to a land based devices in a manner similar to the above-described cell phone operation. For example, the portable computer or PDA can be made to forward emails, logins, etc. to a land based computer or device upon detection of a specific network, device or place. Preferably, the land based computer and mobile device are also operable for forwarding logins, emails, etc., to the mobile device when either or both detect that the mobile device is no longer around (for example, by no WIFI or Bluetooth presence, no RFID tag presence, etc.) Thus, a user's emails, logins, etc. migrate with the mobile person and rest where they will do him the most good and be the most available to him or according to his wishes.

Many aspects of the invention can beneficially be practiced alone and need not be coupled to location dependent selection. For example, those aspects dealing with ringtones, icons, message sent concurrently with placing a call or in response to receiving a call can all be beneficially used standalone to improve the cell phone. Unless specifically stated otherwise, no aspect of the invention should be construed as requiring combination with another aspect of the invention in practice.

We claim:

1. A method of controlling a vehicle including a wireless communication system and a computer with memory, comprising:
   (a) wirelessly detecting that an authorized cell phone is physically proximate and within communication range of the vehicle;
   (b) establishing a wireless data connection between the cell phone and the vehicle computer;
   (c) receiving from the cell phone via the wireless data connection user-specific profile information to automatically adjust at least one setting in the vehicle based on location as tracked by the cell phone.

2. The method of claim 1, further comprising receiving biometric security information to confirm the cell phone user's identity and authenticate the cell phone's access to the vehicle computer.

3. The method of claim 1, wherein the location as tracked by the cell phone comprises multiple location data points.

4. The method of claim 1, wherein the setting is an ergonomic seat setting.

5. The method of claim 4, wherein the seat setting is adjusted based on physical characteristics of the user stored in the user-specific profile information.

6. The method of claim 1, further comprising the computer 1) receiving from the cell phone, via the wireless data connection, a voice command for the vehicle, 2) using a voice-recognition algorithm to recognize the voice command, and 3) implementing a vehicle function corresponding to the voice command.

7. The method of claim 1, wherein the wireless data connection is a BlueTooth connection.

8. The method of claim 1, wherein the wireless data connection is a near field communication connection.

9. A vehicle control system resident on the vehicle and including (i) a computer controller having memory, and (ii) a wireless communication system, the control system comprising:
   (a) the wireless communication system operable to wirelessly detect that an authorized cell phone is physically proximate to and within wireless communication range of the vehicle;
   (b) the computer controller and wireless communication system operable to establish a wireless data connection between the authorized cell phone and the computer controller;
   (c) the computer controller configured to: (i) receive from the authorized cell phone via the wireless data communication system user-specific profile information; and (ii) automatically adjust at least one setting for the vehicle based on the user-specific profile information and based on location as tracked by the cell phone.

10. The vehicle control system of claim 9, wherein the computer controller and wireless communication system are operable to communicate with multiple different authorized cell phones.

11. The vehicle control system of claim 9, further comprising a biometric security system operable to confirm the cell phone user's identity and authenticate the cell phone's access to the computer controller.

12. The vehicle control system of claim 9, wherein the location as tracked by the cell phone comprises multiple location data points.

13. The vehicle control system of claim 9, wherein the setting is an ergonomic seat setting.

14. The vehicle control system of claim 13, wherein the seat setting is adjusted based on physical characteristics of the user stored in the user-specific profile information.

15. The vehicle control system of claim 9, wherein the computer controller is further configured to 1) receive from the cell phone, via the wireless data connection, a voice command for the vehicle, 2) use a voice-recognition algorithm to recognize the voice command, and 3) implement a vehicle function corresponding to the voice command.

16. The vehicle control system of claim 9, wherein the wireless data connection is a BlueTooth connection.

17. The vehicle control system of claim 9, wherein the wireless data connection is a near field communication connection.

18. A cellular device including (i) a controller (ii) a memory, and (iii) a communication system for communicating with a vehicle control system resident on a vehicle, comprising:
   (a) the memory operable to store user-specific profile information;
   (b) the controller configured to: (i) send to the vehicle control system via the communication system the user-specific profile information; and (ii) cause the vehicle control system to automatically adjust at least one setting for the vehicle based on the user-specific profile information and based on location as tracked by the cellular device.

* * * * *